United States Patent
Brown et al.

(10) Patent No.: US 12,514,423 B2
(45) Date of Patent: Jan. 6, 2026

(54) DOCKING STATION FOR AN AUTONOMOUS FLOOR CLEANER

(71) Applicant: BISSELL Inc., Grand Rapids, MI (US)

(72) Inventors: Adam Brown, Holland, MI (US); Todd R. VanTongeren, Ada, MI (US)

(73) Assignee: BISSELL Inc., Grand Rapids, MI (US)

( * ) Notice: Subject to any disclaimer, the term of this patent is extended or adjusted under 35 U.S.C. 154(b) by 335 days.

(21) Appl. No.: 18/039,816

(22) PCT Filed: Dec. 17, 2021

(86) PCT No.: PCT/US2021/063961
§ 371 (c)(1),
(2) Date: Jun. 1, 2023

(87) PCT Pub. No.: WO2022/133174
PCT Pub. Date: Jun. 23, 2022

(65) Prior Publication Data
US 2024/0000283 A1  Jan. 4, 2024

Related U.S. Application Data

(60) Provisional application No. 63/160,172, filed on Mar. 12, 2021, provisional application No. 63/127,490, filed on Dec. 18, 2020.

(51) Int. Cl.
| A47L 11/40 | (2006.01) |
| A47L 11/292 | (2006.01) |
| B08B 1/10 | (2024.01) |
| B08B 1/20 | (2024.01) |
| B08B 13/00 | (2006.01) |

(52) U.S. Cl.
CPC ......... *A47L 11/4091* (2013.01); *A47L 11/292* (2013.01); *A47L 11/4005* (2013.01); *A47L 11/4016* (2013.01); *A47L 11/4025* (2013.01); *A47L 11/4038* (2013.01); *A47L 11/4083* (2013.01); *B08B 1/10* (2024.01); *B08B 1/20* (2024.01); *B08B 13/00* (2013.01); *A47L 2201/022* (2013.01); *A47L 2201/024* (2013.01);
(Continued)

(58) Field of Classification Search
CPC ................. A47L 11/40; A47L 11/4069; A47L 11/4038; A47L 11/282
See application file for complete search history.

(56) References Cited

U.S. PATENT DOCUMENTS

| 7,891,387 B2 | 2/2011 | Lim et al. |
| 8,819,882 B2 | 9/2014 | De Wit et al. |
| (Continued) | | |

FOREIGN PATENT DOCUMENTS

| CN | 106725135 A | 5/2017 |
| CN | 211749314 U | 10/2020 |
| (Continued) | | |

*Primary Examiner* — Michael D Jennings
(74) *Attorney, Agent, or Firm* — Warner Norcross + Judd LLP

(57) ABSTRACT

An autonomous floor cleaning system includes an autonomous floor cleaner with a docking station. The docking station is configured to performing maintenance for the robot, such as washing mopping pads or refilling the supply tank. Methods for servicing or performing maintenance on an autonomous floor cleaner by a docking station are disclosed.

20 Claims, 26 Drawing Sheets

(52) U.S. Cl.
 CPC ... *A47L 2201/026* (2013.01); *A47L 2201/028* (2013.01)

(56) References Cited

U.S. PATENT DOCUMENTS

| | | | |
|---|---|---|---|
| 8,984,708 | B2 | 3/2015 | Kuhe et al. |
| 9,526,391 | B2 | 12/2016 | Lee et al. |
| 10,383,499 | B2 | 8/2019 | Fox et al. |
| 10,709,308 | B2 | 7/2020 | Buehler et al. |
| 11,058,276 | B2 | 7/2021 | Fox et al. |
| 2016/0331202 | A1 | 11/2016 | Arakawa |
| 2017/0344014 | A1* | 11/2017 | Wu ...................... G05D 1/0225 |
| 2018/0344112 | A1 | 12/2018 | Krebs et al. |
| 2019/0191952 | A1 | 6/2019 | Johnson et al. |
| 2020/0069136 | A1 | 3/2020 | Sasaki et al. |
| 2020/0121153 | A1 | 4/2020 | Letsky |
| 2021/0034061 | A1* | 2/2021 | Yun ...................... A47L 11/4038 |
| 2021/0228043 | A1 | 7/2021 | Jang et al. |
| 2022/0369888 | A1* | 11/2022 | Li ...................... A47L 11/4027 |

FOREIGN PATENT DOCUMENTS

| | | |
|---|---|---|
| DE | 202016104066 U1 | 10/2017 |
| EP | 2604164 A1 | 6/2013 |
| EP | 3284383 A2 | 2/2018 |
| KR | 102281840 | 7/2021 |
| WO | 2018108144 A1 | 6/2018 |
| WO | 2020125491 A1 | 6/2020 |
| WO | 2020143291 A1 | 7/2020 |
| WO | 2021137476 A1 | 7/2021 |
| WO | 2021137477 A1 | 7/2021 |

\* cited by examiner

DOCKING STATION FOR AN AUTONOMOUS FLOOR CLEANER

CROSS-REFERENCE TO RELATED APPLICATION(S)

The present application is the National Stage of International Application No. PCT/US2021/063961, filed Dec. 17, 2021, which claims the benefit of U.S. Provisional Application No. 63/127,490, filed Dec. 18, 2020, and U.S. Provisional Application No. 63/160,172, filed Mar. 12, 2021, all of which are incorporated herein by reference in their entirety.

BACKGROUND

Autonomous or robotic floor cleaners can move without the assistance of a user or operator to clean a floor. For example, the floor cleaner can be configured to vacuum or sweep debris (including dust, hair, and other debris) into a collection bin carried on the floor cleaner. Some floor cleaners are configured to apply liquid for wet cleaning of bare floors, carpets, rugs, and other floor surfaces, and often include one or more mopping elements that absorb liquid and debris. Still other floor cleaners are configured to extract liquid from the floor.

Autonomous floor cleaners can move randomly about a floor while cleaning or use a mapping/navigation system for guided navigation about the floor. Many autonomous floor cleaners need to return to a docking station to recharge their battery. In order to further autonomize the cleaning process, some docking stations have been adapted to empty the collection bin so that intervention/servicing by a human is not required. However, since autonomous floor cleaners adapted for wet cleaning, i.e. robots that apply and/or extract liquid, typically need at least one mopping element that becomes wet and dirty during use, frequent intervention/servicing by a human user to clean the mopping element is still necessary for wet cleaning robots. Often, the human user must remove the mopping element from the robot, wash it, dry it, and return it to the robot after each cleaning operation, which is time-consuming and requires an amount of unpleasant effort that defeats the purpose of an autonomous cleaner.

Therefore, there still exists a need for an automatous cleaning system that reduces the frequency of intervention and servicing by a human user.

BRIEF SUMMARY

The disclosure relates to a docking station for an autonomous floor cleaner. Various methods for docking an autonomous floor cleaner with a docking station are described herein.

In one aspect, a docking station for an autonomous floor cleaner includes a reservoir configured to hold rising water, a scrubbing element configured to engage at least one mopping pad on an autonomous floor cleaner docked with the docking station to clean the mopping pad.

In another aspect, a docking station for an autonomous floor cleaner includes a refilling mechanism for refilling a supply tank on a robot.

In yet another aspect, a docking station for an autonomous floor cleaner includes an evacuation mechanism for emptying a collection bin on a robot.

In still another aspect, a docking station for an autonomous floor cleaner comprises a garage including one or more of the following features: robot storage, robot charging, pad cleaning supply tank refill, collection bin emptying, an expanded physical user interface, accessory storage, brushroll cleaning, edge brush cleaning, an easy empty debris tray, formula dosing, and/or cleaning fluid heating.

In yet a further aspect, a method for docking an autonomous floor cleaner with a docking station includes cleaning mopping pads of the autonomous floor cleaner at the docking station.

In still a further aspect, a method for docking an autonomous floor cleaner with a docking station includes refilling the autonomous floor cleaner at the docking station.

In still another further aspect, a method for docking an autonomous floor cleaner with a docking station includes emptying the autonomous floor cleaner at the docking station.

In another aspect, a docking station for an autonomous floor cleaner includes at least one charging contact configured to contact at least one corresponding charging contact of an autonomous floor cleaner to charge a battery of the autonomous floor cleaner, a storage tank configured to hold a supply of cleaning fluid, a dispensing port configured to couple with a refill port on the autonomous floor cleaner, at least one supply conduit conveying liquid from the storage tank to the dispensing port, an arm having an input end and an output end, the arm comprising a pivot coupling between the input end and the output end, and wherein the dispensing port is carried by and moveable with the output end of the arm, and an arm indexer coupled with the input end of the arm and configured to pivot the arm about an axis defined by the pivot coupling to an aligned position in which the dispensing port is aligned with the refill port.

In yet another aspect, a docking station for a floor cleaner includes a housing including a platform, at least one charging contact, an agitator cleaning mechanism including scrubbing elements to engage an agitator on the floor cleaner to clean the agitator and a reservoir to collect liquid and debris from agitator cleaning, and a fan positioned to direct a forced air flow to toward the reservoir to evaporate liquid collected in the reservoir and/or dry the agitator on the floor cleaner.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

The disclosure generally relates to the docking of autonomous floor cleaners with docking stations. More specifically, the disclosure relates to docking stations for wet cleaning robots and the servicing of wet cleaning robots.

Figure 1:
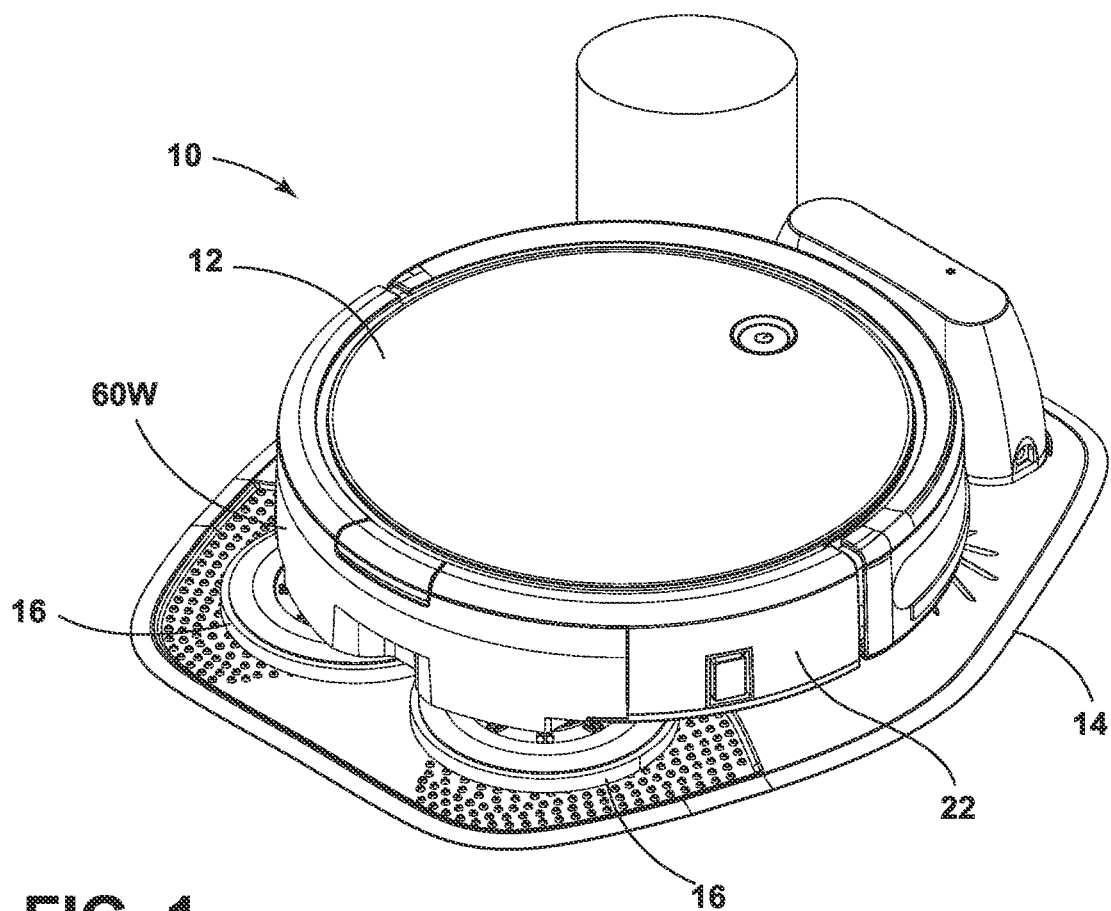
FIG. 1 is a perspective view of an autonomous floor cleaning system according to one embodiment of the invention, the system including at least an autonomous floor cleaner, or robot, and a docking station.

FIG. 1 is a schematic view of an autonomous floor cleaning system 10 according to one embodiment of the invention. The autonomous floor cleaning system 10 includes an autonomous floor cleaner 12 and a docking station 14 for the autonomous floor cleaner 12, also referred to herein as a robot. The robot 12 can clean various floor surfaces, including bare floors such as hardwood, tile, and stone, and soft surfaces such as carpets and rugs. Optionally, the system 10 can include an artificial barrier system (not shown) for containing the robot 12 within a user-determined boundary.

The robot 12 is dockable with the docking station 14 for recharging of the robot 12. Additionally, the robot 12 is dockable with the docking station 14 for servicing of the robot 12, e.g. performing maintenance, in tandem with or separately from recharging the robot 12, thereby greatly extending the time between interventions by a human user Some non-limiting examples of service functions that the docking station 14 can perform on the robot 12 include cleaning an agitating element of the robot 12, refilling a supply tank of the robot 12, and/or emptying a collection container of the robot 12.

In some embodiments, the robot 12 includes at least one mopping pad 16 that becomes wet and dirty during a cleaning operation. The robot 12 can be docked with the docking station 14, and the docking station 14 can automatically clean the mopping pad 16.

Figure 2:
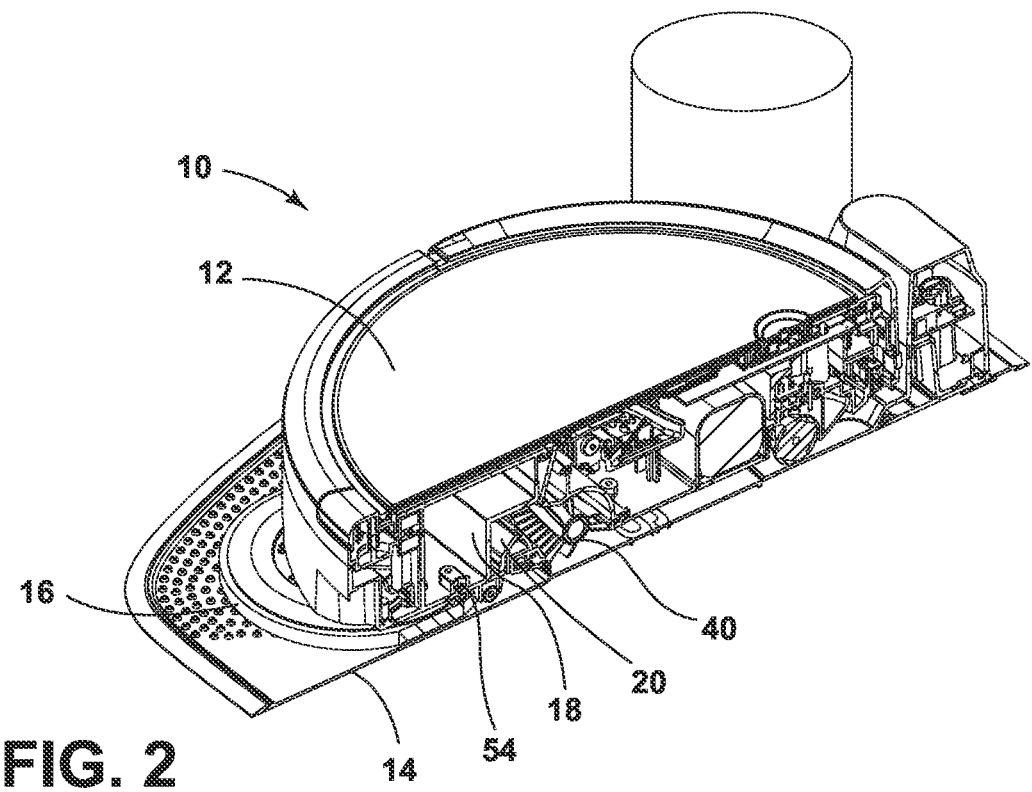
FIG. 2 is a cross-section view of the system of FIG. 1.

Referring additionally to FIG. 2, in some embodiments, the robot 12 includes at least one supply tank 18 adapted to hold supply of liquid to be used during a cleaning operation, e.g. dispensed on the surface to be cleaned as a liquid, steam, mist, vapor, or mixture thereof. The robot 12 can be docked with the docking station 14, and the docking station 14 can automatically refill the supply tank 18 with cleaning fluid.

In some embodiments, the robot 12 includes at least one collection bin 20 adapted to hold liquid and/or debris collected from the surface during a cleaning operation. The robot 12 can be docked with the docking station 14, and the docking station 14 can automatically empty the collection bin 20.

In one embodiment, and as will be described in further detail below, the robot 12 is a wet mopping and sweeping robot including a fluid delivery system for storing cleaning fluid and delivering the cleaning fluid to the surface to be cleaned, a mopping system for removing cleaning fluid and debris from the surface to be cleaned via absorption by the mopping pads 16, and a sweeping system for collecting cleaning fluid and debris from the surface to be cleaned without the use of suction. The fluid delivery system may be configured to delivery liquid, steam, mist, or vapor to the surface to be cleaned.

In another embodiment, the robot 12 can be a wet mopping robot including a fluid delivery system and a mopping system, without the sweeping system.

In yet another embodiment, the robot 12 can be a deep cleaning robot including a fluid delivery system, a mopping system, and a recovery system for removing liquid and/or debris from the surface to be cleaned and storing the recovered cleaning liquid and/or debris. The recovery system can include a suction source for creating a partial vacuum to suck up liquid and/or debris from the surface.

In still another embodiment, the robot 12 can be a cleaning robot including a recovery system, without a fluid delivery system or a mopping system.

The docking station 14 can be configured to dock, recharge, and service any of the aforementioned robot types.

As used herein, the term "debris" includes dirt, dust, soil, hair, and other debris, unless otherwise noted. As used herein, the term "cleaning fluid" as used herein primarily encompasses liquids, and may include steam unless otherwise noted. Such liquids may include, but are not limited to, water or solutions containing water (like water mixed with a cleaning chemistry, fragrance, etc.).

FIGS. 1-5 illustrate one embodiment of the robot 12 for the system 10 of FIG. 1. It is noted that the robot 12 shown in FIGS. 1-5 is but one example of an autonomous floor cleaner that is usable with the system 10 and with the docking station 14, and that other autonomous floor cleaners can be used with the system 10 and docking station 14.

The robot 12 mounts the components of various functional systems of the autonomous floor cleaner in an autonomously moveable unit or housing 22, including components of a mopping system 23, a sweeping system 24, a fluid delivery system 25, a drive system 26, and a navigation/mapping system 28. A controller 30 is operably coupled with the various functional systems 23, 24, 25, 26, 28 of the robot 12 for controlling the operation of the robot 12. The controller 30 can be a microcontroller unit (MCU) that contains at least one central processing unit (CPU).

As shown, the housing 22 of the robot 12 can be a circular, with a first end 32 and a second end 34. The first end 32 defines the front of the robot 12 and can optionally comprise a bumper 36. The second end 34 can define the rear of the robot 12 and a pair of mopping pads 16 can be disposed closer to the second end 34 of the robot 12 than the first end 32, as described in further detail below. Other shapes and configurations for the robot 12 are possible, including a D-shaped housing.

The sweeping system 24 can include an inlet opening 38, a brushroll 40 mounted for rotation in the inlet opening 38 for sweeping the surface to be cleaned, and a collection container or bin 20. The inlet opening 38 can be provided on an underside 44 (FIG. 4) of the housing 22 adapted to confront the floor as the housing 22 moves autonomously across a floor. The brushroll 40 can be provided adjacent to the inlet opening 38 to contact the floor through the inlet opening 38 and is rotatable to mechanically propel debris, and in some cases liquid, into the collection bin 20. The collection bin 20 collects debris and/or liquid from the working airstream for later disposal and can be removable from the housing 22 for this purpose.

The brushroll 40 can be mounted for rotation about a substantially horizontal axis, relative to the surface over which the robot 12 moves. A drive assembly including a brush motor 46 can be provided within the robot 12 to drive the brushroll 40.

The sweeping system 24 can optionally include at least one edge brush 48 that can clean hard-to reach spaces such as along edges and in corners of a room, including edges or corners created by walls, baseboards, cabinetry, furniture, etc. The edge brush 48 can sweep debris under the housing 22 and toward the inlet opening 38. The edge brush 48 can comprise one or more different agitation or cleaning elements configured to brush, sweep, dust, mop, or otherwise move debris on the surface to be cleaned. Some non-limiting examples of cleaning elements for the edge cleaning brush 48 comprise bristles, paddles, blades, flaps, microfiber material, fabric, dusting pads, and the like. A drive assembly including an edge brush motor 50 can be provided within the robot 12 to drive the edge brush 48. The edge brush motor 50 is configured to drive at least a portion of the edge brush 48 about a substantially vertical rotational axis, relative to the surface to be cleaned. In being substantially vertical, the rotational axis can deviate up to 5 degrees from vertical, up to 10 degrees from vertical, up to 20 degrees from vertical, or up to 45 degrees from vertical.

The robot 12 shown includes two edge brushes 48 on the underside 44 of the housing 22. Each edge brush 48 can include its own individual motor 50, or a single motor 50 can drive both brushes 48. The edge brushes 48 are arranged at opposite lateral sides, i.e. left and right sides, of the housing 22 so that the robot 12 can edge clean on either side of the housing 22 without changing the orientation of the housing 22. In other embodiments, only one edge brush 48 may be provided.

Figure 4:
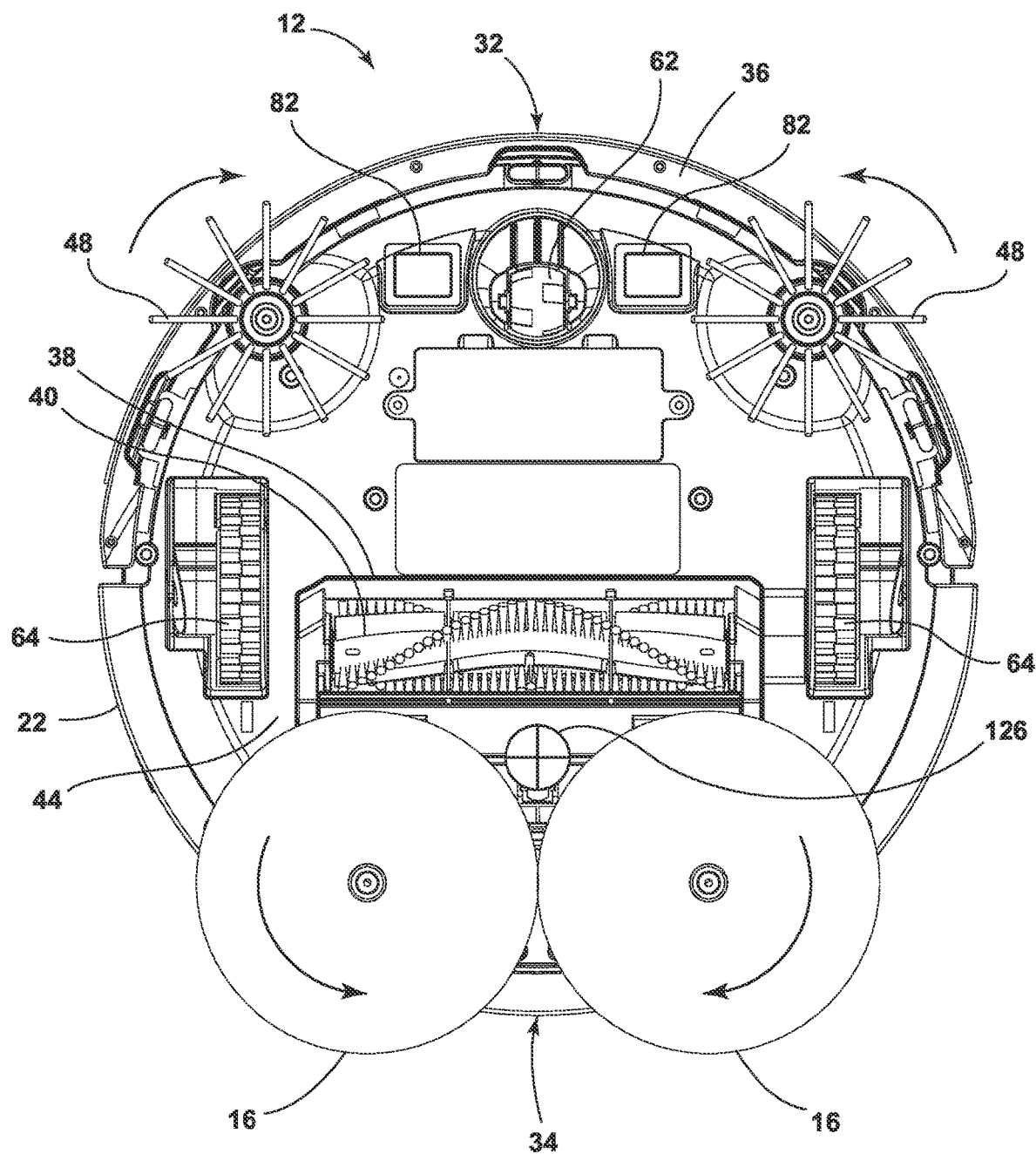
FIG. 4 is a bottom view of the robot from FIG. 1.

Advantageously, the edge brushes 48 sweep debris under the housing 22 and toward the inlet opening 38. The direction of rotation for each edge brush 48 is indicated in FIG. 4 by arrows. As is illustrated in FIG. 4, the edge brushes 48 can counter-rotate such that debris is swept towards the inlet opening 38 by both brushes 48, and the brushroll 40 can mechanically propel the debris to the collection bin 20. The left side edge brush 48 rotates in a clockwise direction as viewed from bottom. The right side edge brush 48 rotates in a counterclockwise direction as viewed from bottom. In one example, at least a portion of the edge brushes 48 extend beyond a periphery of the housing 22 such that debris adjacent the robot 12 can be swept toward the inlet opening 38. In the embodiment shown herein, the edge brushes 48 are mounted at the first end 32 or front of the robot 12 and sweep debris toward the center and rear of the housing 22, i.e. toward the inlet opening 38.

The fluid delivery system 25 can include a supply tank 18 for storing a supply of cleaning fluid and at least one fluid distributor 54 in fluid communication with the supply tank 18. The fluid distributor 54 can deposit cleaning fluid onto the mopping pads 16, and soaks through the floor-facing lower surface of the mopping pads 16 for application onto the floor surface by the mopping pads 16. In other embodiments, the fluid distributor 54 can deposit cleaning fluid directly onto the surface. The cleaning fluid can be a liquid such as water or a cleaning solution specifically formulated for hard or soft surface cleaning. The fluid delivery system 25 can include appropriate flow control components to control the application of cleaning fluid by the fluid distributor 54. Such flow control components may include a pump, valves, conduits, tubing, and the like. In the embodiment shown, the fluid distributor 54 can comprise a drip bar. Alternatively, the fluid distributor 54 can be one or more spray nozzles or a manifold having multiple distributor outlets.

Various combinations of optional components can also be incorporated into the fluid delivery system, such as a heater or one or more fluid control and mixing valves. The heater can be configured, for example, to warm up the cleaning fluid before it is applied to the surface. In one embodiment, the heater can be an in-line fluid heater between the supply tank 18 and the distributor 54. In another example, the heater can be a steam generating assembly. The steam generating assembly is in fluid communication with the supply tank 18 such that some or all the liquid applied to mopping pads 16 or to the floor surface is heated to vapor.

In the embodiment shown, the mopping system 23 includes two mopping pads 16. The mopping pads 16 can comprise one or more different agitation or cleaning elements configured to mop the surface to be cleaned. Some non-limiting examples of cleaning elements for the mopping pads 16 comprise a microfiber pad or a wet scrubbing pad.

The mopping pads 16 can work by absorbing water, debris, and organic matter into the fibers of the cleaning elements. The pad 16 therefore become dirty during use. To prolong the useful life of the pads 16, the docking station 14 can wash the pads 16, as described in further detail below.

Advantageously, the mopping pads 16 are disposed to the rear of the edge brushes 48 and the brushroll 40, such that dry debris is swept up and collected prior to wet mopping the floor. Thus, the robot 12 can sweep and mop the floor in one pass. The direction of rotation for each mopping pad 16 is indicated in FIG. 4 by arrows. As is illustrated in FIG. 4, the mopping pads 16 can counter-rotate to balance the forces the pads 16 apply to the robot 12 so that the robot 12 can easily drive in a straight line. The left mopping pad 16 rotates in a counterclockwise direction as viewed from bottom. The right mopping pad 16 rotates in a clockwise direction as viewed from bottom. In one example, at least a portion of the mopping pads 16 extend beyond a periphery of the housing 22 to increase the mopping area coverage provided by the two pads 16. In the embodiment shown herein, the mopping pads 16 are mounted at the second end 34 or rear of the robot 12, rearward of the inlet opening 38.

A drive assembly including at least one mopping pad motor 56 can be provided to drive the at least one mopping pad 16. In the embodiment shown with multiple mopping pads 16, the mopping pad 16 can be operated by a common motor 56 or individual motors 56. The pad motor 56 is configured to drive at least a portion of the mopping pad 16 about a substantially vertical rotational axis, relative to the surface to be cleaned. A motor driver 58 can be provided for controlling each pad motor 56. The motor driver 58 can act as an interface between the controller 30 and its respective motor. The motor driver 58 can be an integrated circuit chip (IC). It is also contemplated that a single motor driver 58 can control multiple pad motors 56 simultaneously.

The robot 12 can operate in one of a set of modes. The modes can include at least a dry mode and a wet mode. During the wet mode of operation, liquid is dispensed from the fluid distributors 54. During the dry mode of operation, no liquid is dispensed from the fluid distributors 54.

Figure 5:
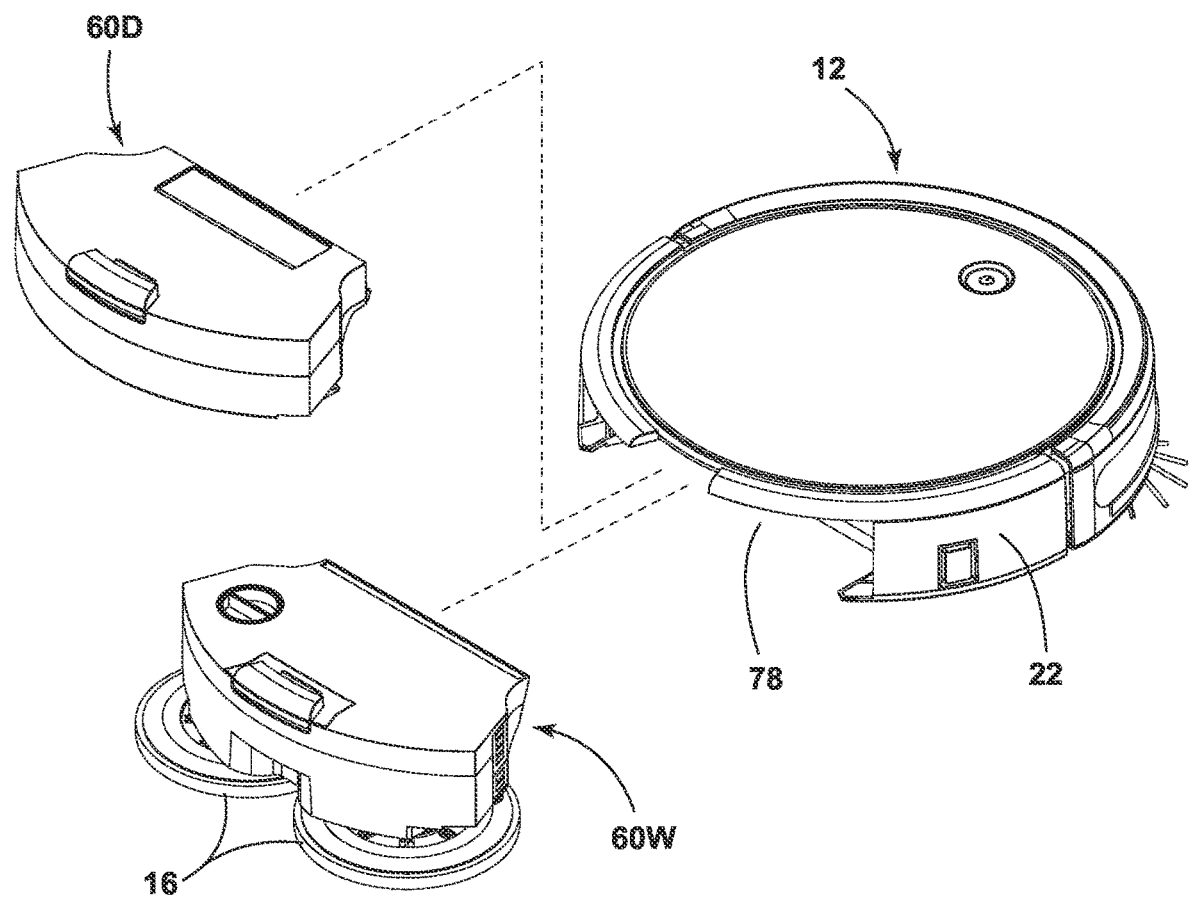
FIG. 5 is an exploded view of the robot from FIG. 1, showing interchangeable cleaning modules for the robot.

Referring to FIG. 5, in one embodiment, the robot 12 has interchangeable modules 60W, 60D for the wet mode and the dry mode, respectively. Each module can be installed and removed from the housing 22 as a unit. The housing 22 of the robot 12 includes a module receiver 78 in which the modules 60W, 60D can be installed, one at a time. The module receiver 78 can comprise suitable connections for establishing the flow of air, debris, cleaning fluid, and power, as required, between the modules 60W, 60D and components within the housing 22. In the embodiment shown, the module receiver 78 can be located at the second end 34 of the housing 22, for installation of removal of modules 60W, 60D through the rear of the robot 12. Other locations for the module receiver 78 are possible.

The wet module 60W can optionally include at least some of the components of the mopping system, such as the mopping pads 16 and motor 56, as well as the supply tank 18 and collection bin 20, such that these components can be installed and removed from the housing 22 as a unit. In another embodiment, a separate collection bin and supply tank can be provided, such that each is individually removable from the housing 22.

The wet module 60W can optionally include a latch or other mechanism for securing the module within the receiver 78. The wet module 60W is inserted into the receiver 78 for operation of the robot 12 in the wet mode. During the wet mode of operation, liquid from the supply tank 18 is dispensed from the fluid distributor 54 and the mopping pads 16 can be rotated. In one embodiment, the mopping system 23 can remove cleaning fluid and debris from the surface to be cleaned without the use of suction. Cleaning fluid and debris can be collected by the mopping pads 16.

In some embodiments, the wet module 60W may provide dry sweeping as well as wet mopping. The edge brushes 48 and brushroll 40 rotate, and the brushroll 40 can flick dry debris into the collection bin 20 ahead of mopping the floor with the pads 16.

In another embodiment, the wet module 60W may provide vacuum cleaning as well as wet mopping. The robot 12 can comprise a suction source on the housing 22 for creating a partial vacuum to suck up liquid and/or debris from the surface via the inlet 38 to collect liquid and/or debris in the bin 20.

The dry module 60D can include a collection bin configured to receive dry debris. The dry module 60D can optionally include a latch or other mechanism for securing the module within the receiver 78. The dry module 60D is inserted into the receiver 78 for operation of the robot 12 in the dry mode. During the dry mode of operation, the brushroll 40 and/or edge brushes 48 can be rotated to sweep debris into the collection bin 20. In the embodiment shown, the brushroll 40 and edge brushes 48 remain on the housing 22 in both modes. In an alternative embodiment, one or both of the brushroll 40 and edge brushes 48 can be included on the dry module 60D. In some embodiments, the dry module 60D may provide dry sweeping only. In other embodiments, the robot 12 can comprise a suction source carried on the dry module 60 or on the housing 22 separate from the dry module 60D for creating a partial vacuum to suck up liquid and/or debris from the surface via the inlet 38.

The drive system 26 can include drive wheels 64 for driving the robot 12 across a surface to be cleaned. The drive wheels 64 can be operated by a common wheel motor 66 or individual wheel motors 66 coupled with the drive wheels 64 by a transmission, which may include a gear train assembly or another suitable transmission. The drive system 26 can receive inputs from the controller 30 for driving the robot 12 across a floor, based on inputs from the navigation/mapping system 28 for the autonomous mode of operation or based on inputs from a smartphone, tablet, or other remote device for an optional manual mode of operation. The drive wheels 64 can be driven in a forward or reverse direction to move the unit forwardly or rearwardly. Furthermore, the drive wheels 64 can be operated simultaneously at the same rotational speed for linear motion or independently at different rotational speeds to turn the robot 12 in a desired direction. While the drive system 26 is shown herein as including rotating wheels 64, it is understood that the drive system 26 can comprise alternative traction devices for moving the robot 12 across a surface to be cleaned.

In addition to the drive wheels 64 or other traction devices, the robot 12 can include one or more additional wheels 62 that support the housing 22, such as a castor wheel at a center, rear portion of the underside 44 of the housing 22, as shown in FIG. 4.

The controller 30 can receive input from the navigation/mapping system 28 or from a remote device such as a smartphone (not shown) for directing the robot 12 over the surface to be cleaned. The navigation/mapping system 28 can include a memory 68 that can store any data useful for navigation, mapping or conducting a cycle of operation, including, but not limited to, maps for navigation, inputs from various sensors that are used to guide the movement of the robot 12, etc. For example, wheel encoders 70 can be placed on the drive shafts of the drive wheels 64 and configured to measure a distance traveled by the robot 12. The distance measurement can be provided as input to the controller 30.

In an autonomous mode of operation, the robot 12 can be configured to travel in any pattern useful for cleaning or sanitizing including boustrophedon or alternating rows (that is, the robot 12 travels from right-to-left and left-to-right on alternate rows), spiral trajectories, etc., while cleaning the floor surface, using input from various sensors to change direction or adjust its course as needed to avoid obstacles. In the optional manual mode of operation, movement of the robot 12 can be controlled using a mobile device such as a smartphone or tablet.

The robot 12 can include any number of motors useful for performing locomotion and cleaning and any number of motor drivers for controlling the motors. In the embodiment shown, a brushroll motor driver 72, an edge brush motor driver 74, and a wheel motor driver 76 can be provided for controlling the brushroll motor 46, edge brush motors 50, and wheel motors 66, respectively. The motor drivers can act as an interface between the controller 30 and their respective motors. The motor drivers can be an integrated circuit chip (IC). It is also contemplated that a single edge brush motor driver 74 and/or a single wheel motor driver 76 can control multiple motors 50, 66 simultaneously.

The motor drivers can be electrically coupled to a battery management system 80 that includes a rechargeable battery 81, which may comprise battery pack. In one example, the battery pack can comprise a plurality of lithium ion batteries. Batteries with other cell chemistries, such as nickel metal hydride and nickel cadmium, are also possible. Electrical contacts or charging contacts 82 for the battery 81 can be provided on an exterior surface of the robot 12. In one embodiment, the charging contacts 82 are provided on the underside 44 of the robot 12. In another embodiment, the charging contacts 82 may be provided on the first end 32 of the robot 12.

The controller 30 is further operably coupled with a user interface (UI) 84 on the robot 12 for receiving inputs from a user. The UI 84 can be used to start a cleaning operation of the robot 12, select an operation cycle for the robot 12, send the robot 12 back to the docking station 14, or otherwise control the operation of the robot 12. The UI 84 can optionally have a display 86, such as an LED display, for providing visual notifications to the user. A display driver 88 can be provided for controlling the display 86, and acts as an interface between the controller 30 and the display 86. The display driver 88 may be an IC. The robot 12 can be provided with a speaker (not shown) for providing audible notifications to the user.

The UI 84 can further have one or more switches 90 that are actuated by the user to provide input to the controller 30 to control the operation of various components of the robot 12. A switch driver 92 can be provided for controlling the switch 90, and acts as an interface between the controller 30 and the switch 90.

The robot 12 can be provided with one or more cameras or stereo cameras (not shown) for acquiring visible notifications from the user. In this way, the user can communicate instructions to the robot 12 by gestures. For example, the user can wave their hand in front of the camera to instruct the robot 12 to stop or move away. In one embodiment, the user can execute a gesture in front of the camera that instructs the robot 12 to dock with the docking station 14.

The robot 12 can comprise an on-board Wi-Fi connection that is configured to allow the robot 12 to be controlled remotely through a mobile device, such as a smartphone or tablet, or via a voice-controlled remote device such as an Amazon Echo® or Amazon Echo Dot® having the Amazon Alexa® cloud-based voice service, or a Google Home® or Google Home Mini® having Google Assistant. For example, a user with a smart speaker device can speak an instruction, such as "Alexa, ask [robot] to start cleaning," and via the Wi-Fi and/or Internet connectivity, the robot 12 can begin a cleaning cycle of operation.

A smart device application for the robot 12 and/or docking station 14 that is executed on a mobile or remote device can include further command and control features including, but not limited to, scheduling features to enable a user to select when the robot 12 will conduct cleaning or scheduling features to enable a user to select when the docking station 14 will clean the mopping pads 16 or perform other maintenance on the robot 12. Other features of the smart device application can include a display of the robot's cleaning history, a display of the docking station's cleaning history, a display of the docking station's charging history, a landing page with current blogs and support videos related to the robot 12 or docking station 14, and controls to automatically reorder accessories for the robot 12 or docking station 14 when needed, such as ordering new mopping pads 16, brushrolls 40, edge brushes 48, filters, or cleaning fluid. The smart device application can also be configured to provide detailed notifications relating diagnostics, error warnings, and other information directly to the user.

The controller 30 can be operably coupled with various sensors 94 on board the robot 12 for receiving input about the environment and from the docking station 14, and can use the sensor input to control the operation of the robot 12. The sensors 94 can detect features of the surrounding environment of the robot 12 including, but not limited to, the docking station 14, walls, floors, chair legs, table legs, footstools, pets, consumers, and other obstacles. The sensor input can further be stored in the memory 68 or used to develop maps by the navigation/mapping system 28. Some exemplary sensors 94 include: a distance sensor for position/proximity sensing, a bump sensor detecting front or side impacts to the robot 12, a wall following sensor that provides distance feedback so that the robot 12 can follow near a wall without contacting the wall, a cliff sensor that provides distance feedback so that the robot 12 can avoid excessive drops down stairwells, ledges, etc., an inertial measurement unit (IMU) that measures and reports on the robot's acceleration, angular rate, or magnetic field surrounding the robot 12, a lift-up sensor that detects when the robot 12 is lifted off the floor, e.g. if a user picks up the robot 12, a bin or tank sensor that determines the presence or absence of the collection bin 20 or supply tank 18 on the housing 22, a bin full sensor that detects when the collection bin 20 is full and requires emptying, a tank empty sensor that detects when the supply tank 18 is empty and requires refilling, a floor condition sensor that detects a condition of the floor to be cleaned, a mopping pad condition sensor that detects a condition of the mopping pads 16, or any combination thereof, including multiples thereof. Although it is understood that not all sensors shown may be provided, additional sensors may be provided, and that all of the possible sensors can be provided in any combination. Sensor input can be used to slow down, turn, and/or adjust the course of the robot 12, to select an obstacle avoidance algorithm, to halt operation of the motors 46, 50, 66, 56 in response to a detected event, or to dock the robot 12 with the docking station 14.

The robot 12 can have at least one receiver 96 to detect signals emitted from the docking station 14. In one embodiment, a docking signal from the docking station 14 can be transmitted to the robot 12 and received by the receiver 96 to guide the robot 12 to the docking station 14.

Figure 6:
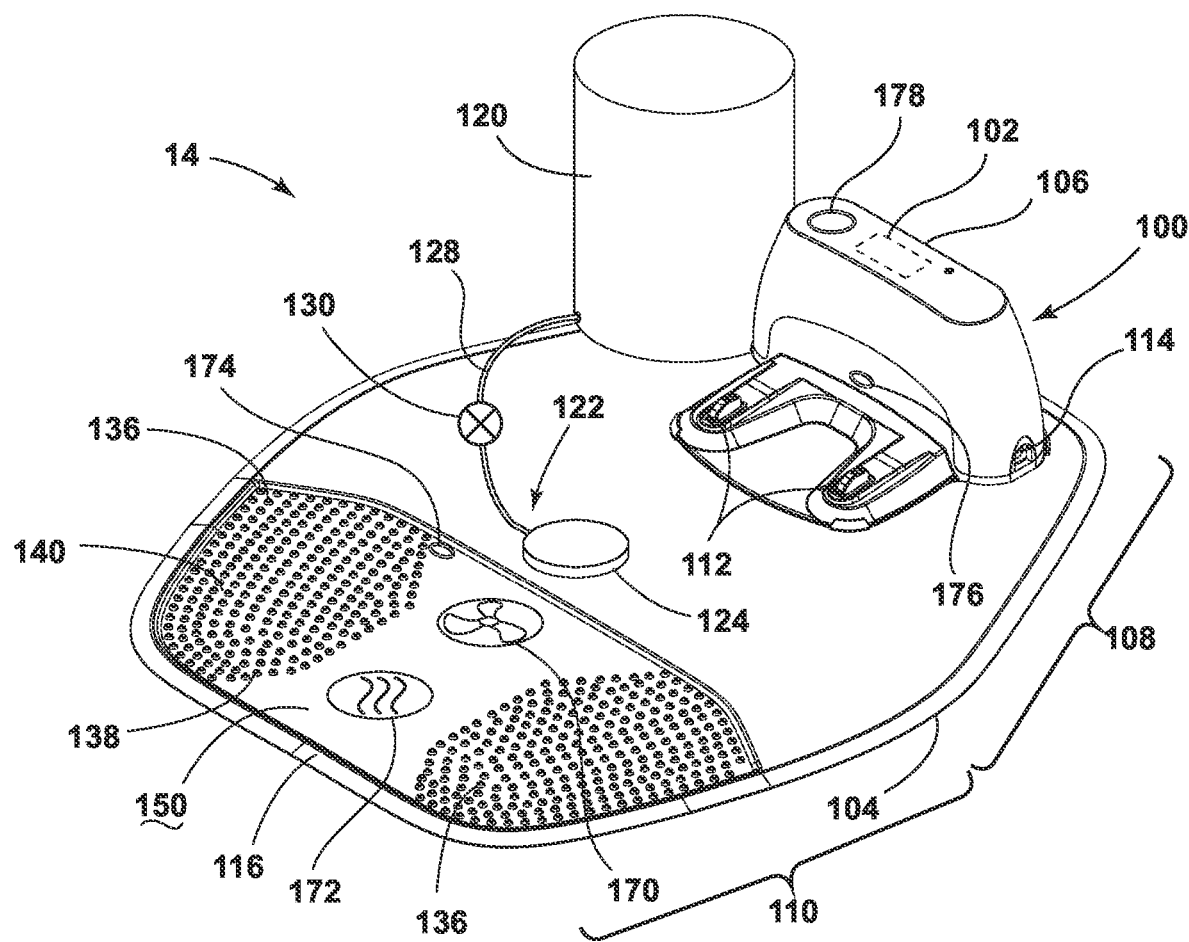
FIG. 6 is a perspective view of the docking station from FIG. 1.

FIG. 6 illustrates one embodiment of the docking station 14 for the system 10 of FIG. 1. The docking station 14 provides support for the robot 12 while charging the battery 81 and cleaning the pads 16. In another embodiment, in addition to or as an alternative to recharging and pad cleaning, the docking station 14 can perform additional service, maintenance, or diagnostic checks on the robot 12. For example, the docking station 14 can be configured to automatically empty the collection bin 20 and/or automatically fill or refill the supply tank 18.

A controller 102 is operably coupled with the various functional systems of the docking station 14 for controlling its operation. The controller 102 can be a microcontroller unit (MCU) that contains at least one central processing unit (CPU). The docking station 14 can include various sensors and emitters for monitoring a status of the robot 12, enabling auto-docking functionality, communicating with the robot 12, as well as features for network and/or Bluetooth connectivity.

The docking station 14 includes a housing 100, and the housing 100 can include a base or platform 104 and a backstop 106. The platform 104 can extend generally horizontally to be disposed on the floor. The backstop 106 is generally perpendicular to the floor surface on which the platform 104 rests. Other shapes and configurations for the housing 100 are possible.

The platform 104 can as large as, or larger than, the footprint of the robot 12, so that the robot 12 rests entirely on the platform 104 when docked. This elevates the robot 12 off the floor and can project the floor from damage, particularly if components of the robot 12 remain wet after use.

Figure 3:
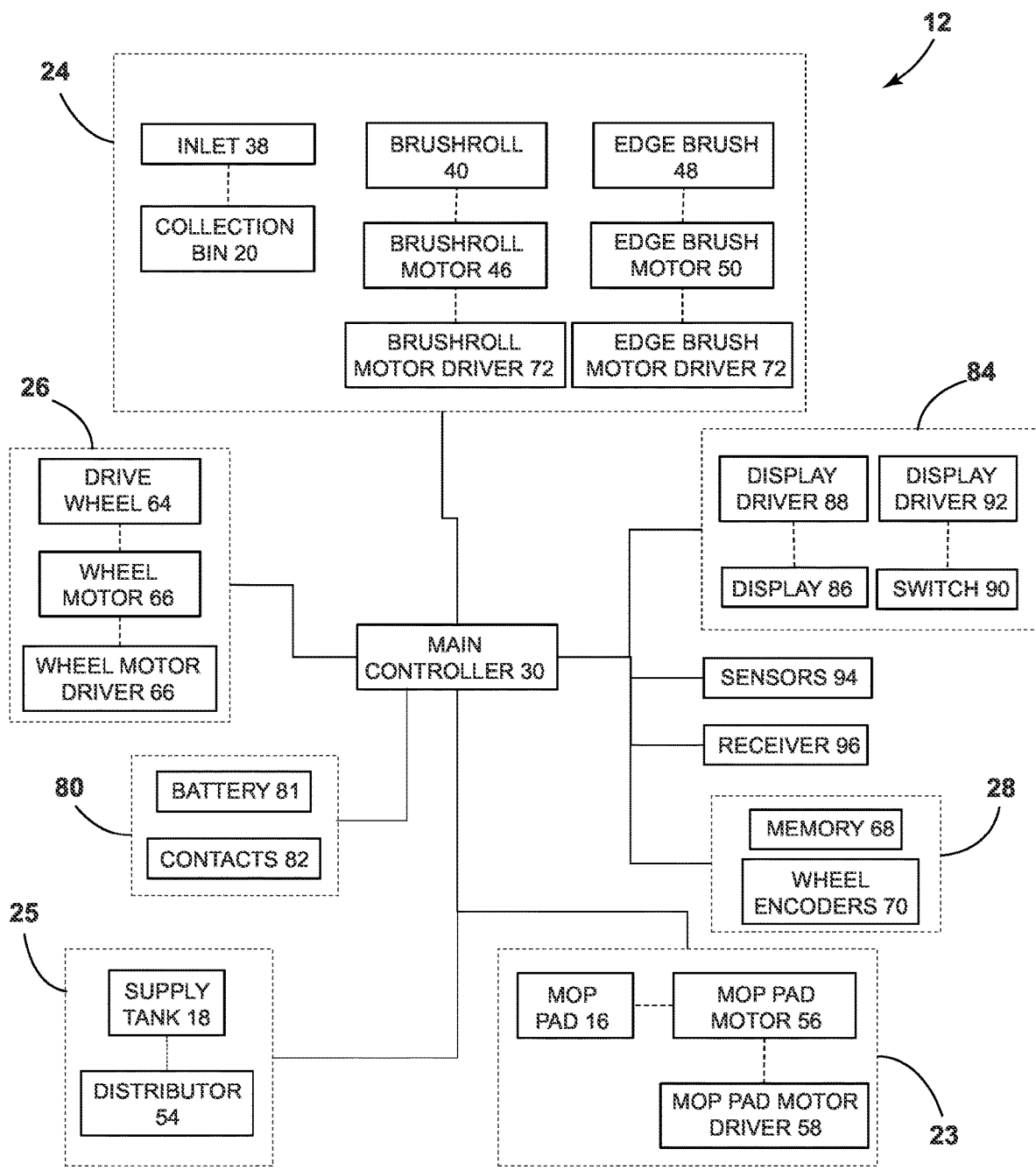
FIG. 3 is a schematic view of the robot from FIG. 1.

The docking station 14 can recharge a power supply of the robot 12 (e.g. battery 81). Electrical contacts or charging contacts 112 are disposed on the housing 100 and are adapted to mate with the charging contacts 82 on the exterior surface of the robot 12 to charge the battery 81 (FIG. 3). In one example, the docking station 14 can be connected to a household power supply, such as an A/C power outlet, and can include a converter for converting the AC voltage into DC voltage for recharging the power supply on-board the robot 12. The control system 102 takes the input power supplied to the docking station 14 by a power supply connector or socket 114 and provides a suitable output voltage and current to the robot 12 via the charging contacts 112. The socket 114 can be provided on the backstop 106, or other portion of the housing 100. for connection of the docking station 14 to a household power supply via a power cable (not shown) which can include the converter for converting the AC voltage into DC voltage.

The platform 104 includes a rearward portion 108 and a forward portion 110, with the backstop 106 located along the rearward portion 108. The robot 12 can dock by driving at least partially onto the platform 104, optionally until the robot 12 meets the backstop 106. The platform 104 may be substantially planar, with the rearward portion 108 and the forward portion 110 generally level with each other to support the robot 12 in a horizontal orientation with respect to the floor surface on which the docking station 14 rests. The forward portion 110 may include a ramp 116 to enable the robot 12 to drive up and onto the platform. The ramp 116 may comprise a forward edge of the forward portion 110 that slopes downwardly.

The charging contacts 112 of the docking station 14 can be located on the platform 104, such as on a rearward portion 108 of the platform 104, allowing them to contact corresponding contacts 82 on the underside 44 of the robot 12 when the robot 12 drives onto the platform 104. Alternatively, the charging contacts 112 can be provided on the backstop 106, or other portion of the housing 100.

In one embodiment, positive and negative charging contacts 112 are utilized to detect a completed circuit when the robot 12 docks with the docking station 14. In other embodiments, a single charging contact 112 or more than two charging contacts 112 may be utilized. An additional charging contact would provide redundancy in the event that one of the other charging contacts becomes dirty, obstructed, or damaged.

The mating between the electrical contacts 82 on the robot 12 and the electrical contacts 112 of the docking station 14 can enable communication between the control system on the robot 12 and a corresponding control system of the docking station 14. In other examples, the communication between the robot 12 and the docking station 14 is provided over an infrared (IR) communication link. In still other embodiments of the docking station 14, additional contacts may be used to transmit data and information between the robot 12 and docking station 14.

For refilling the robot's supply tank 18 and cleaning the mopping pads 16, the docking station 14 can include a storage tank 120 configured to hold a supply of cleaning fluid, and a refilling mechanism 122 that refills the robot's supply tank 18 with cleaning fluid from the storage tank 120. The cleaning fluid can be a liquid such as water or a cleaning solution specifically formulated for cleaning the mopping pads 16.

The storage tank 120 can be provided on the platform 104 or elsewhere on the housing 100 of the docking station 14. The storage tank 120 can be removable from the docking station 14 for refilling, or have a fill opening to be refillable on the docking station 14. The capacity of the storage tank 120 may be sufficient to refill the robot's supply tank 18 at least once, and preferably multiple times.

The refilling mechanism 122 can include a connector port, also referred to herein as dispensing port 124 on the docking station 14 configured to couple with a refill port 126 (FIG. 4) on the robot 12 and a discharge path including at least one supply conduit 128 or other structure for conveying liquid from the storage tank 120 to the connector port 124. When docked on the platform, a fluid connection is established between the connector port 124 and the refill port 126. This connection can be made automatically, e.g. without user intervention. In some embodiments, the connection may be passively made between the docking station 14 and robot 12, such as during the driving action of the robot 12 onto the docking station 14. In other embodiments, the connection may be actively made, such by using motors, solenoids, and the like, to move one or both of the ports 124, 126 into engagement. The docking station 14 can include features that assist in alignment of the robot 12 to the connector port 124 or other elements, either through mechanical or electrical means.

The refilling mechanism 122 can include appropriate flow control components to control the distribution of cleaning fluid from the storage tank 120. Such flow control components may include a pump, valves, conduits, tubing, and the like. In the embodiment of FIG. 6, the refilling mechanism 122 can be gravity-fed, and the docking station 14 can include a valve 130 for closing the flow of fluid through the supply conduit 128 when the robot 12 is not docked with the docking station 14 and/or when the docking station 14 is not refilling the robot 12. The valve 130 can be configured to open automatically when the robot 12 requires refilling. In one example, the valve 130 can be an electromechanically operated solenoid valve that opens by an electric current through a solenoid.

For a gravity-fed refilling mechanism 122 the storage tank 120 can be arranged vertically with the discharge path, including with the valve 130 and conduit 128, so that liquid can be conveyed through the discharge path by gravity feed due to hydrostatic pressure in the tank 120. In such a system, the refill port 126 may be provided on an upper side of the robot 12, with the connector port 124 engaging the refill port 126 from a top side of the robot 12.

Figure 9:
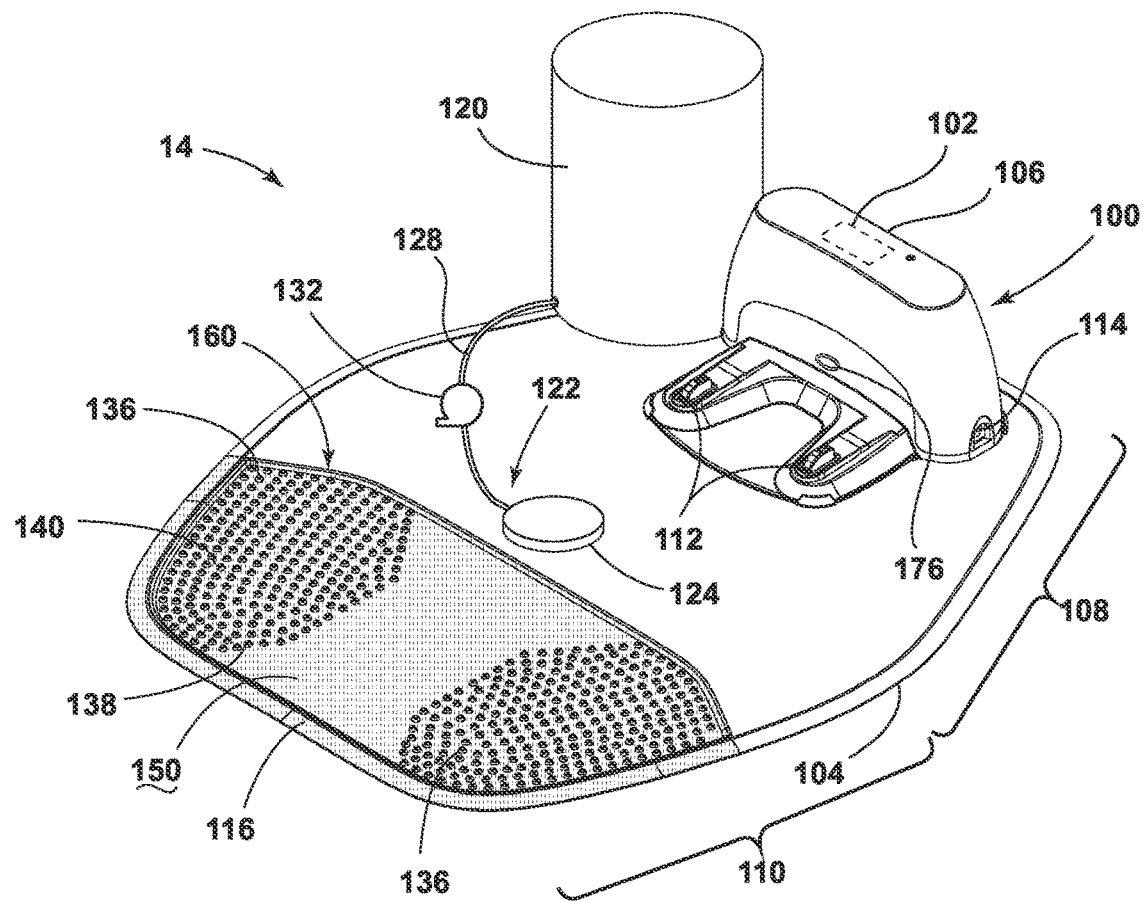
FIG. 9 is a perspective view of another embodiment of a docking station.

In another embodiment of the docking station 14 shown in FIG. 9, the docking station 14 can include a pump 132 provided in the fluid pathway between the storage tank 120 and the connector port 124 to move fluid to the robot's supply tank 18. The pump 132 can be configured to activate to refill the supply tank 18.

Regardless of the flow control components, the refilling mechanism 122 can move cleaning fluid from the storage tank 120 to the supply tank 18 until the supply tank 18 is full. This can be determined by sensors that detect when the robot's supply tank 18 is full and/or that detect when the supply tank 18 is empty.

Figure 7:
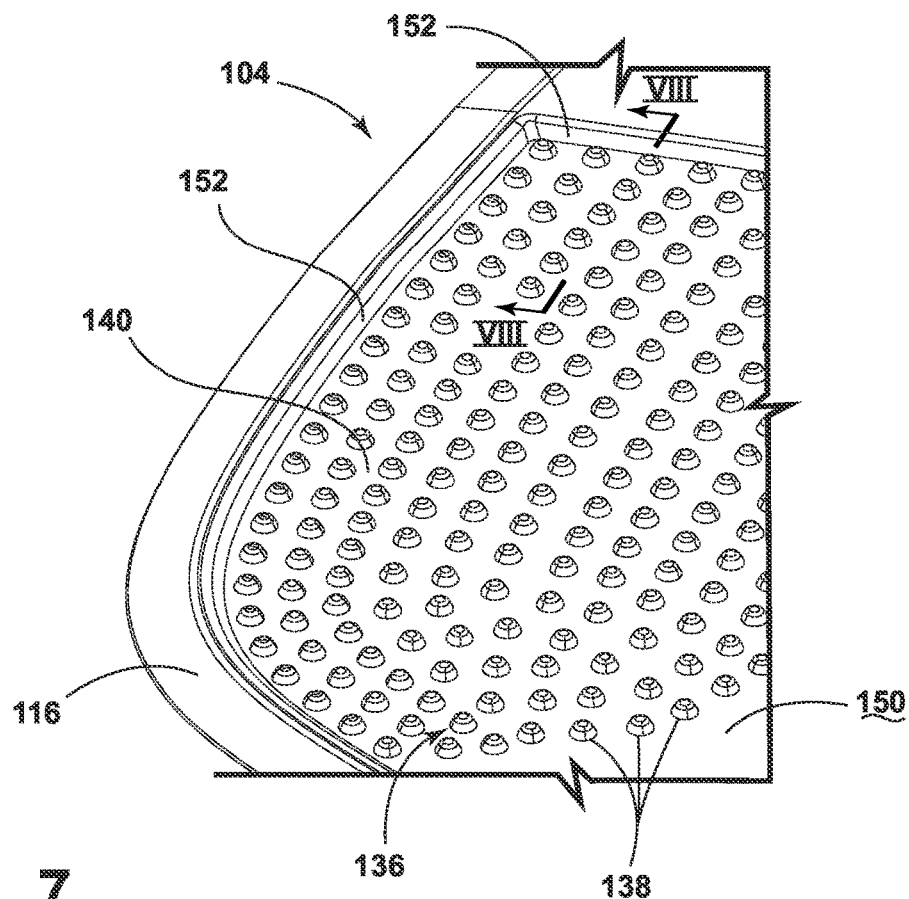
FIG. 7 is a close up perspective view of a scrubbing feature of the docking station from FIG. 6.
Figure 8:
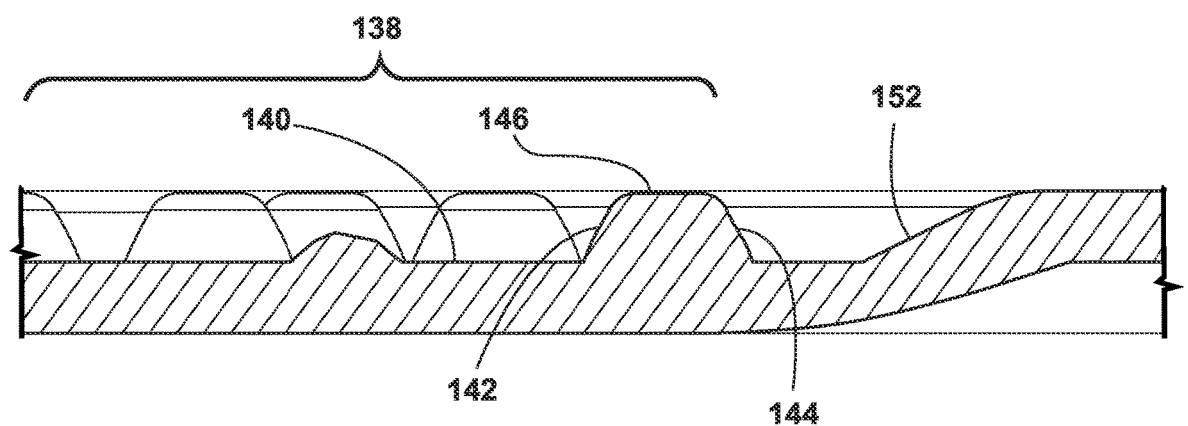
FIG. 8 is a sectional view through a portion of the scrubbing feature, taken through line VIII-VIII of FIG. 7.

The docking station 14 includes at least one scrubbing feature configured to engage at least one mopping pad 16 on the robot 12 when docked for physically scrubbing or agitating the mopping pads 16 on the robot 12. As shown in FIGS. 6-8, the docking station 14 can comprise scrubbers 136, which can be provided on the platform 104 in a position to engage the mopping pads 16 on the underside 44 of the robot 12 when the robot 12 is docked with the docking station 14. In another embodiment, for example when a pad or other agitation element to be cleaned extends from a lateral side of the robot 12, a scrubbing feature can be provided on the backstop 106.

The scrubbers 136 can comprise a plurality of raised elements 138, such as nodules, nubs, bristles, paddles, blades, and the like, extending away from a nominal supporting surface or base 140 on the platform 104 to engage with the pads 16. In another embodiment, the raised elements 138 can comprise a textured pattern on the base 140. The size, shape, density, and distribution of the raised elements 138 provides a highly favorable texture for washing the mopping pads 16.

With reference to FIGS. 7-8, the raised elements 138 for the scrubbers 136 can comprise rounded nodules 142 distributed over the base 140. The nodules 142 are approximately conical in shape, with a conical sidewall 144 and a rounded truncated end 146. Other shapes for the nodules 142 are possible, including hemispherical, cylindrical, and pyramidal. The nodules 142 may be homogenous, e.g. identical in size and shape, or may differ in size and/or shape across the base 140. In one embodiment of the docking station 14, the nodules 142 have a height of 2-12 mm in a direction away from and normal to the base 140 and have a diameter of 2-20 mm at the base 140 and a diameter of 1-10 mm at the end 146.

Rotation of the mopping pads 16 over the scrubbers 136 exposes the pad material to the raised elements 138. The vertical orientation of the raised elements 138 facilitates a vigorous scrubbing motion to the horizontal mopping pads 16. The nodules 142 can apply pressure areas of the mopping pad 16 to penetrate the pad material with cleaning fluid, while minimizing the potential for damage to the mopping pad during cleaning. The nodules 142 increases the area of contact with the mopping pads 16 and improves the scrubbing action, resulting in more efficient removal of debris and dirt from the pads 16.

The scrubbers 136, including the raised elements 138, and/or the supporting surface 140 can comprise antimicrobial silicone to kill and/or stop the growth of microorganisms, while being water impermeable and providing structural integrity and flexibility. In other embodiments, the entire platform 104 can comprise antimicrobial silicone. Other silicone rubbers or suitable elastomers are also possible. The raised elements 138 and the supporting surface 140 can be formed as a single piece, for example by molding or additive manufacturing.

The docking station 14 can include a reservoir 150 on the platform 104 that is aligned with the mopping pads 16 for collecting the cleaning fluid used to clean the mopping pads 16. Such cleaning fluid is dispensed from the robot's supply tank 18 in connection with the pad cleaning cycle, additional details of which are described below. In addition to receiving cleaning fluid dispensed from the supply tank 18, the reservoir 150 may retain cleaning fluid that drips off the mopping pads 16, or that leaks from the fluid distributor 54 while the robot 12 is docked with the docking station 14.

The scrubbers 136 can be disposed within and surrounded by the reservoir 150. The reservoir 150 can be basin-shaped to collect cleaning fluid within the confines of the reservoir 150. One reservoir 150 for both scrubbers 136 and mopping pads 16 can be provided. Alternatively, individual reservoirs 150 for each scrubber 136 and mopping pad 16 can be provided.

The reservoir 150 can have a raised lip or edge 152 around the perimeter thereof to define the confines of the reservoir 150. The supporting surface 140 may form a bottom of the reservoir 150 and the raised edge 152 may form a side of the reservoir 150. The raised elements 138 may be substantially even with the raised edge 152 of the reservoir 150. In other embodiments, the raised elements 138 may project beyond the raised edge 152.

Figure 10:
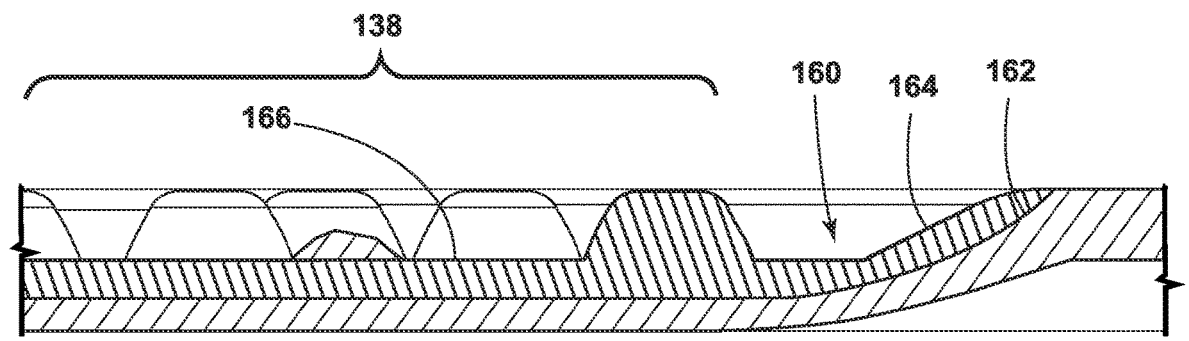
FIG. 10 is a sectional view through a portion of the docking station from FIG. 9, showing details of a scrubbing feature provided on a removable insert.

Referring to FIGS. 9-10, in this embodiment, the docking station 14 comprises a removable insert 160 including the scrubbers 136 and defining the reservoir 150. The insert 160 can be easily lifted out of a recess 162 on the platform 104 and cleaned. The insert 160 can be basin-shaped to contain liquid, and may include a raised edge or lip 164 surrounding a nominal supporting surface or base 166 from which the raised elements 138 extend. The insert 160 can be flexible to allow the basin-shape to be reversed when removed for cleaning, spreading the raised elements 138 apart so that the scrubber 136 can be fully rinsed out. The insert 160 can comprise antimicrobial silicone. One insert 160 for both mopping pads 16 can be provided. Alternatively, individual inserts 160 for each mopping pad 16 can be provided.

When the robot 12 is docked at the docking station 14, a pad cleaning cycle can be executed by either, or a combination of, the controller 30 of the robot 12 and the controller 102 on the docking station 14. For example, when the electrical contacts 82, 112 are properly mated, the docking station 14 can issue a command to the robot 12 to initiate rotation of the mopping pads 16. In some examples, the control system 102 sends a communication to the robot 12 and will only initiate the pad cleaning cycle if the control system 102 receives a response to this communication from the robot 12. Additionally or alternatively, when the electrical contacts 82, 112 are properly mated, the control system 102 can execute a charging operation to recharge the battery of the robot 12. In other examples, when the electrical contacts are properly mated, the robot 12 can issue a command to the docking station 14 to initiate the pad cleaning cycle. The robot 12 can transmit the command to the docking station 14 through electrical signals, optical signals, or other appropriate signals.

Also, when the electrical contacts 82, 112 are properly mated, the robot 12 is aligned with the docking station 14 so that the refilling operation can begin. For example, the connector port 124 of the docking station 14 aligns with the refill port 126 of the supply tank 18. Alignment between the connector port 124 and the refill port 126 establishes a flow path along which cleaning fluid can travel from the storage tank 120 of the docking station 14 to the supply tank 18 in the robot 12. As described herein, the cleaning fluid may flow via gravity feed (FIG. 6) or by action of the pump 132 (FIG. 9), for example.

During the pad cleaning cycle, the robot 12 dispenses cleaning fluid onto the mopping pads 16 while they rotate for a period of time to wash the pads 16. The cleaning fluid rinses the mopping pads 16 and collects in the reservoir 150. The reservoir 150 can be close to the mopping pads 16 such that the collected fluid is subject to some fan-driven evaporation while the pads 16 are turning. After a predetermined period of time, such as 1-3 minutes or when it is determined that the pads 16 are sufficiently cleaned, the cleaning cycle may end. Alternatively, the pads 16 can continue to rotate every once-in-a-while to facilitate drying.

The connection between the refill port 126 and the docking station's storage tank 120 may be open during the pad cleaning cycle in order to replenish the cleaning fluid dispensed for pad cleaning. In other embodiments, the refilling operation can be completed before or after the pad cleaning cycle.

After the pad cleaning cycle, wastewater remains in the reservoir 150. This wastewater can become malodorous if left on the docking station 14. To that end, the wastewater can be emptied by the user after each cleaning cycle, or emptied through an evaporative process, which beneficially minimizes the amount of human user intervention that is required. With an evaporative process, wastewater in the reservoir 150 changes from liquid to vapor, only leaving behind debris, which a user can clean at their leisure, and often only after multiple pad cleaning cycles.

The evaporative process can be passive or active. For a passive evaporative emptying process, the wastewater is left to evaporate naturally but quickly. Passive evaporation can be encouraged by maximizing the surface area of the recovered liquid that is exposed directly to ambient air and by minimizing the depth of the recovered liquid. Hence, the size of wastewater reservoir 150 (whether integral with the platform 104 as in FIG. 6 or formed as a basin portion of the insert 160 as in FIG. 9) can be configured or sized to account for the volume of liquid recovered during at least one typical cleaning cycle and to spread that recovered liquid across a relatively large area with minimal or shallow depth. In one embodiment, the reservoir 150 has a depth of 3-12 mm and can accommodate a volume of 30-120 mL without spillage.

In one embodiment of an active evaporative emptying process, evaporation may be encouraged through motion of the rotating pads 16. In another embodiment of an active evaporative emptying process, evaporation may be encouraged by operation of a fan 170 on the docking station 14 or robot 12. In yet another embodiment of an active evaporative emptying process, evaporation may be encouraged by operation of a heater 172 in the reservoir 150 or on the robot 12 in a position to heat the wastewater in the reservoir 150. To further encourage rapid evaporation, more than one of the aforementioned active evaporative emptying processes may be used, in any combination.

In the embodiment of FIG. 6, the fan 170 and heater 172 are shown schematically on the docking station 14. As noted above, the fan 170 and/or heater 172 may instead be disposed on the robot 12.

The wastewater reservoir 150 (whether integral with the platform 104 as in FIG. 6 or formed as a basin portion of the insert 160 as in FIG. 9) can have a capacity sufficient to receive a volume of liquid recovered during at least one typical cleaning cycle, and in some embodiments multiple cleaning cycles. The later may be preferred so that a user may run more than one cleaning cycle on the mopping pads 16 without having to manually empty the reservoir 150 or wait for the reservoir 150 to empty via one of the aforementioned evaporative processes. In one embodiment, a pad cleaning cycle dispenses 15-60 mL of cleaning fluid, and the reservoir 150 has a capacity to receive 30-120 mL of cleaning fluid.

In order to prevent overflow in case multiple cycles are run and the capacity of the reservoir 150 is exceeded, a sensor can detected when the reservoir 150 is at or near capacity, and send a signal to the robot 12 and/or to the docking station 14 that prevents another pad cleaning cycle from running. The sensor can be disposed on the robot 12 or on the docking station 14. In one embodiment, the docking station 14 can comprise an overflow portion in fluid communication with the reservoir 150, the overflow portion being configured to fill with wastewater when the reservoir 150 is at or near capacity, and a sensor on the robot 12 or on the docking station 14 can detect the presence or absence of wastewater in the overflow portion. A pad cleaning cycle can accordingly be prevented if wastewater is present in the overflow portion and enabled if wastewater is absent in the overflow portion. For example, the robot 12 can comprise an ultrasonic sensor for detecting floor type (e.g. carpet or hard floor), and this sensor can be used to additionally detect when the overflow portion contains wastewater.

In some embodiments, the robot 12 can determine that pad cleaning is required, and then return to the docking station 14 to clean the mopping pads 16. This can prevent the robot 12 from continuing to clean when the mopping pads 16 are too dirty to be effective. Dirtiness can be determined by sensors (e.g. sensors 94) on the robot 12 that detect how dirty the pads 16 are. Sensor input is used to determine that a threshold level of dirtiness is reached, upon which the robot 12 returns to the docking station 14 to clean the pads 16. In another embodiment, the robot 12 returns to the docking station 14 to clean the pads 16 after a predetermined operating time has been surpassed. In another embodiment, the robot 12 returns to the docking station 14 to clean the pads 16 when the supply tank 18 requires refilling. In another embodiment, the robot 12 returns to the docking station 14 to clean the pads 16 when the battery 81 requires recharging.

In some embodiments, the docking station 14 can determine whether pad cleaning is required when the robot 12 docks at the docking station 14. Dirtiness of the pads 16 can be determined by a sensor 174 on the docking station 14 or on the robot 12, or by a combination of sensors on the robot 12 and the docking station 14. Sensor input is used to determine that a threshold level of dirtiness is reached, upon which the pad cleaning cycle can commence. In another embodiment, the docking station 14 may clean the pads 16 after a predetermined operating time has been surpassed. Optionally, if the mopping pads 16 are found to be "clean" when the robot 12 docks with the docking station 14, the pad cleaning cycle does not initiate.

In some embodiments, the pad cleaning cycle can be initiated each time the robot 12 docks with the docking station 14. An activating switch 176 for controlling the pad cleaning cycle can be provided, and can be operable to move between an on and off position. When the activating switch 176 is on, the cleaning cycle begins. The activating switch is configured to be actuated, i.e. moved to the on position, when the robot 12 docks with the docking station 14. In one embodiment, the activating switch 176 can comprise an optical switch on the docking station 14 that is occluded by the robot 12 to indicate that the robot 12 is present.

In some embodiments, the pad cleaning cycle can be manually initiated. An input control 178 for the pad cleaning cycle can be provided on the robot 12, the docking station 14, and/or on a smart device application executed on a mobile or remote device. In the embodiment of FIG. 6, the input control 178 is provided on the docking station 14. For some embodiments of the system 10, a combination of automatic and manual initiation options for the pad cleaning cycle may be provided.

In some embodiments, a pad cleaning cycle can be run at predetermined intervals during a wet cleaning operation by the robot 12. For example the mopping pads 16 may be cleaned twice per wet cleaning operation.

In some embodiments, an override control can be provided on the robot 12, the docking station 14, and/or on a smart device application executed on a mobile or remote device for stopping or pausing the pad cleaning cycle. In the embodiment of FIG. 6, the input control 178 may function as an override control, whereby, if a pad cleaning cycle is on progress, pressing the control 178 will stop and/or pause the pad cleaning cycle.

Figure 11:
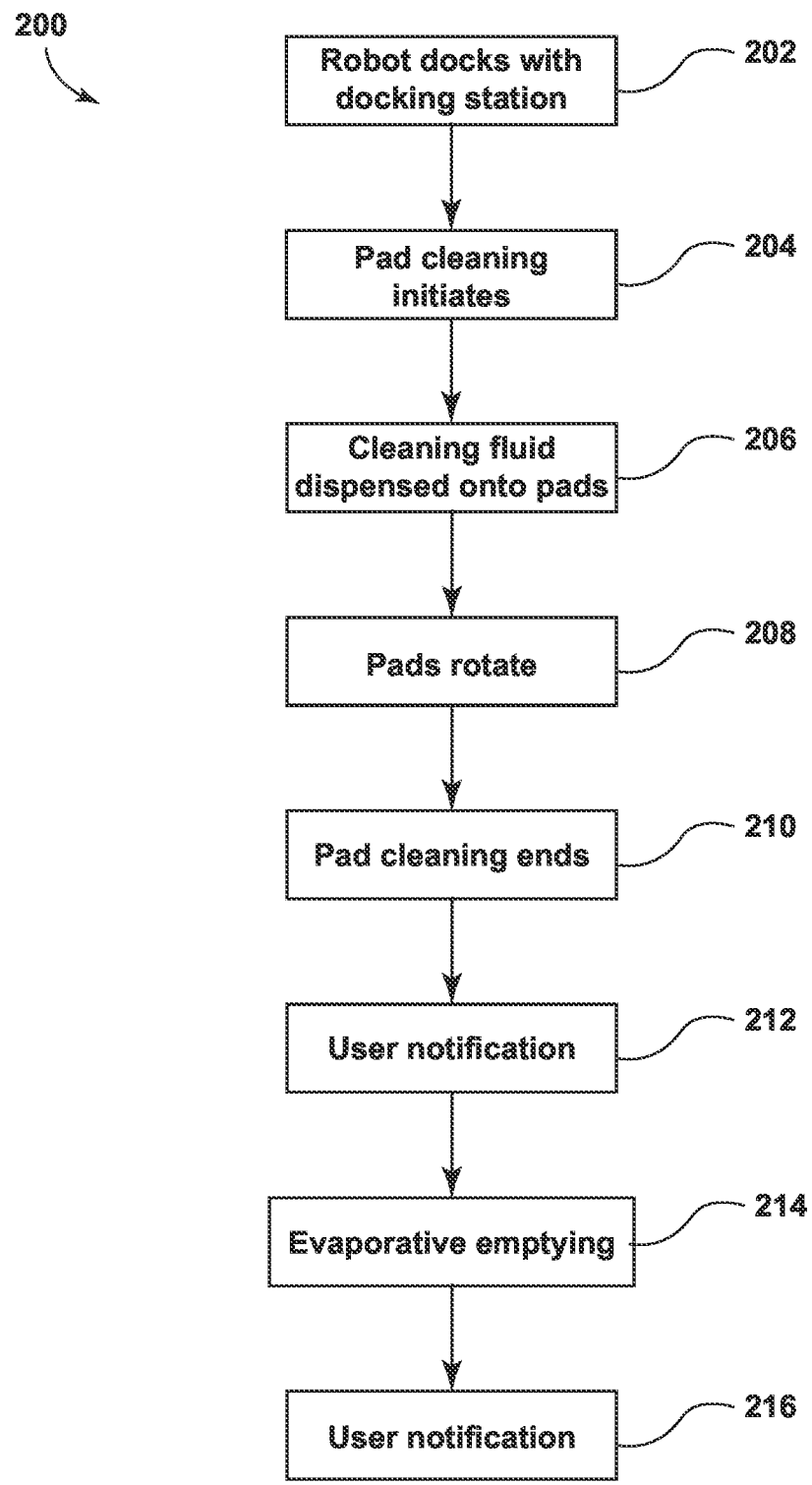
FIG. 11 is a flow chart showing one embodiment of a method for cleaning the mopping pads of the robot.

FIG. 11 is a flow chart showing one embodiment of a method 200 for servicing the robot 12 at the docking station 14. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

At step 202, the robot 12 docks with the docking station 14. The robot 12 docks with the docking station 14 upon a return-to-dock event, such as when cleaning is complete, when the battery 81 requires charging, the collection bin 20 (if present) requires emptying, the supply tank requires filling, the pads 16 require cleaning, and/or a user manually initiates a return-to dock.

At step 204, pad cleaning initiates. A pad cleaning cycle can be executed by the controller 102 of the docking station 14 and/or the controller 30 of the robot 12. It is noted that the pad cleaning cycle may be locked-out when the robot 12 is not docked with the docking station 14 to prevent inadvertent initiation of the pad cleaning cycle.

The pad cleaning cycle can automatically initiate upon docking the robot 12 on the docking station 14, optionally after a predetermined delay period. Alternatively, initiation of the pad cleaning cycle can be automatic, but dependent a predefined criterion. Alternatively, initiation of the pad cleaning cycle can be manual, with the user initiating the self-cleaning cycle by selecting input control 178 on the robot 12, the docking station 14, and/or on a smart device application. In any case, the pad cleaning cycle can be automatically executed after initiation at step 204, without requiring further user action.

At step 206, cleaning fluid is dispensed on the mopping pads 16 by the robot 12 or by the docking station 14. For example, in one embodiment, the fluid distributor 54 of the robot 12 can deposit cleaning fluid onto the mopping pads 16 at step 206. One or more flow control components of the robot 12 can be powered as part of step 206, such as a pump or a valve controlling the flow of cleaning fluid to the distributor 54.

Initiating the cleaning cycle at step 204 can power one or more components of the docking station 14. For example, at step 206 the refilling mechanism 122 can be powered to deliver cleaning fluid from the storage tank 120 to the robot's supply tank 18. In other embodiments, a refilling operation can be completed before or after the pad cleaning cycle.

At step 208, mopping pad motor 56 can be powered to rotate the mopping pads 16 through the reservoir 150 to scrub the pads 16 against the scrubbers 136. In one embodiment the motor 56 is powered continuously. In another embodiment, the motor 56 can pulse on/off intermittently. Optionally, the pads 16 can be rotated at slower or faster speeds to facilitate more effective wetting and/or shedding of debris.

At step 210, the cleaning cycle ends. The end of the cleaning cycle can be time-dependent. In other embodiments, the cleaning cycle can continue until the mopping pads 16 are determined to be clean. Optionally, at step 212, the robot 12, the docking station 14, and/or a smart device application executed on a mobile or remote device can alert the user that the cleaning cycle has ended, such as by providing a visual and/or audible user notification.

In one embodiment, the pad cleaning cycle can last a predetermined time or until a predefined criterion is met. This can prevent a user from trying to use the robot 12 when the mopping pads 16 are too dirty to be effective. Instead, the automatic pad cleaning cycle encourages the user to wait for the pads 16 to be clean before starting another floor cleaning cycle.

The evaporative emptying process can be automatically executed at step 214, after pad cleaning ends, and in some cases after a predetermined delay period. As described previously, the evaporative emptying process can be passive, active, or a combination thereof. In active evaporative emptying, the pad motor 56 can be powered to rotate the pads 16 to speed the evaporation of wastewater. The motor 56 can be run continuously or intermittently. The rotation of the pads 16 may further have the benefit of removing retained moisture in the pads 16 by centrifugal action. Optionally, the fan 170 energizes and generates a drying airflow directed toward the reservoir 150 to speed the evaporation of wastewater. The airflow may further have the benefit of evaporating any retained moisture in the pads 16. Optionally, a heat source or heater 172 can operate to heat the reservoir to speed the evaporation of wastewater. The heater 172 can be run continuously or intermittently. The heater 172 may further have the benefit of evaporating any retained moisture in the pads 16.

The end of the evaporative emptying process can be time-dependent. In other embodiments, the evaporative emptying process can continue until the reservoir 150 is determined to be empty of liquid. Optionally, at step 216, the robot 12, the docking station 14, and/or a smart device application executed on a mobile or remote device can alert the user that evaporation is complete, such as by providing a visual and/or audible user notification. After evaporative emptying, debris may remain in the reservoir 150. A human user can empty or wipe out this debris.

Any embodiment of a pad cleaning operation disclosed herein can include drying of the mopping pads 16 as part of pad cleaning. In one embodiment, after dispensing cleaning fluid onto the mopping pads 16 while they rotate for a period of time to wash the pads 16, the pads 16 may continue to rotate to facilitate drying the pads 16. The pad motor 56 may be operated intermittently to rotate the pads 16 every once-in-a-while or continuously for a period of time to dry the pads 16. In another embodiment, a forced air flow is applied to the pads 16, for example by the fan 170 used for evaporative emptying or by a separate pad drying fan on the docking station 14. In yet other embodiment, heat is applied to the pads 16, for example by the heater 172 used for evaporative emptying or by a separate pad heater on the docking station 14. To further encourage rapid drying, more than one of the aforementioned active drying processes may be used, e.g., pad rotating, forced air flow, and application of heat, in any combination.

Any embodiment of the docking station 14 disclosed herein can include an evacuation mechanism for emptying the collection bin 20 on the robot 12 when the robot 12 is docked with the docking station 14. In one embodiment, the evacuation mechanism can comprise a dirt dump feature that removes debris from the robot 12 into a larger container on the docking station 14. Optionally, the container can be lined with a plastic bag that is removed and disposed of when full.

In another embodiment, the docking station 14 can include an evacuation mechanism with drain plumbing for that removes liquid from the robot 12 into a larger container or household drain line. The evacuation mechanism can include connector port on the docking station 14 configured to couple with a drain port on the robot 12 and at least one conduit or other structure for conveying liquid and debris from the connector port to the container. When docked on the platform 104, a fluid connection is established between the connector port and the drain port. This connection can be made automatically, e.g. without user intervention. In some embodiments, the connection may be passively made between the docking station 14 and robot 12, such as during the driving action of the robot 12 onto the docking station 14. In other embodiments, the connection may be actively made, such by using motors, solenoids, and the like, to move one or both of the ports into engagement. The docking station 14 can include features that assist in alignment of the robot 12 to the connector port or other elements, either through mechanical or electrical means.

Liquid and debris transfer from the robot 12 to the docking station 14 can be achieved though gravity (drain) means or through active means (pump). The container on the docking station 14 which received liquid removed from the robot 12 may use evaporation to reduce the amount of dirty water, concentrating the dirt to solid form that can be accumulated thereby decreasing the amount of user interaction.

Figure 12:
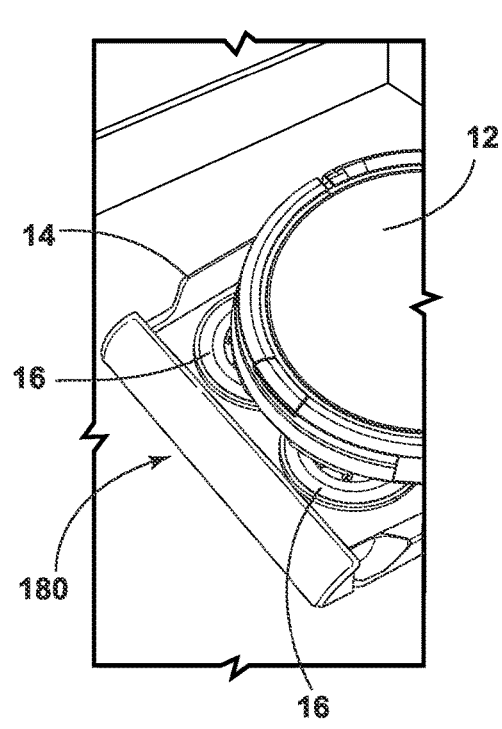
FIG. 12 is a perspective view of another embodiment of a docking station having a removable collection tray.
Figure 13:
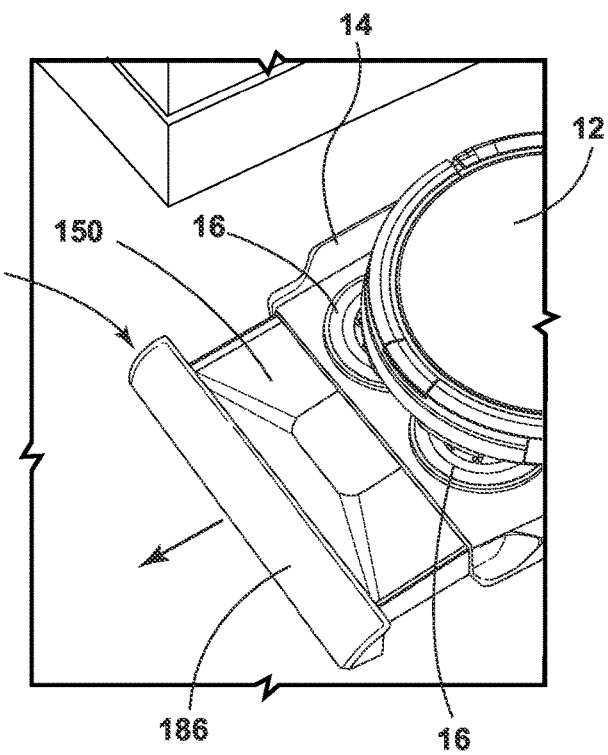
FIG. 13 is a perspective view of the docking station from FIG. 12 showing removal of the collection tray.
Figure 14:
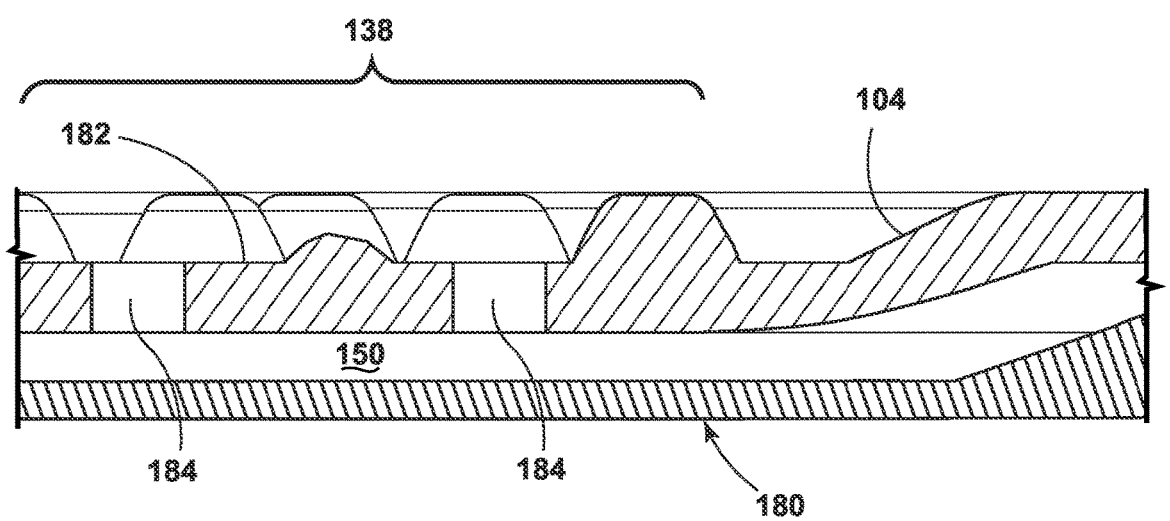
FIG. 14 is a sectional view through a portion of the docking station from FIG. 12, showing details of a collection tray and a scrubbing feature with drain openings.

FIGS. 12-14 show another embodiment of the docking station 14 comprising a removable collection tray 180 defining the reservoir 150 for collecting liquid and debris from pad cleaning. The collection tray 180 can be disposed below an upper wall 182 of the platform 104, which can include drain openings 184 for liquid to pass into the tray 180. The upper wall 182 may also define the base 140 from which the raised elements 138 of the scrubbers 136 extend. The collection tray 180 can slide out from the under the platform 104 for emptying and cleaning the tray 180. A handle 186 can be disposed on the front edge of the tray 180 for pulling the tray 180 outwardly as shown in FIG. 13. Thus, the collection tray 180 can be removed for emptying and cleaning without having to move the robot 12 off the docking station 14.

Figure 15:
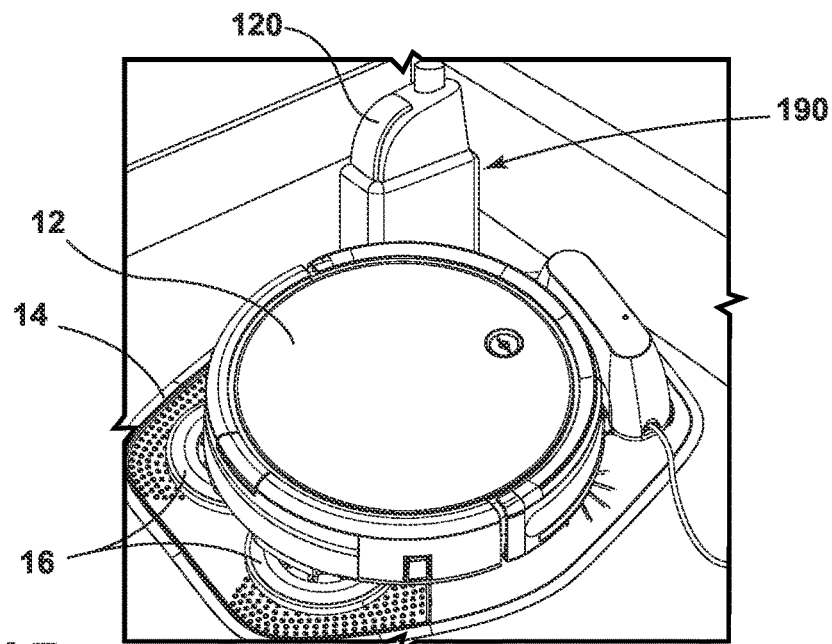
FIG. 15 is a perspective view of another embodiment of a docking station having a consumable storage tank.

FIG. 15 shows another embodiment of the docking station 14 comprising a consumable storage tank 120. The storage tank 120 can comprise a disposable container 190 holding a supply of cleaning fluid. When the supply of cleaning fluid is depleted, the disposable container 190 is removed from the docking station 14 for disposal, and a new disposable container 190 is installed.

Figure 16:
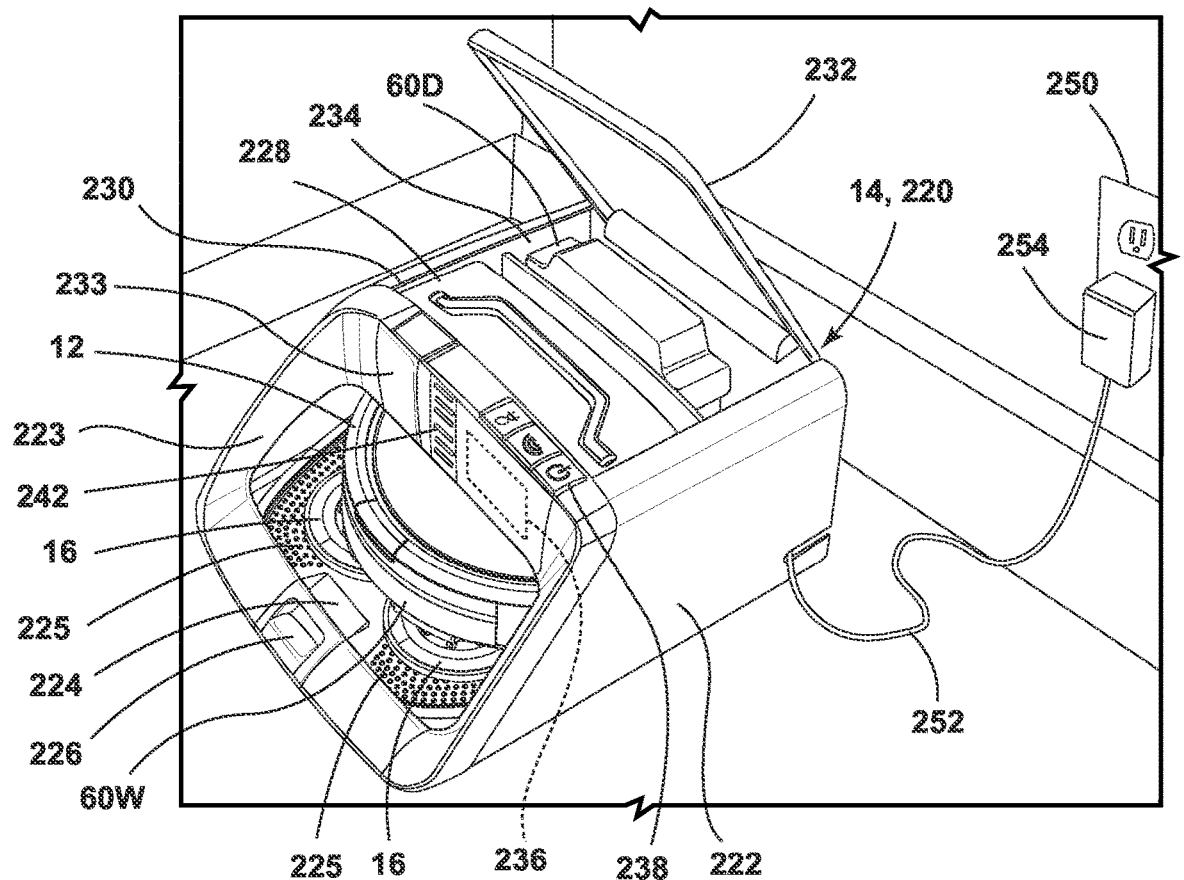
FIG. 16 is a perspective view of another embodiment of a docking station comprising an auto-maintenance garage.
Figure 17:
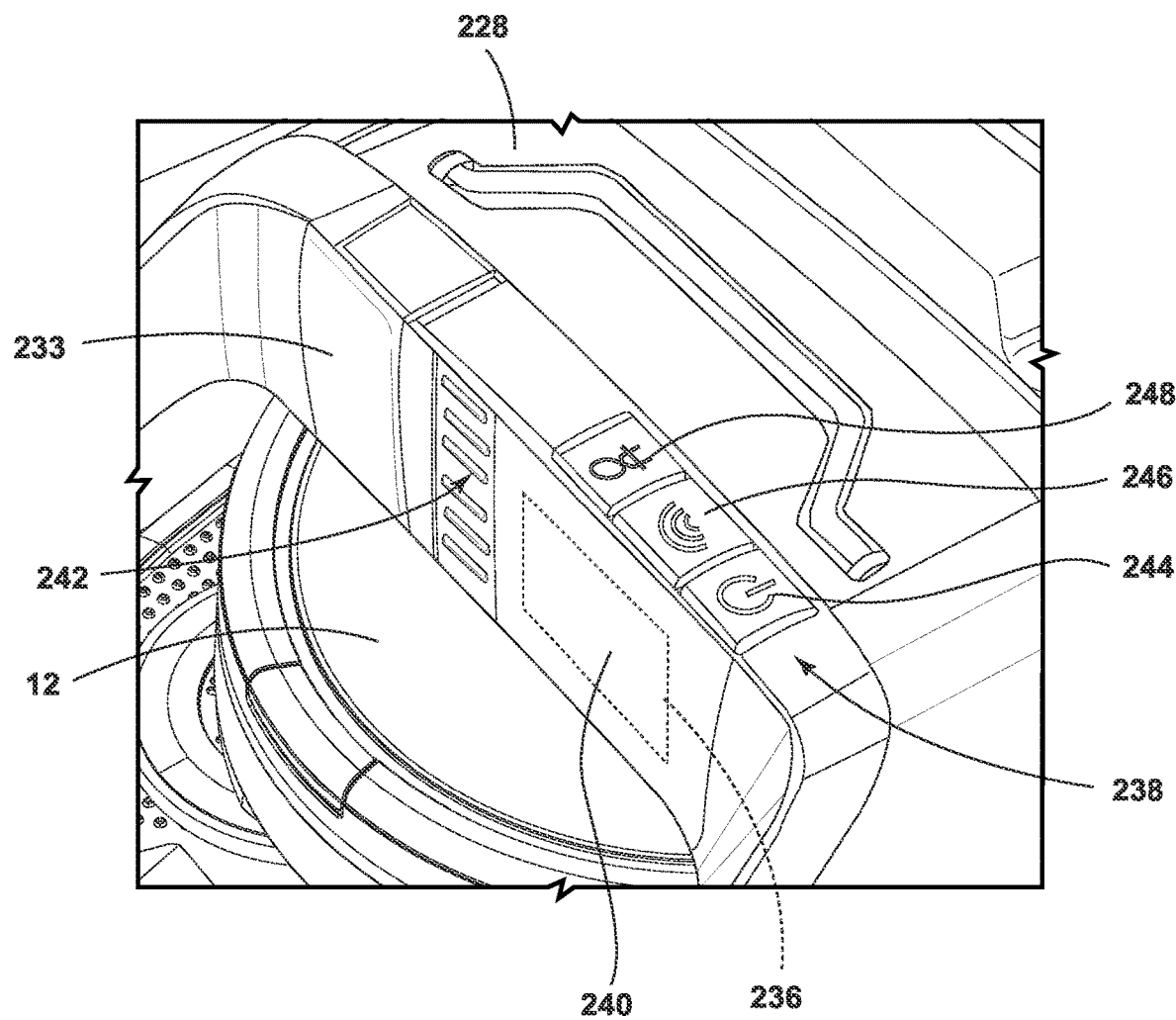
FIG. 17 is a close up perspective view of a user interface of the auto-maintenance garage from FIG. 16.

FIGS. 16-17 shows another of a docking station 14 comprising an auto-maintenance garage 220 for the robot 12. The garage 220 includes one or more of the following features: robot storage, robot charging, pad cleaning, supply tank refill, collection bin emptying, an expanded physical user interface, and accessory storage. Optionally, the garage 220 may also feature brushroll cleaning, edge brush cleaning, an easy empty debris tray, and/or cleaning fluid heating.

For robot storage, the garage 220 can include can include a housing 221 configured to rest on a floor surface and having an enclosure 222 configured to substantially receive the robot 12. The robot 12 can drive into the enclosure 222 through an entrance opening 223 to dock with charging contacts (not shown) for recharging the battery 81. A platform or floor 224 of the enclosure 222 can support the robot 12 when docked for charging, as well as having scrubbing features 225 for cleaning the mopping pads 16 and drain openings (not shown) into a debris tray 226.

The garage 220 can recharge a power supply of the robot 12 (e.g. battery 81). In one example, the garage 220 can be connected to a household power supply, such as an A/C power outlet 250, via a power cable 252, which can include a converter 254 for converting the AC voltage into DC voltage for recharging the battery 81. The garage 220 can also include various sensors and emitters (not shown) for monitoring a status of the robot 12, enabling auto-docking functionality, communicating with the of the robot 12, as well as features for network and/or Bluetooth connectivity.

For refilling the robot's supply tank 18, the garage 220 can include a storage tank 228 configured to hold a supply of cleaning fluid, and a refilling mechanism that refills the robot's supply tank 18 with cleaning fluid from the storage tank 228. When docked within the enclosure 222, a supply connection is established between the refilling mechanism and the robot 12. This connection can be made automatically, e.g. without user intervention.

The storage tank 228 can be removable from the garage 220 for refilling. The garage 220 can include a tank receiver 230 into which the storage tank 228 can be slid for connection with the refilling mechanism. An access door 232 can close over the tank receiver 230 to cover the storage tank 228. Alternatively or additionally, a fill cap 233 on the tank 228 can permit refilling the storage tank 228 on the garage 220.

The garage 220 can also include storage space for accessories for the robot 12, such as extra filters, brushrolls, edge brushes, mopping pads, modules, or tanks. In the embodiment shown, the garage 220 has a module receiver 234 into which an extra module, such as an extra wet or dry module 60W, 60D, can be stored. The access door 232 can close over the module receiver 234 to cover the extra module.

A controller 236 (indicated in phantom line) is operably coupled with the various functional systems of the garage 220 for controlling the operation of the garage 220. The controller 236 can be a microcontroller unit (MCU) that contains at least one central processing unit (CPU). The controller 236 is further operably coupled with a user interface (UI) 238 on the garage 220 for receiving inputs from a user. The UI 238 can be used to select a maintenance operation to be performed on the robot 12, such as cleaning the pads 16, refilling the supply tank 18, emptying the collection bin 20, or recharging the battery 81. Alternatively, one or more of these maintenance operations can be initiated automatically or on an as-needed basis when the robot 12 is docked. The UI 238 can optionally control the robot 12 as well, such as being used to start a cleaning operation of the robot 12, select an operation cycle for the robot 12, send the robot 12 away from the garage 220, command the robot 12 to come back to the garage 220, and the like.

The UI 238 can have a display 240, such as an LED display, for providing visual notifications to the user, and a speaker for providing audible notifications to the user. The UI 238 can, for example include an indicator 242 that communicates how full the robot's supply tank 18 is before, during, or after refilling.

In some embodiments, the UI 238 can include one or more input controls 244, 246, 248, such as a "go/pause" button 244 for starting and pausing a pad cleaning cycle, a "return to dock" button 246 to call the robot 12 back to the docking station 14 and a "mode" button 248 for initiating a cleaning mode or adjusting another operational parameter of the robot 12, such as suction level, for example. Likewise, the UI 84 on the robot 12 can include redundant control buttons, such as a "go/pause" button for starting and pausing a pad cleaning cycle, a "return-to-dock" button for initiating a docking process, and a "mode" button for initiating a cleaning mode or adjusting another parameter such as increased suction level or the like. Moreover, it is contemplated that all of these functions can also be configured to be controlled remotely via a smart device application executed on a mobile device.

FIGS. 18-32 show another embodiment of an autonomous floor cleaning system 10 including a docking station 14 comprising an auto-refill garage 270 for a robot 12. The garage 270 includes one or more of the following features: robot storage, robot charging, pad cleaning, supply tank refill, an expanded physical user interface, and accessory storage.

For robot storage, the garage 270 can include a housing 271 configured to rest on a floor surface and having an enclosure 272 configured to substantially receive the robot 12. The robot 12 can drive into the enclosure 272 through an entrance opening 274 to dock with charging contacts 276 for recharging the battery 81. In one embodiment, the garage 270 can be connected to a household power supply, such as an A/C power outlet, via a power cable (not shown) which can include a converter for converting the AC voltage into DC voltage for recharging the robot's battery 81 (FIG. 3). The garage 270 can also include various sensors and emitters (not shown) for monitoring a status of the robot 12, enabling auto-docking functionality, communicating with the robot 12, as well as features for network and/or Bluetooth connectivity.

The enclosure 272 can include a platform or floor 278, a ceiling 280 above the platform/floor 278, a back wall 282, and side walls 284, 286, with the floor 278, ceiling 280, and side walls 284, 286 defining the entrance opening 274 into the enclosure 272. A forward portion of the floor 278 may include a ramp 288 to enable the robot 12 to drive up and into the enclosure 272. The floor 278 can as large as, or larger than, the footprint of the robot 12, so that the robot 12 rests entirely on the floor 278 when docked. This elevates the robot 12 off the floor and can project the floor from damage, particularly if components of the robot 12 remain wet after use. The back wall 282 can function as a backstop for the robot 12 when docked.

The floor 278 of the enclosure 272 can include the charging contacts 276, which are adapted to mate with the charging contacts 82 (FIG. 4) on the underside 44 of the robot 12 when the robot 12 drives into the enclosure 272. Alternatively, the charging contacts 276 can be provided on the back wall 282, or other portion of the enclosure 272.

To dock, the robot 12 aligns itself with the entrance opening 274 to the enclosure 272, for example using one or more docking signals emitted from the garage 270 and the at least one receiver 96 (FIG. 3) of the robot 12. The garage 270 may be configured to emit a series of infrared light beams from one or more transmitters, the receiver 96 may comprise an infrared sensor on the robot 12.

The enclosure 272 is configured such that, when the robot 12 is docked in its final position, it is coupled to the charging contacts 276 and aligned in an "X" direction. Conceptually, a Cartesian coordinate system can be applied to the system 10, with an X-axis extending along a direction of travel in which the robot 12 moves primarily when docking, e.g. a direction toward the front of the garage 270 and into the enclosure 272. The Y-axis extends perpendicular to the X-axis and perpendicular to the direction of travel in which the robot 12 moves primarily when docking, e.g. a direction horizontally across the front of the garage 270. The Z-axis extends normal to the plane defined by the X-axis and the Y-axis. The X-axis and other axes parallel thereto define an "X-direction" of the system 10, the Y-axis and other axes parallel thereto define a "Y-direction" of the system 10, and the Z-axis and other axes parallel thereto define a "Z-direction" of the system 10. The X and Y directions may lie along or be parallel to the floor surface over which the robot 12 moves on and on which the garage 270 rests, and are therefore considered to be horizontal directions for the system 10 shown, with the Z direction being a vertical direction.

The mating between the electrical contacts 82 on the robot 12 and the electrical contacts 276 of the garage 270 can enable communication between the control system on the robot 12 and a corresponding control system of the garage 270. In other examples, the communication between the robot 12 and the garage 270 is provided over an infrared (IR) communication link. In still other embodiments of the garage 270, additional contacts may be used to transmit data and information between the robot 12 and garage 270.

Figure 19:
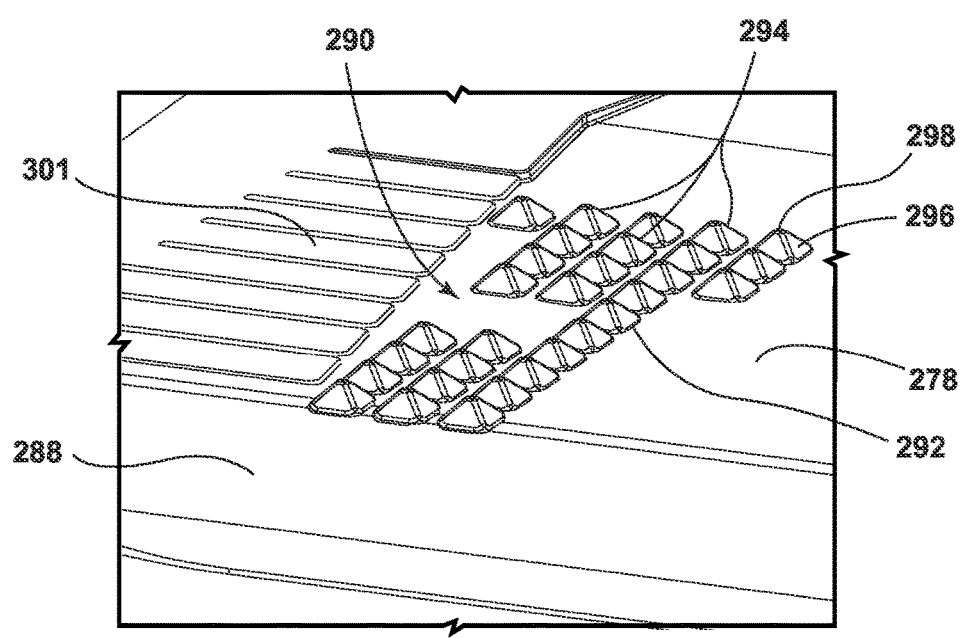
FIG. 19 is a close up perspective view of a scrubbing feature of the docking station from section XIX of FIG. 18.

The floor 278 of the enclosure 272 can have at least one scrubbing feature configured to engage the mopping pads 16 on the robot 12 when docked for physically scrubbing or agitating the mopping pads 16. Referring to FIG. 19, in one embodiment, the scrubbing feature can comprise scrubbers 290 in a position to engage the mopping pads 16 on the underside 44 of the robot 12 when the robot 12 is docked within the enclosure 272.

The scrubbers 290 can comprise a plurality of raised elements 292, such as nodules, nubs, bristles, paddles, blades, and the like, extending away from a nominal supporting surface or floor 278 to engage with the pads 16. The raised elements 292 of the illustrated embodiment comprise pyramidal nodules 294 having sloped sides 296 meeting at an apex 298. The nodules 294 may be homogenous, e.g. identical in size and shape, or may differ in size and/or shape across the floor 278. In one embodiment of the garage 270, the nodules 294 have a height of 2-12 mm in a direction away from and normal to the floor 278 and have a width of 2-20 mm at the floor 278 and a width of 1-10 mm at the apex 298.

The garage 270 can include a reservoir 300 on the floor 278 that is aligned with the mopping pads 16 for collecting the cleaning fluid used to clean the mopping pads 16. Such cleaning fluid is dispensed from the robot's supply tank 18 in connection with the pad cleaning cycle, embodiments of which have been described above. The scrubbers 290 can be disposed within and surrounded by the reservoir 300. The reservoir 300 can be basin-shaped to collect cleaning fluid within the confines of the reservoir 300.

In the illustrated embodiment, the scrubbers 290 and reservoir 300 are integrally formed with the floor 278 of the enclosure 272. In another embodiment, the scrubbers 290 and reservoir 300 are included on a removable insert for the floor 278.

Figure 18:
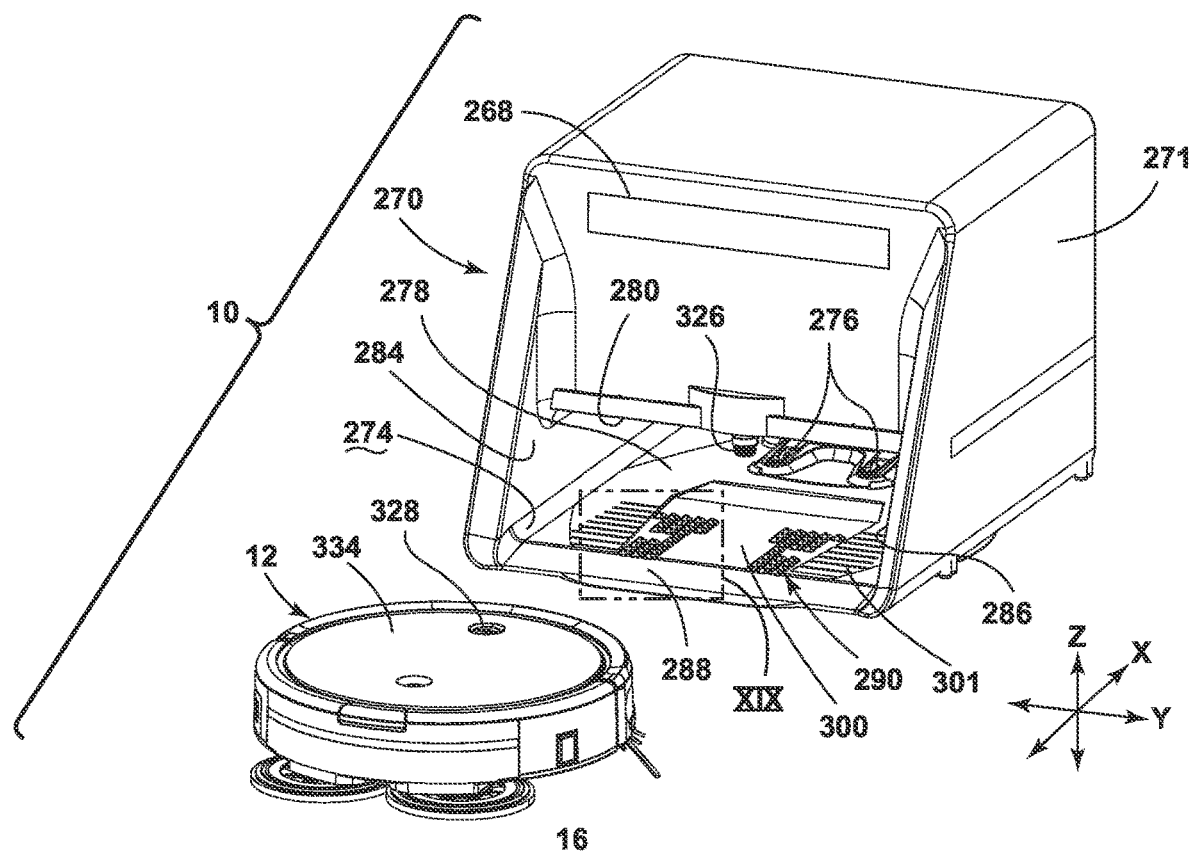
FIG. 18 is a side cross-section view of an auto-refill garage for docking, recharging, and refilling a robot, according to another embodiment of the invention.

When the robot 12 is docked at the garage 270, for example as shown in FIG. 18, a pad cleaning cycle can be executed. The pad cleaning cycle for the garage 270 can comprise any embodiment of a pad cleaning cycle disclosed herein, including a pad cleaning cycle combined with an evaporative emptying process and/or refilling of the supply tank 18, and including but not limited to, according to the pad cleaning method of FIG. 11. For evaporative emptying, features for passive or active evaporative emptying may be included in the garage 270, such as a shallow reservoir 300, a fan, and/or a heater.

The floor 278 of the enclosure 272 can have traction features 301 that can increase traction between the robot 12 and the floor 278 so that the robot 12 can navigate into the enclosure 272. The traction features 301 may disposed at the top of the ramp 288, such that when the robot 12 navigates up the ramp 288, the wheels 64 of the robot 12 align with the traction features 301 so that the robot 12 can more easily drive up and into the enclosure 272. The traction features 301 may be provided adjacent the scrubbers 290, such as being disposed outwardly or laterally of the scrubbers 290, such that the traction features 300 are disposed between the scrubbers 290 and the sidewalls 284, 286 of the enclosure 272. The traction features 301 may be disposed outside the reservoir 300 as shown, or inside the reservoir 300. In some embodiments, the traction features 301 may also act as scrubbing features by physically scrubbing or agitating the mopping pads 16 on the robot 12 during pad cleaning.

The garage 270 can comprise a user interface (UI) 268 used to select a maintenance operation to be performed on the robot 12, such as cleaning the pads 16, refilling the supply tank 18, emptying the collection bin 20, or recharging the battery 81. Alternatively, one or more of these maintenance operations can be initiated automatically or on an as-needed basis when the robot 12 is docked. The UI 268 can optionally control the robot 12 as well, such as being used to start a cleaning operation of the robot 12, select an operation cycle for the robot 12, send the robot 12 away from the garage 270, command the robot 12 to come back to the garage 270, and the like.

For refilling the robot's supply tank 18, the garage 270 can include a storage tank 302 configured to hold a supply of cleaning fluid, and a refilling mechanism 304 that refills the robot's supply tank 18 with cleaning fluid from the storage tank 302. When docked within the enclosure 272, a supply connection is established between the refilling mechanism and the robot 12. This connection can be made automatically, e.g. without user intervention. In this embodiment, the connection is made actively after the robot 12 docks in the garage 270.

The capacity of the storage tank 302 may be sufficient to refill the robot's supply tank 18 at least once, and preferably multiple times. The storage tank 302 can be removable from the garage 270 for refilling. The garage 270 can include a tank receiver 308 into which the storage tank 302 can be slid for connection with the refilling mechanism. The storage tank 302 includes a chamber 310 for holding cleaning fluid and a tank valve 312 controlling fluid flow through an outlet of the tank 302. The tank valve 312 mates with a valve receiver 314 on the garage 270 and can be configured to automatically open when the storage tank 302 is seated in the tank receiver 308 to release fluid to a discharge path fluidly coupling the valve receiver 314 with the refilling mechanism 304. The storage tank 302 can be arranged vertically with the discharge path, with the tank valve 312 at a bottom end of the tank 302, so that liquid can be conveyed through the discharge path by gravity feed due to hydrostatic pressure in the tank 302.

The garage 270 can include a cabinet 318 above the enclosure 272, e.g. arranged in a vertical direction over the enclosure 272, with the cabinet 318 including the tank receiver 308 and including space for holding the storage tank 302. An access door 320 can close the cabinet 318 to cover the storage tank 302.

The garage 270 can also include an accessory storage area 322 for accessories for the robot 12, such as extra filters, brushrolls, edge brushes, or tanks. In the embodiment shown, the accessory storage area 322 comprises a module receiver 324 into which an extra module, such as an extra wet or dry module 60W, 60D, can be stored. The access door 320 can close over the module receiver 324 to cover the extra module, shown herein as an extra wet module 60W, as well as the storage tank 302.

The refilling mechanism 304 can comprises an automatic alignment and coupling mechanism for establishing a supply connection between the refilling mechanism and the robot 12. The automatic alignment and coupling mechanism provides accurate alignment between a dispensing port 326 on the garage 270 and a refill port 328 on the robot 12. This prevents misalignment and leaks when the robot 12 is docked at the garage 270 for refilling, as the robot 12 may not always dock itself with precision relative to the refilling mechanism 304. The refilling mechanism 304 is preferably gravity-fed, as this offers a simple mechanism by which refilling can be stopped when the robot's tank is full, as described in more detail below.

In one embodiment, the refilling mechanism 304 can comprise the storage tank 302, a dispensing port 326 configured to couple with a refill port 328 on the robot 12, the discharge path, and an indexable arm 330 carrying the dispensing port 326, the indexable arm 330 configured to automatically align the dispensing port 326 with the refill port 328, for example based on sensor input. A fluid flow path through the ports 326, 328 remains closed until the ports 326, 328 are aligned. The arm 330 carries a mechanism that opens the fluid flow path through the ports 326, 328 once the ports 326, 328 are aligned.

A controller 332 (FIG. 21) is operably coupled with the refilling mechanism 304 of the garage 270 for controlling the operation of the refilling mechanism 304. The controller 332 can comprise logic control electronics for controlling the operation of the arm 330 and plunger 340. The controller 332 can be a microcontroller unit (MCU) that contains at least one central processing unit (CPU). The controller 332 may operably coupled with the UI 268 on the garage 270 for receiving inputs from a user. The controller 332 may also receive input regarding the state of the storage tank 302, for example whether it is full, empty, present on the garage 270, or absent on the garage 270, and operate the refilling mechanism 304 or not operate the refilling mechanism 304 accordingly. For example, if the tank 302 is empty or missing, the controller 332 can provide a user notification via the UI 268 or via a remote device such as a smartphone.

The dispensing port 326 on the garage 270 mates or otherwise couples with the refill port 328 dispensing the robot 12, which opens into or is otherwise fluidly connected with the supply tank 18. The refill port 328 may, as shown in FIG. 18, be provided on a top side 334 of the robot 12, with cleaning fluid flowing by gravity from the refill port 328 into the supply tank 18. Accordingly, the dispensing port 326 may depend from the ceiling 280 of the enclosure 272, such that when the robot 12 drives into the enclosure 272 and docks, the refill port 328 is below the dispensing port 326.

To close the fluid flow path through the ports 326, 328 until the ports 326, 328 are aligned, one or more valves may be provided. In one embodiment, a first valve 336 is provided in the discharge path of the garage to control the flow of fluid through the dispensing port 326. The first valve 336 can be normally closed in order to prevent leakage from the dispensing port 326, particularly when the robot 12 is not docked or when the robot 12 is in the process of entering or leaving the enclosure 272. The refill mechanism operates to open the first valve 336 after the robot 12 is docked with the garage 270, and to close the first valve 336 while the robot 12 is still docked with the garage 270, as explained in further detail below.

The robot 12 can include a second valve 338 at the refill port 328 to control the flow of fluid into the supply tank 18. The second valve 338 can be normally closed in order to prevent leakage from the robot 12 and to prevent debris or dirty liquid from entering the supply tank 18 and mixing with the cleaning fluid. Like the first valve 336, the refill mechanism operates to open the second valve 338 after the robot 12 is docked with the garage 270 and to close the second valve 338 while the robot 12 is still docked with the garage 270, as explained in further detail below.

In some embodiments, the first valve 336 may open after the second valve 338 opens. This opens the flow path into the robot's supply tank 18 first, ensuring that the robot 12 is ready to receive cleaning fluid. In other embodiments, the first and second valves 336, 338 may open at substantially the same time.

Once refilling is complete, in some embodiments, the first valve 336 may close before the second valve 338 closes. This closes the flow path out of the garage 270 first, ensuring that cleaning fluid does not leak. In other embodiments, the first and second valves 336, 338 may close at substantially the same time.

As noted above, the arm 330 carries a mechanism that opens the fluid flow path through the dispensing port 326 once the ports 326, 328 are aligned. The mechanism can, as shown in the figures, comprise a vertically-moveable plunger 340. The plunger 340 is coupled with the dispensing port 326, such that as the plunger 340 moves up or down, the entire dispensing port 326 moves with it. During operation, indexing of the arm 330 moves the plunger 340 into alignment with the refill port 328. The plunger 340 then moves down to couple the dispensing port 326 with the refill port 328. During this coupling, the valves 336, 338 open, as described in further detail below, and cleaning fluid flows through the discharge path, the coupled ports 326, 328, and into the supply tank 18.

Figure 21:
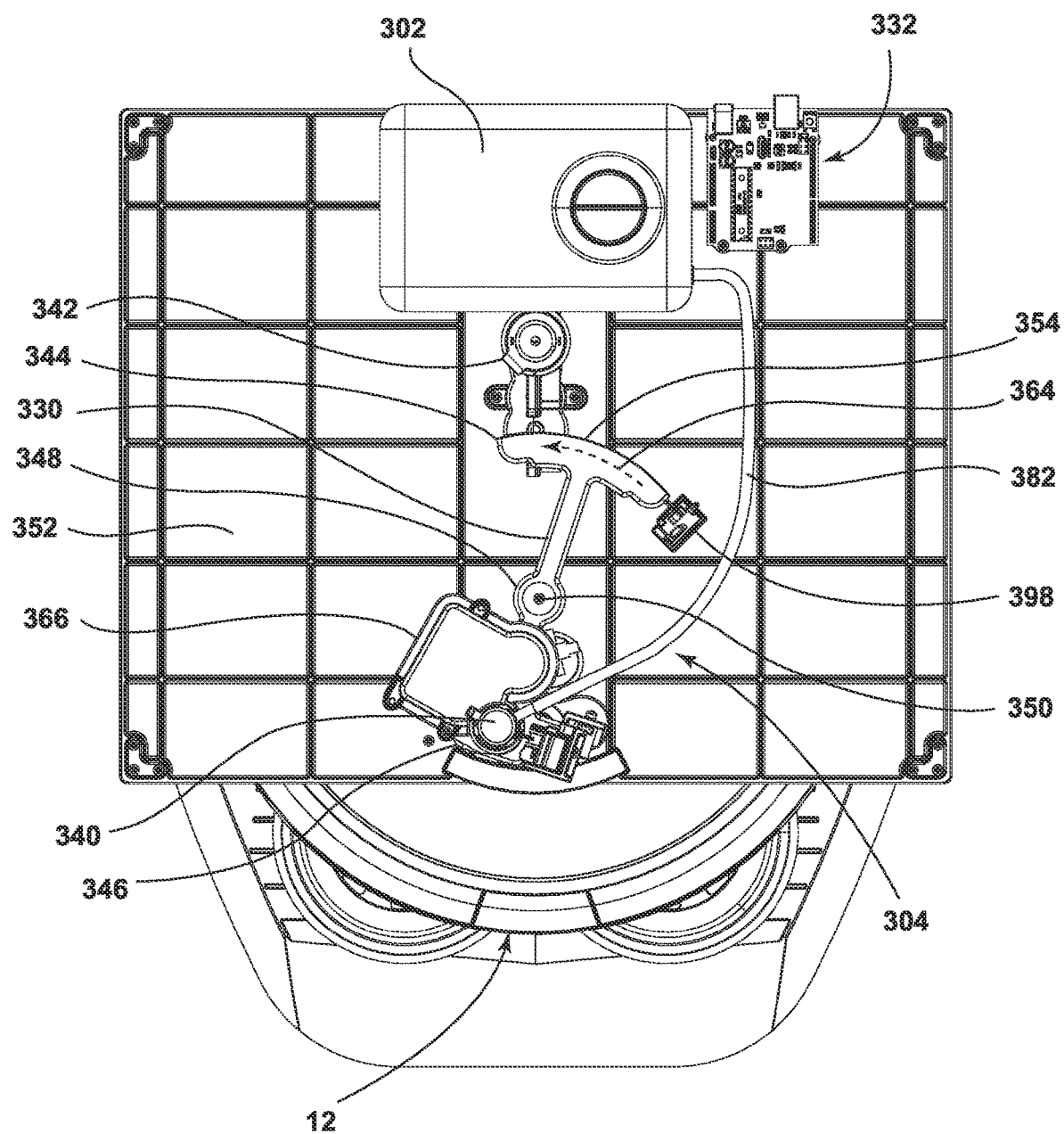
FIG. 21 is a top view of the auto-refill garage from FIG. 18, with an upper portion of the garage removed to show a refilling mechanism, with an arm of the refilling mechanism in a home position.
Figure 22:
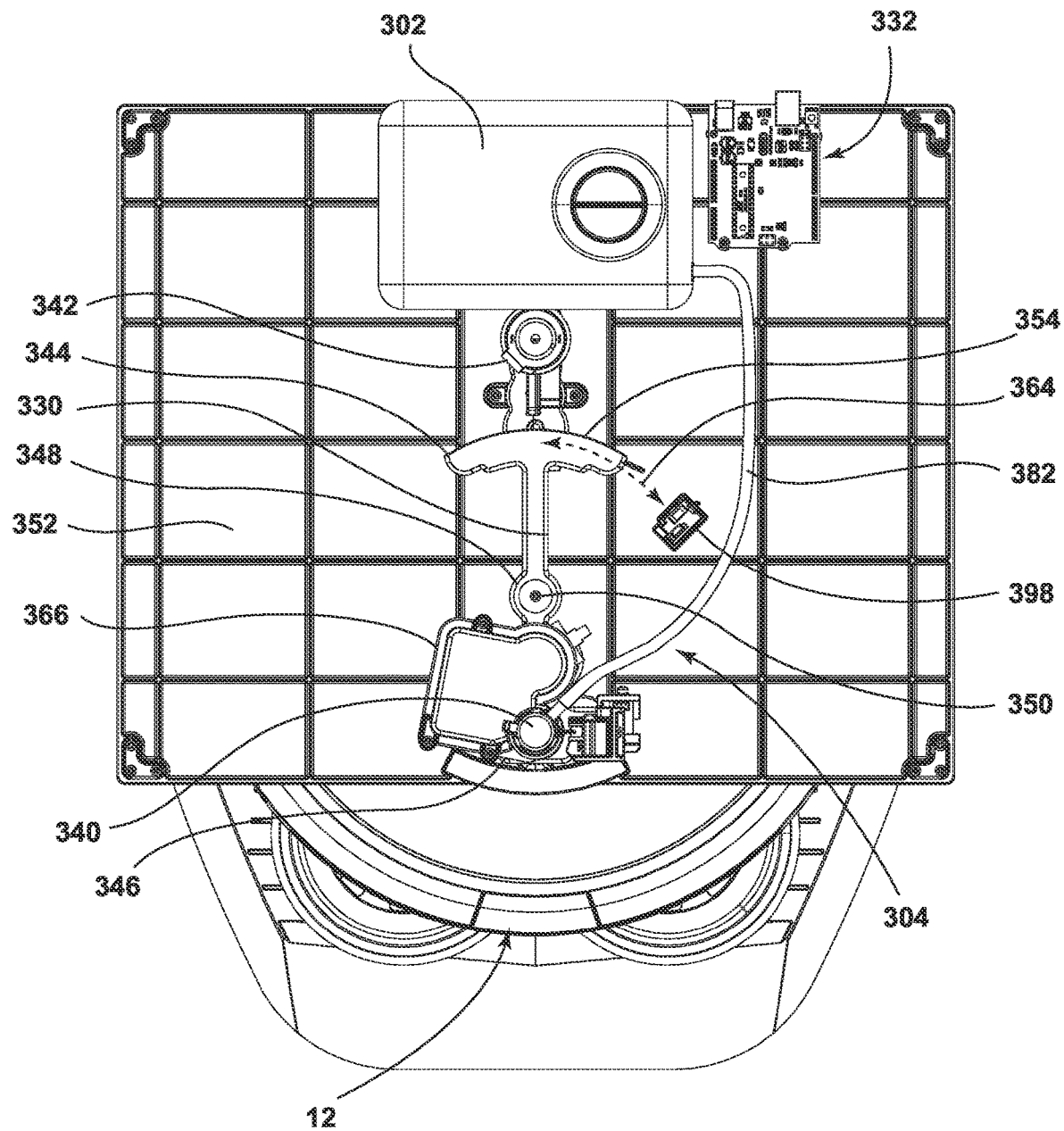
FIG. 22 is a top view similar to FIG. 21, with the arm of the refilling mechanism in an indexed position.
Figure 27:
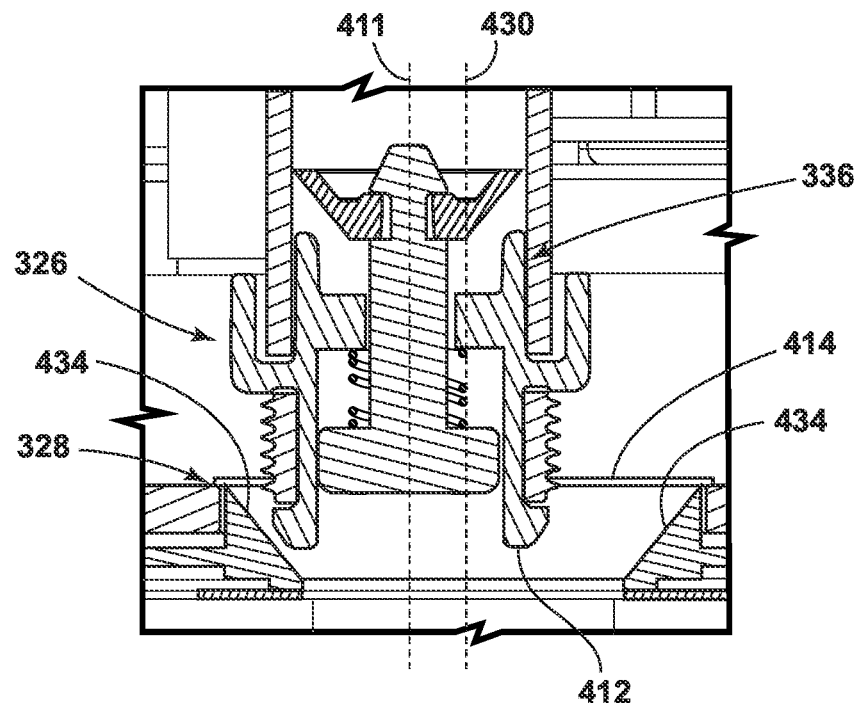
FIG. 27 is a close-up view showing alignment of the dispensing port with the refill port for refilling the robot.

FIG. 21-22 show a top view of the refilling mechanism 304. To index the arm 330, the garage 270 comprises an arm indexing mechanism or indexer 342, which may be disposed above the enclosure 272 in the cabinet 318. The arm 330 has an input end 344 and an output end 346, and a pivot coupling 348 between the input end 344 and the output end 346. The plunger 340 and dispensing port 326 (FIG. 23) are carried by and moveable with the output end 346 of the arm 330. The indexer 342 is coupled with the input end 344 of the arm 330 and provides mechanism input to pivot the arm 330 about an axis defined by the pivot coupling 348 to an aligned position in which the ports 326, 328 are aligned, or substantially aligned. By "substantially aligned," the ports 326, 328 may be slightly misaligned, but are still able to be coupled. As described in more detail below, FIG. 27 shows one example in which the ports 326, 328 are substantially aligned.

The arm 330 is rotatably mounted to a surface 352 above the enclosure 272 for the robot 12, and is moveable through an X-Y plane above the robot 12. The surface 352 may comprise a top side of the ceiling 280 of the enclosure 272. The pivot coupling 348 can comprise any suitable coupling that enables the arm 330 to pivot and defines an axis 350 extending in the Z direction.

The arm 330 is pivotally mounted to the surface 352 by pivot coupling 348 at an intermediate portion of the arm 330 between the input and output ends 344, 346 of the arm 330. The intermediate portion may be offset from the intermediate portion, such that the input and output ends 344, 346 of the arm 330 are disposed at different distances from the pivot axis 350. In other embodiments, the intermediate portion may be at the center of the arm 330, such that the input and output ends 344, 346 of the arm 330 are equidistant from the pivot axis 350

The arm 330 comprises a head 354 at the input end 344 of the arm 330 that is configured to engage with the indexer 342. The head 354 can be moved in a path 364 along an arc by pivoting the arm 330 about the pivot coupling 348, the arc forming a segment of a circle that is largely concentric with the center of the final docked position of the robot 12. This allows the garage 270 to align the plunger 340 and dispensing port 326 with the refill port 328.

The arm indexer 342 is provided to move the position of the arm 330 between a first or home position (an example of which is shown in FIG. 21) and second or indexed position (an example of which is shown in FIG. 22) based on sensor input related to the presence or absence of the robot 12 at the garage 270. Movement of the arm 330 between the home and indexed positions moves the head 354 along the arc path 364.

Figure 23:
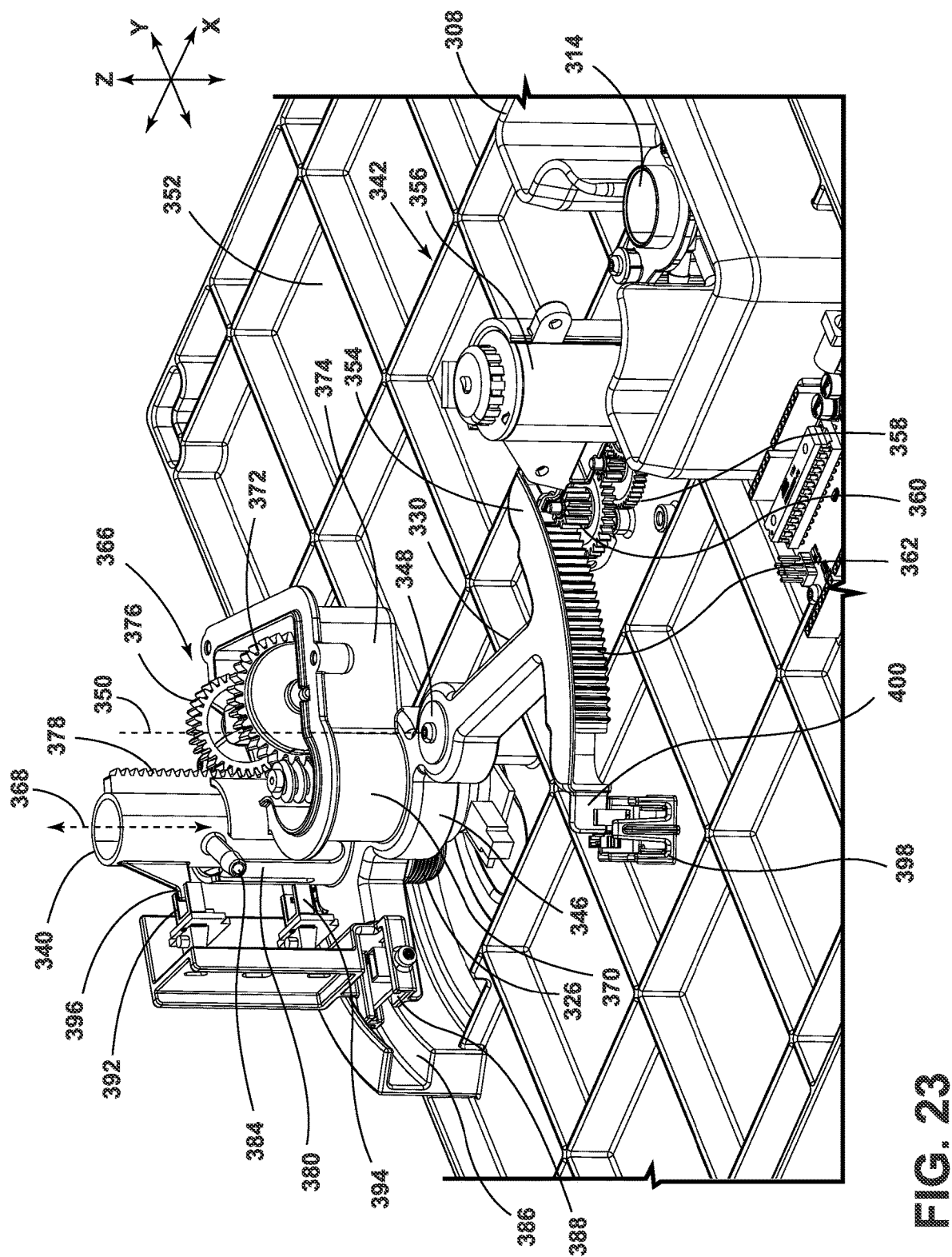
FIG. 23 is a perspective view of the refilling mechanism with the arm in a home position and a plunger in a raised position.

Referring to FIG. 23, in one embodiment, the indexer 342 can comprise a drive motor 356 and a gear system 358. The gear system 358 has an output gear or pinion gear 360 that meshes with a rack gear 362 on the arm 330 to index the arm 330. The rack gear 362 may be formed with or otherwise coupled to the head 354 of the arm 330. The drive motor 356 outputs power through a shaft (not shown) to the gear system 358 to rotate the pinion gear 360.

The motor 356 is reversible, and rotation of the pinion gear 360 in a first direction indexes the arm 330 toward the indexed position (FIGS. 22 and 24), and rotation of the pinion gear 360 in a second, opposite direction indexes the arm 330 to back toward the home position (FIGS. 21 and 23). The arm 330 remains in the home position until the motor 356 is operated in the first direction, which causes the head 354 of the arm 330 to be indexed with respect to the pinion gear 360 of the spatially-fixed gear system 358, until the arm 330 reaches the indexed position. The arm 330 remains on the indexed position until the motor 356 is operated in the reverse direction, which causes the head 354 of the arm 330 to index back to its home position.

FIG. 23 shows one embodiment of the gear system 358 for the arm indexer 342. Various other gear systems are possible to transmit the output force provided by the motor 356 to the arm 330. For example, in other embodiments, the pinion gear 360 may be directly coupled with the motor output shaft. A gear casing, not shown in FIG. 23, may enclose the gear system 358.

Figure 20:
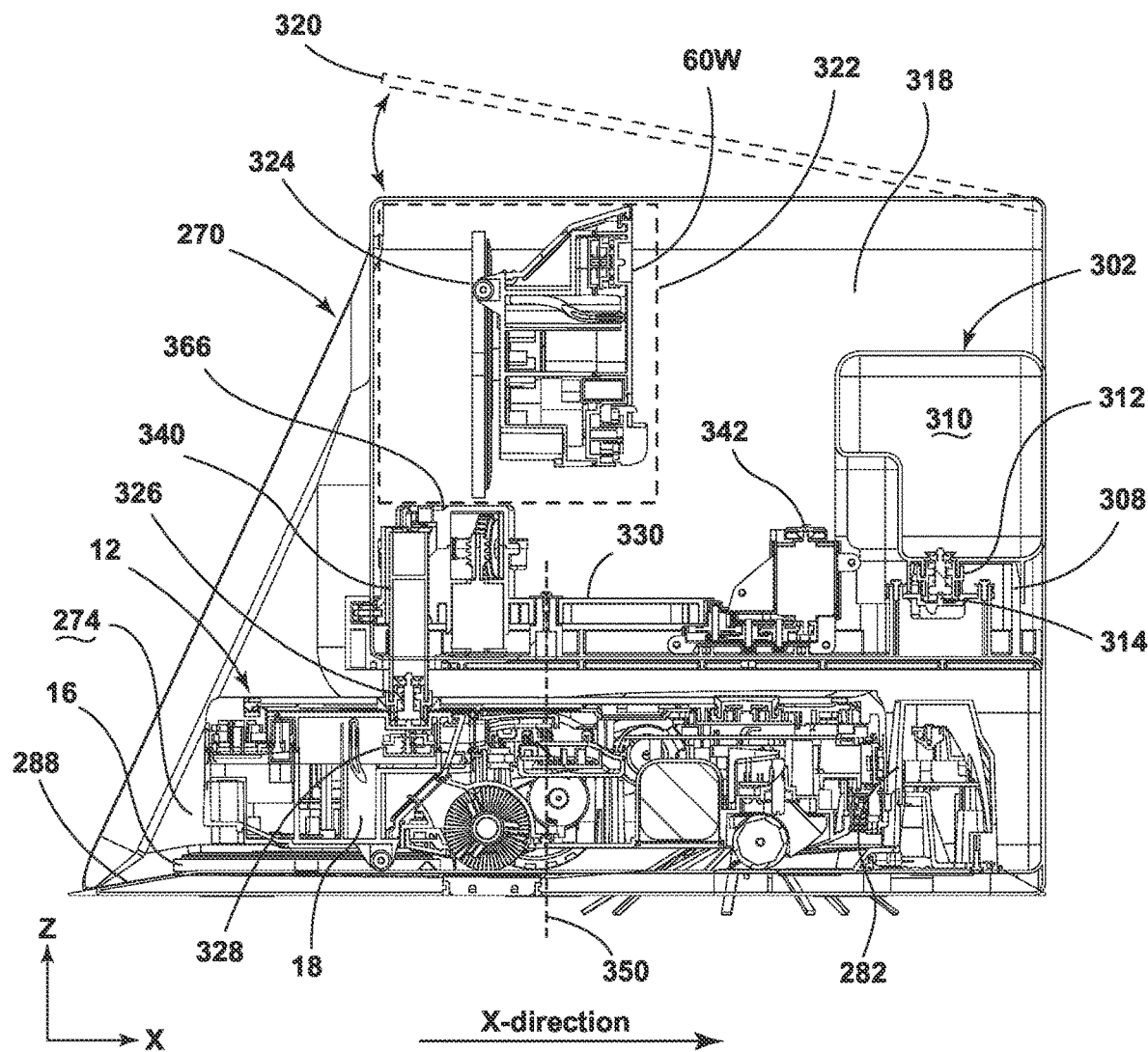
FIG. 20 is a cross-section view of the auto-refill garage from FIG. 18.

Referring to FIG. 21, to index the plunger 340, the garage 270 comprises a plunger indexing mechanism or indexer 366. The plunger 340 can be moved generally along the Z-direction by the plunger indexer 366. This allows the dispensing port 326 to lower to and couple with the refill port 328 (FIG. 20). Like the plunger 340 and dispensing port 326, the plunger indexer 366 can be carried by and moveable with the arm 330, and can be disposed at the output end 346 of the arm 330. The indexer 366 is therefore moveable with the arm 330 to bring the dispensing port 326 into alignment with the refill port 328 before it is lowered.

Figure 24:
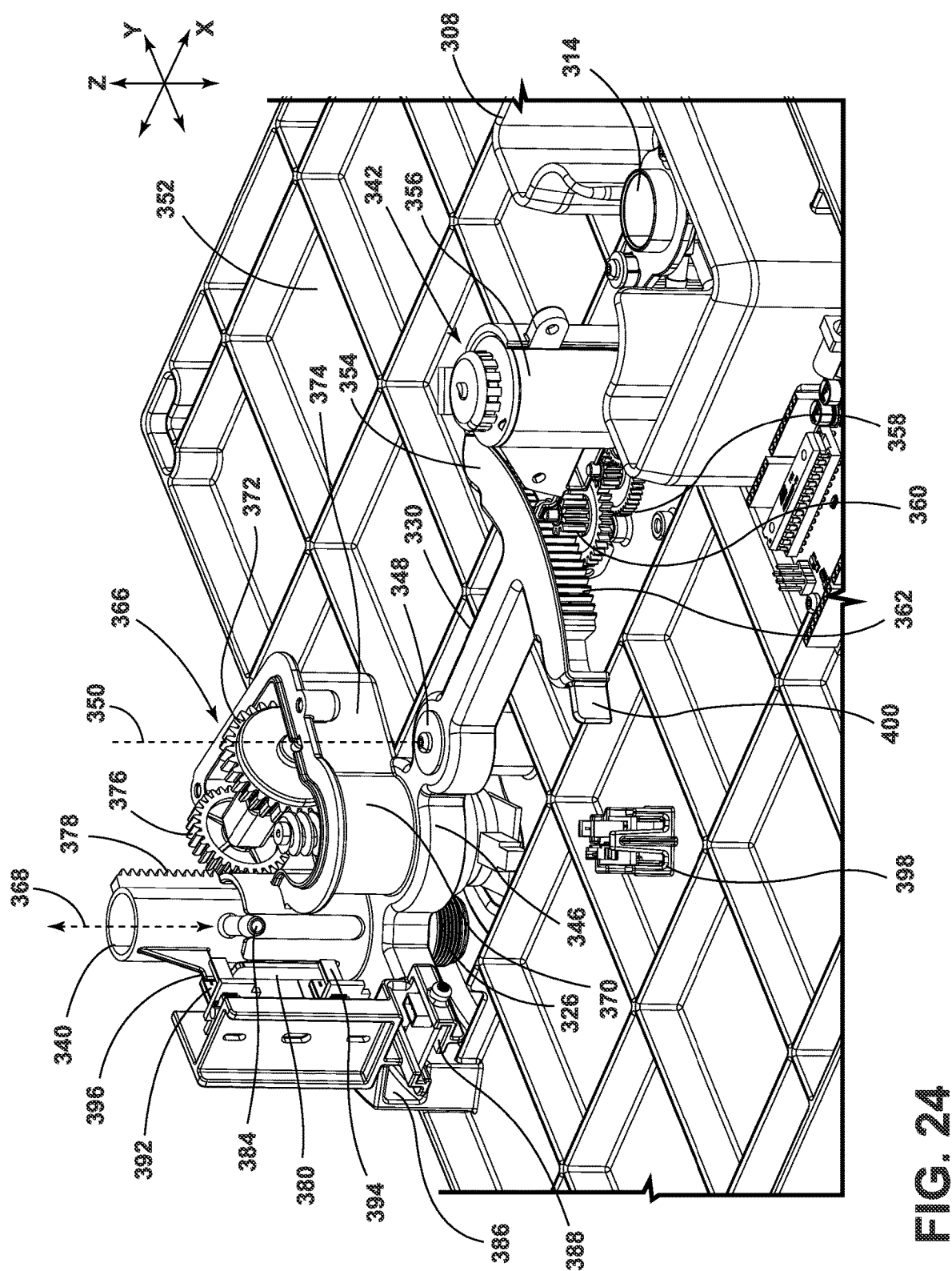
FIG. 24 is a view similar to FIG. 23, with the arm in an indexed position.
Figure 25:
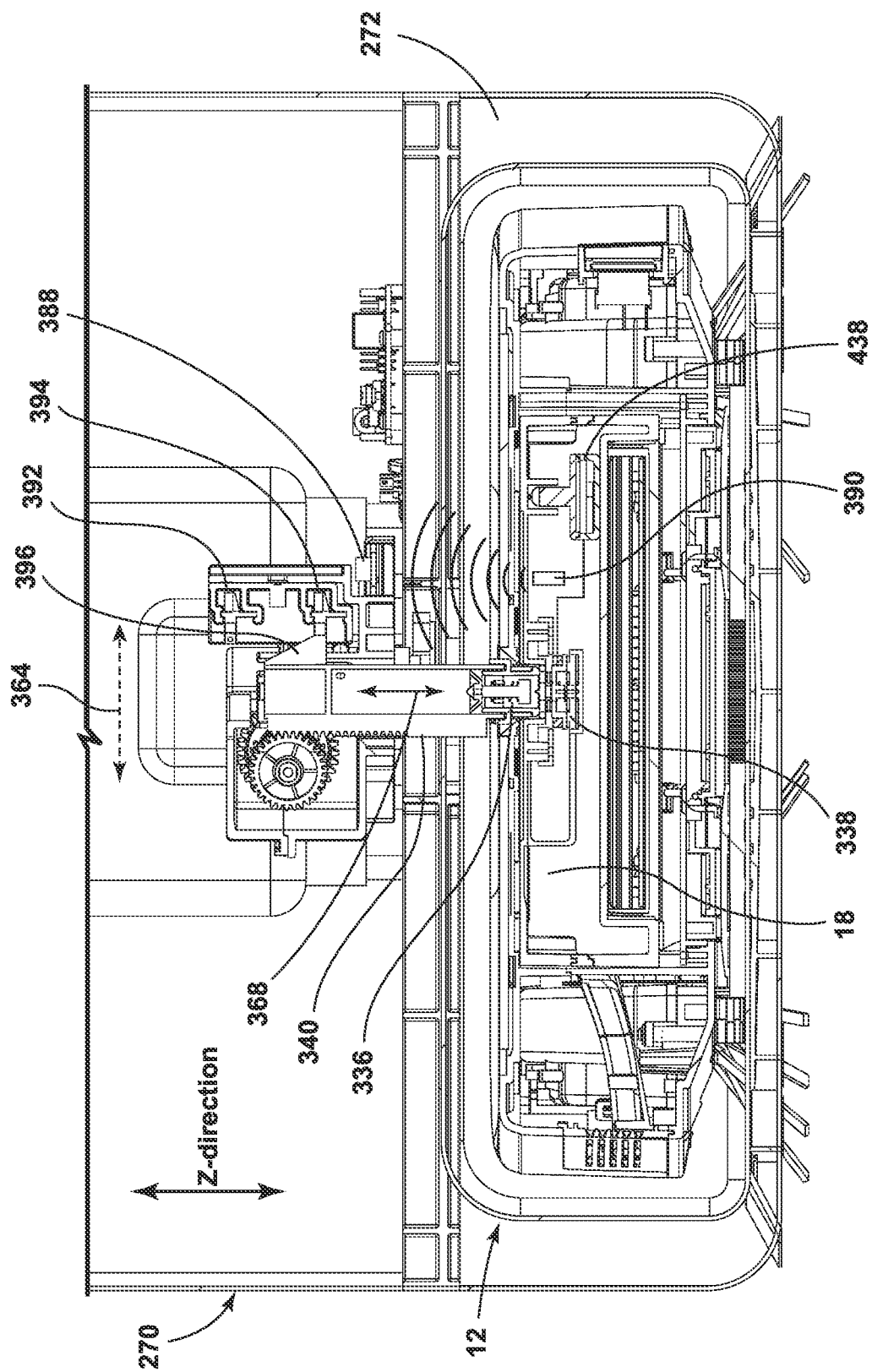
FIG. 25 is a front cross-sectional view of the auto-refill garage from FIG. 18, showing a dispensing port of the refilling mechanism in alignment with a refill port of the robot based on sensor input, and the dispensing port lowered to couple with the refill port.
Figure 26:
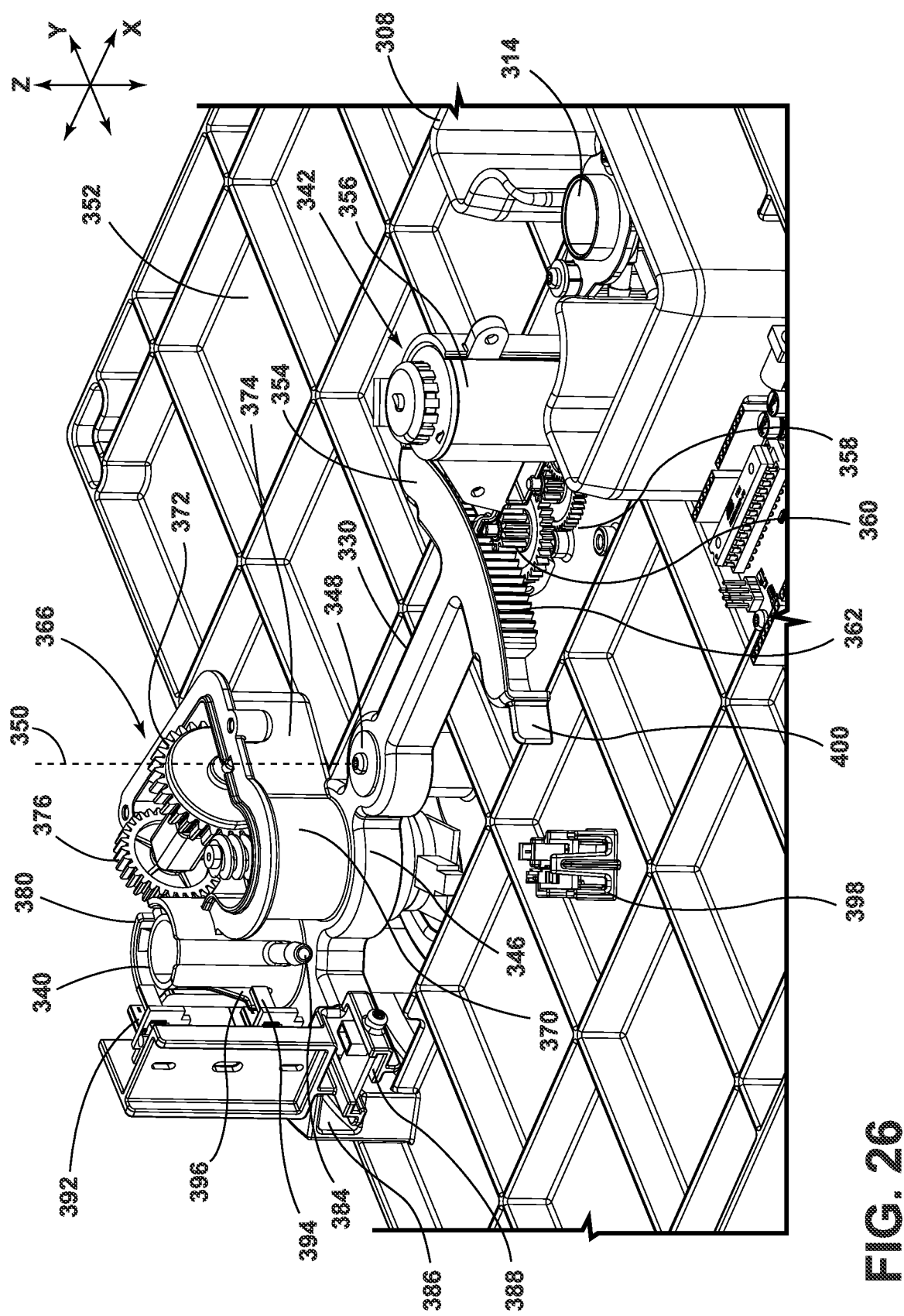
FIG. 26 is a view similar to FIG. 23, with the plunger in a lowered position.

Referring to FIG. 23, the plunger indexer 366 moves the position of the plunger 340 along a vertical path 368 between a first or raised position (an example of which is shown in FIGS. 23-24) and second or lowered position (an example of which is shown in FIGS. 25-26) based on sensor input.

In one embodiment, the plunger indexer 366 can comprise a plunger drive motor 370 and a gear system 372, both which may be enclosed within a casing 374 carried on the output end 346 of the arm 330. A portion of the gear casing 374 is not shown in FIG. 23 to view the gear system 372. The gear system 372 has an output gear or pinion gear 376 that meshes with a rack gear 378 on the plunger 340 to index the plunger 340 vertically or in the Z-direction along the path 368. The rack gear 378 may be formed with or otherwise coupled to the plunger 340. The drive motor 370 outputs power through a shaft (not shown) to the gear system 372 to rotate the pinion gear 376.

The plunger drive motor 370 is reversible, and rotation of the pinion gear 376 in a first direction indexes the plunger 340 downwardly toward the lowered position, and rotation of the pinion gear 376 in a second, opposite direction indexes the plunger 340 upwardly toward the raised position. The plunger 340 remains in the raised position until the motor 370 is operated in the first direction, which causes the plunger 340 to be indexed with respect to the pinion gear 376 of the spatially-fixed gear system 372, until the plunger 340 reaches the lowered position. The plunger 340 remains on the lowered position until the motor 370 is operated in the reverse direction, which causes the plunger 340 to index back to its raised position.

FIG. 23 shows one embodiment of the gear system 372. Various other gear systems are possible to transmit the output force provided by the motor 370 to the plunger 340. For example, in other embodiments, the pinion gear 372 may be directly coupled with the motor output shaft.

The plunger 340, dispensing port 326, and first valve 336 may be connected, coupled, or otherwise formed to define a module or unit, which is vertically moveable, by the plunger indexer 366. This module can be mounted within a sleeve 380 connected to, coupled with, or otherwise formed on the output end of the arm 330. A suitable tolerance between the module and sleeve 380 permits the module to move up and down within the sleeve 380, while keeping the module axis substantially aligned along the Z-direction. The sleeve 380 can include a slot aligned with the rack gear 378 so that the rack gear 378 can engage the pinion gear 376.

The discharge path may comprise at least one supply conduit or tubing 382 conveying liquid from the storage tank 302 to the dispensing port 328. The valve receiver 314 may include an outlet connector receiving one end of the tubing 382 and the plunger 340 may include an inlet connector 384 (FIG. 23) receiving the other end of the tubing 382. Accordingly, the plunger 340 may form a portion of the discharge path to the dispensing port 326. The sleeve 380 can include a slot aligned with and receiving the inlet connector 384, with the inlet connector 384 sliding along the slot as the plunger 340 moves up and down. The tubing 382 can have a suitable length for accommodating the movement of the inlet connector 384. A guide for the tubing 382 can be provided within the garage 270 to avoid pinching the tubing 382 with any of the moving parts of the garage 270.

The garage 270 may include a track 386 to guide the movement of the arm 330 along the supporting surface 352. The track 386 may be elongated along the X-Y plane and interface with a portion on the output end 346 of the arm 330. This may be beneficial to help distribute some of the weight on the output end 346 of the arm 330 to the supporting surface 352 via the track 386.

As briefly noted above, the arm indexer 342 can be controlled based on sensor input related to the presence or absence of the robot 12 at the garage 270. More particularly, the sensor input can determine whether the robot 12 is appropriate positioned within the enclosure 272 with the ports 326, 328 aligned for connection with each other. In one embodiment, for the arm indexer 342, the garage 270 can comprise a first sensor 388 configured to detect when the arm 330 has indexed to a position in which the dispensing port 326 is aligned with the refill port 328. Once sensor input confirms the ports 326, 328 are aligned, the plunger 340 can be operated as detailed below.

The first sensor 388 can comprise a Hall Effect sensor mounted on the arm 330, which is configured to detect a magnet 390 (FIG. 25) on the robot 12. The magnet 390 is positioned so that when the Hall Effect sensor 388 detects the magnet 390, the plunger 340 and dispensing port 326 are aligned with the refill port 328 on top of the robot 12. Other sensing configurations are possible.

When the robot 12 enters the garage 270, the arm 330 is in the home position (FIGS. 21 and 23), and is rotated all the way to one side of its travel path 364. Once the robot 12 is docked, and optionally after a delay or pause of a preset time, the arm 330 indexes to align the dispensing port 326 with the refill port 328 (FIGS. 22 and 24). Indexing of the arm 330 away from the home position can be initiated by the physical and electrical connection of the charging contacts 82 on the robot 12 with the charging contacts 276 on the garage 270, which initiates operation of the arm drive motor 356. In an alternative embodiment, a separate sensor on the garage 270 having the sole function of detecting when the robot 12 is present can be provided and used to initiate indexing of the arm 330. In yet another embodiment, the robot 12 may wirelessly communicate with the garage 270 to let the garage 270 know when it is present and docked.

The arm 330 moves across its path 364 until the Hall Effect sensor 388 detects the magnet 390 (FIG. 25). At this point, the drive motor 356 is de-energized and arm movement stops, as the plunger 340 and dispensing port 326 are aligned with the refill port 326. Also at this point, the plunger 340 is in the raised position.

The garage 270 can comprise a second sensor 392 configured to detect that the plunger 340 is in the raised position and a third sensor 394 configured to detect that the plunger 340 is in the lowered position. These sensors 392, 394 can comprise optical flat sensors that are selectively blocked based on the position of the plunger 340. In the embodiment shown, the plunger 340 can comprise a flag 396 that blocks the upper optical flag sensor 392 when the plunger 340 is in the raised position, and that unblocks the upper optical flag sensor 392 when the plunger 340 moves away from the raised position. The flag 396 that blocks the lower optical flag sensor 394 when the plunger 340 is in the lowered position, and unblocks the lower optical flag sensor 394 when the plunger 340 moves away from the lowered position. Input from one or both of the sensors 392, 394 as to whether they are blocked or unblocked can be used to determine the position of the plunger 340. Other sensing configurations are possible.

Once the arm 330 reaches the aligned position and stops, the indexing of the plunger 340 downwardly is initiated, optionally after a delay or pause of a preset time. Indexing of the arm 330 away from the home position can be initiated by initiated by a passive timer, which initiates operation of the arm drive motor 356. Once the arm 330 reaches the aligned position and stops, and optionally after a delay or pause of a preset time, the plunger 340 indexes down to couple the dispensing port 326 with the refill port 328. Indexing of the plunger 340 downwardly can be initiated by input from the first sensor 388, which initiates operation of the plunger drive motor 370. The plunger 340 descends in the Z-direction along its path until the lower optical flag sensor 394 is blocked (or until a timer timeout). At this point, the drive motor 370 is de-energized and plunger movement stops, as the dispensing port 326 is coupled with the refill port 328. Also at this point, the valves 336, 338 are open, as detailed below.

After refilling is complete, the plunger 340 may move back to its raised position. Indexing of the plunger 340 back to the raised position can be initiated by a passive timer, which initiates operation of the plunger drive motor 370 in the reverse direction. The refilling operation can comprise a predetermined maximum refill time, which can be the refill time for a completely empty robot tank. For refilling operations on a less then empty robot tank, a refilling operation will take less than the predetermined maximum refill time. One non-limiting example of a predetermined maximum refill time is 1 minute. The passive timer can be configured to initiate indexing of the plunger 340 back to the raised position after the predetermined maximum refill time has passed. In another embodiment, the robot 12 may wirelessly communicate with the garage 270 to let the garage 270 know when it's tank is full, rather than waiting for the predetermined maximum refill time to pass.

Once the plunger 340 is raised, the arm can move back to its home position. Indexing of the arm 330 back to the home position can be initiated based on input from the upper optical flag sensor 392, which initiates operation of the arm drive motor 356 in the reverse direction. The garage 270 can comprise a fourth sensor 398 configured to detect when the arm 330 is in the home position. Once the arm 330 is back in the home position, the motor 356 is de-energized.

In one embodiment, the fourth sensor 398 can comprise an optical flag sensor that is blocked by the arm 330 in the home position. In the embodiment shown, the head 354 of the arm 330 can comprise a flag 400 that blocks the optical flag sensor 398 when the arm 330 is in the home position, and that unblocks the optical flag sensor 398 when the arm 330 moves away from the home position. Other sensing configurations are possible.

In the embodiment described herein, the refilling mechanism 304 receives separate sensor input for controlling the arm 330 and the plunger 340 in order to accurately to detect the state of the mechanism each time the robot 12 docks with the docking station 14 for refilling. The sensors 388, 392, 394, 398 provide an accurate way for the controller 332 to determine when the refilling mechanism 304 has returned to its starting position, one example of which includes the arm 330 in the home position and the plunger 340 in the raised position, so that detection of the robot 12 and alignment/coupling of the ports 326, 328 can be accomplished with accuracy, precision and consistency, thereby mitigating the change of damaging the robot 12 or the garage 270.

FIGS. 27-31 are close up sectional views show the coupling of the dispensing port 326 with the refill port 328, and opening of the valves 336, 338. The first valve 336 can comprise a spring-loaded plunger valve having a vertically-displaceable valve plunger 402 disposed within a valve body 404 having an inlet and an outlet. A spring 406 biases the valve plunger 402 to a closed position, an example of which is shown in FIG. 27. A flexible ring 408 is carried on the plunger 402 and seats against a valve seat 410 in the closed position to close a fluid flow path through the valve body 404 (e.g., between the inlet and outlet of the body 404). The valve body 404 can be coupled with a lower end of the arm plunger 340, with the valve plunger 402 moveable along an axis 411, which may be the same axis along which the arm plunger 340 moves.

In some embodiments, the dispensing port 326 comprises a male coupling or tip 412 configured to mate or otherwise couple with the refill port 326, which comprises a female coupling or receiver 414. This may be preferred as providing the female coupling on the robot 12 allows the robot 12 to maintain a low profile. In other embodiments, the dispensing port 326 may comprise a female coupling and the refill port 328 may comprise a male coupling.

The tip 412 can be provided by a part of the first valve 336. In the embodiment, shown, the tip 412 is formed by the outlet end of the valve body 404. The tip 412 is inserted into the receiver 414 to couple the ports 326, 328 A seal 416 can be disposed on an outer surface of the tip 412 to provide a fluid-tight interface between the dispensing port 326 and refill port 328 when coupled.

As will be explained further below, the tip 412 functions as a valve actuator for the second valve 338. In other embodiments, to open the second valve 338, a mechanical actuator may be otherwise integrated with the first valve 336 or with the dispensing port 326.

Figure 28:
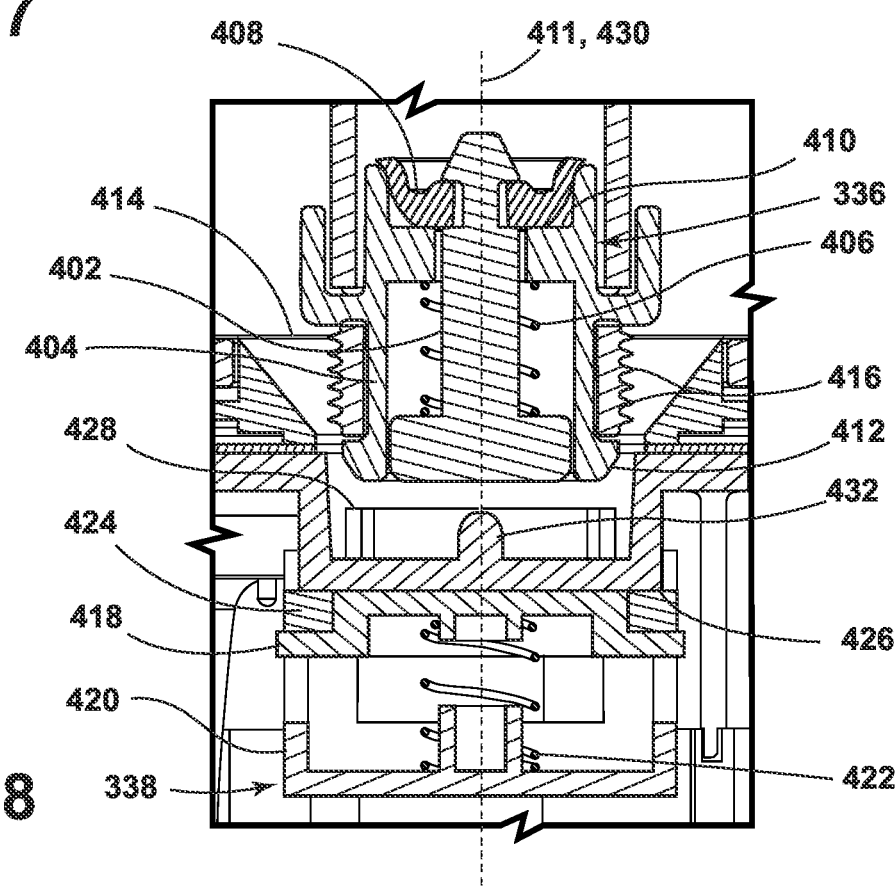
FIG. 28 is a close-up view showing the dispensing port aligned with the refill port and valves of each port in a closed state.

The second valve 338 can comprise a spring-loaded valve having a vertically-displaceable valve member 418 disposed within a valve body 420 having an inlet and an outlet. A spring 422 biases the valve member 418 to a closed position, an example of which is shown in FIG. 28. A gasket 424 is carried on the valve member 418 and seats against a valve seat 426 in the closed position to close a fluid flow path through the valve body 420 (e.g., between the inlet and outlet of the body 420).

The valve member 418 can be annular in shape, and comprise an upper end 428 against which a portion of the dispensing port 326, such as tip 412, presses as the dispensing port 326 is lowered into the receiver 414. Other engagement features for opening the valve member 418 are possible. The valve member 418 can further include one or more openings through which fluid can flow past or through the valve member 418.

The valve body 420 can be coupled with the receiver 414, with the valve member 418 captured between the valve body 420 and receiver 414, and moveable along an axis 430. The valve body 420 can further include one or more openings through which fluid can flow past or through the valve body 420, and into the supply tank 18.

The refill port 328 can comprise a valve actuator for the first valve 336. In the embodiment shown, the refill port 328 comprises a pin 432 located in the receiver 414. The pin 432 is configured to press against the plunger 402 of the first valve 336 when the dispensing port 326 is coupled with the refill port 328. As a result, the plunger 402 displaces the flexible ring 408 against the restoring force of the spring 406 in the vertical direction along axis 430, opening the first valve 336. The structure supporting the pin 432 can include one or more openings through which fluid can flow past the pin 432 and into the second valve 338. As such, an open flow path between the storage tank 302 and the supply tank 18 is established, and cleaning fluid can flow under gravity into the supply tank 18. In other embodiments, to open the first valve 336, a mechanical actuator may be otherwise integrated with the second valve 338 or with the refill port 328.

To time the valves 336, 338 to open in sequence, the upper end 428 of the valve member 418 can be disposed above the pin 432 when the second valve 338 is closed, so that the dispensing port 328 engages the valve member 418 before the pin 432. As a result, the tip 412 of the dispensing port 328 displaces the valve member 418 against the restoring force of the spring 422 in the vertical direction along axis 430, opening the second valve 338 first, while the first valve 336 remains closed. As the dispensing port 326 continues to lower, the pin 432 eventually engages the plunger 402 to open the first valve 336 as described above. During decoupling of the ports 326, 328, the valves close in reverse order, with the first valve 336 closing first and the second valve 338 closing second.

Referring to FIG. 27, a lead-in structure can align the valves 336, 338 during the connection between the plunger 340 and the robot 12. The lead-in can comprise, for example, an angled surface 434 on the refill port 328 to guide the tip 412 of the first valve 336 into the receiver 414 of the second valve 338. If there is any small misalignment between the valves 336, 338 as they are mated, the angled surface 434 corrects this by guiding the first valve 336 toward the center of the second valve 338.

When the robot 12 enters the enclosure 272 and docks, the dispensing port 326 is above and offset from the refill port 328, and the valves 336, 338 are closed. After docking, the arm 330 indexes to bring the dispensing port 326 into alignment with the refill port 326 along the Z direction, and then the dispensing port 326 drops vertically to couple with the refill port 328. During this vertical drop, the ports 326, 328 may be in true alignment with each other. In other cases, the ports 326, 328 may be slightly misaligned. FIG. 27 shows one example in which the dispensing port 326 is partially inserted into the refill port 326 after a portion of this vertical drop, with a small misalignment between the valves 336, 338 causing the axes 411, 430 to be offset from each other. The valves 336, 338 remain closed. As the arm plunger 340 continues to descend, the angled surface 434 guides the first valve 336 toward the center of the receiver 414 to bring the axes 411, 430 of the valves 336, 338 into alignment, for example as shown in FIG. 28.

Figure 29:
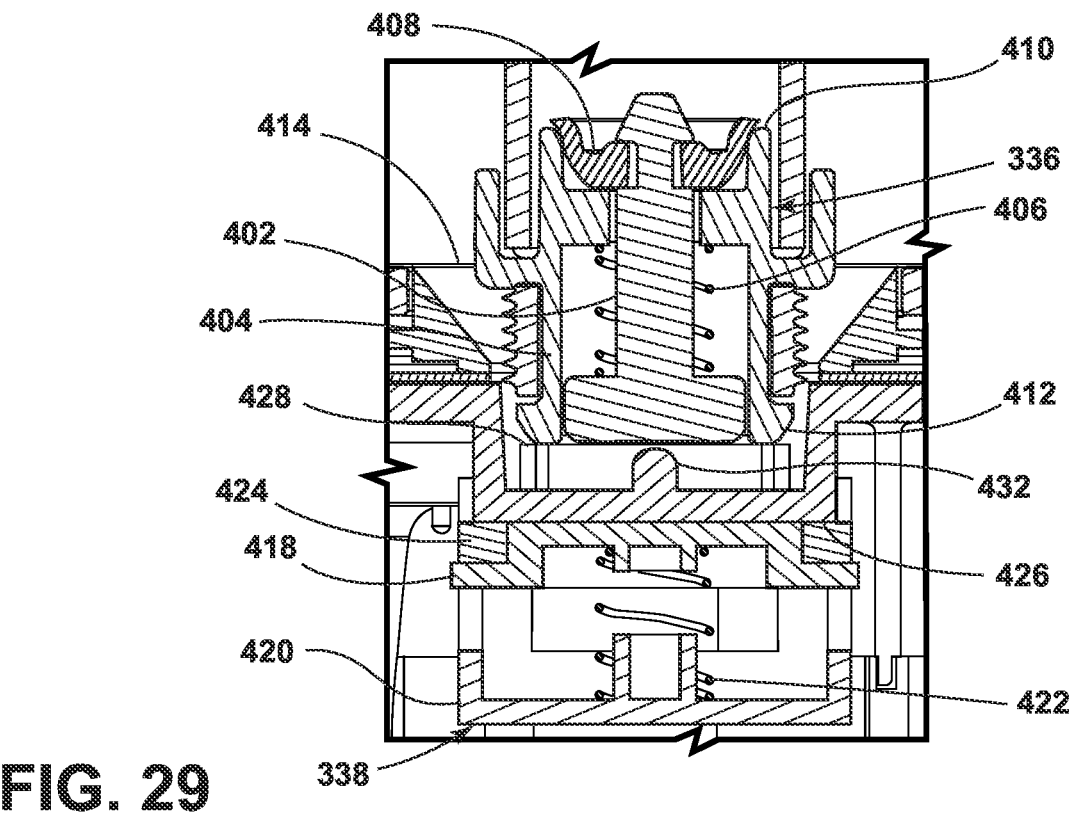
FIG. 29 is a view similar to FIG. 28, with the dispensing port inserted further into the refill port and the tank valve beginning to open.
Figure 30:
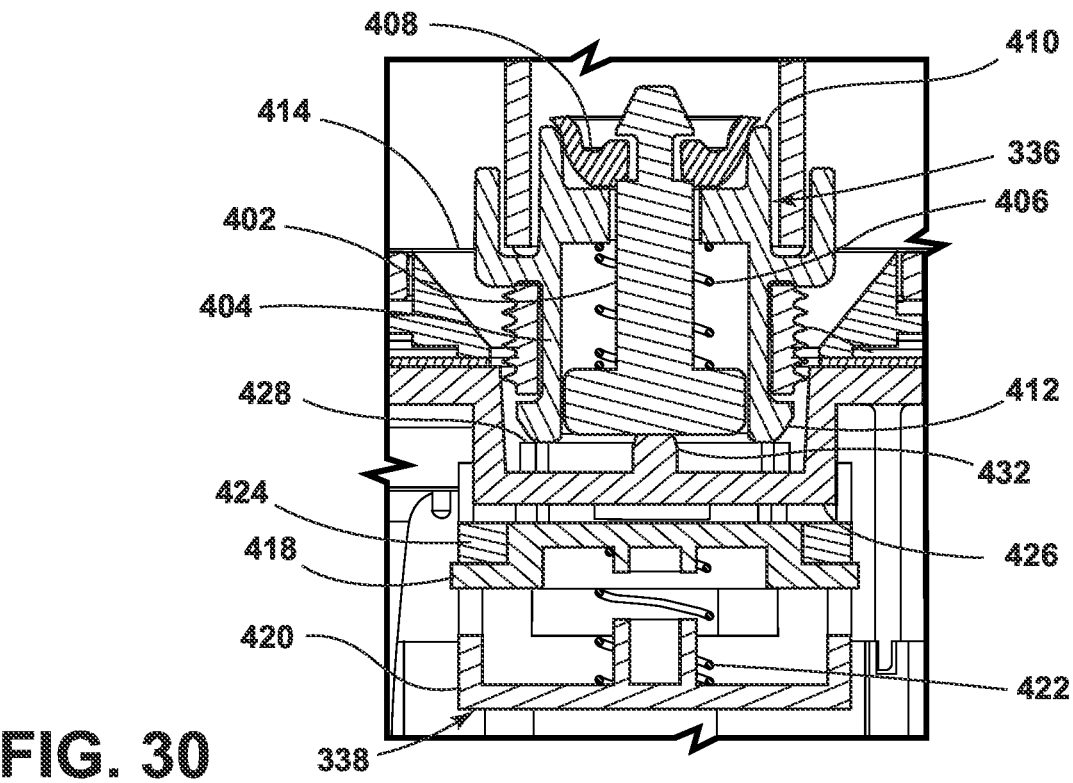
FIG. 30 is a view similar to FIG. 28, with the dispensing port inserted further into the refill port, the tank valve in an open state.
Figure 31:
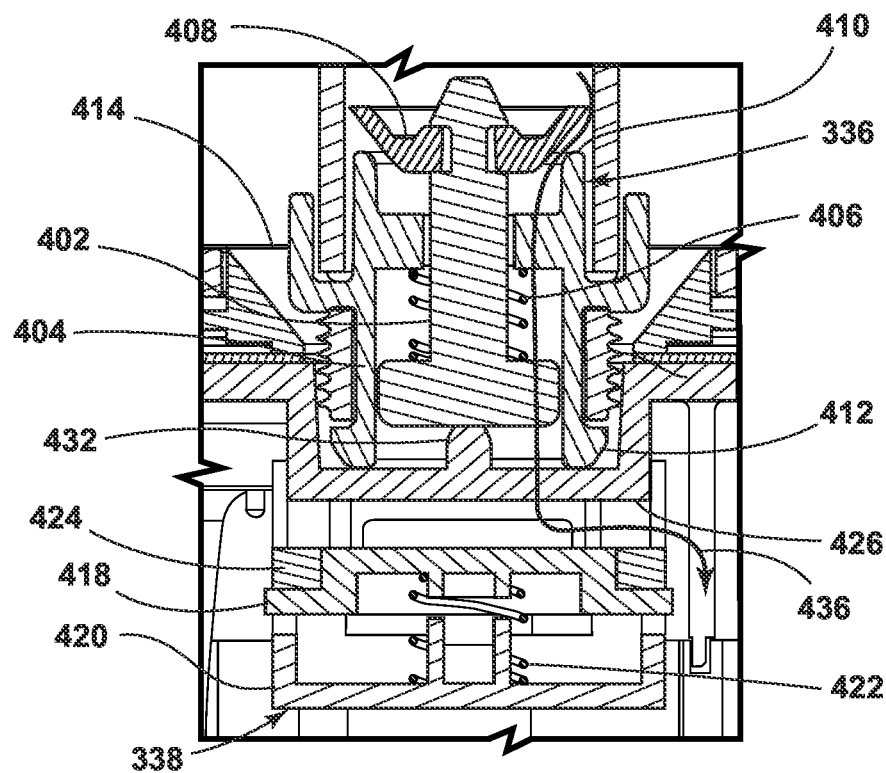
FIG. 31 is a view similar to FIG. 28, with the dispensing port inserted fully into the refill port and the garage valve in an open state.

FIG. 28 shows the ports 326, 328 aligned with each other, with the valve axes 411, 430 aligned. FIG. 29 shows the dispensing port 326 inserted farther into the refill port 328, with the tip 412 beginning to press the upper end 428 of the valve member 418 on the second valve 338. FIG. 30 shows the dispensing port 326 inserted even farther into the refill port 328, with the tip 412 pressing the valve member 418 down to open the second valve 338. The first valve 336 is still closed. With the second valve 338 in the open state, as the plunger 340 continues to move down, the pin 432 on the receiver 414 begins to press against the plunger 402 on the first valve 336. FIG. 31 shows the pin 432 pressing the plunger 402 upwardly to open the first valve 336. Both valve 336, 338 are now open, and cleaning fluid flows through the open valves along a flow path indicated by arrow 436 in FIG. 31.

Figure 32:
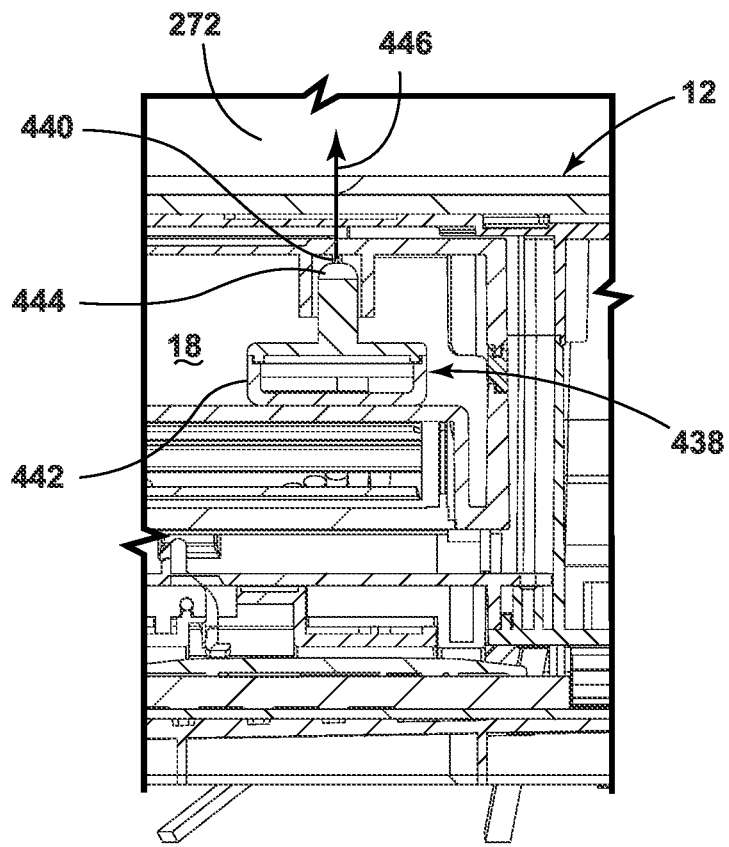
FIG. 32 is an enlarged cross-sectional view showing a shut-off valve of the robot.
Figure 33:
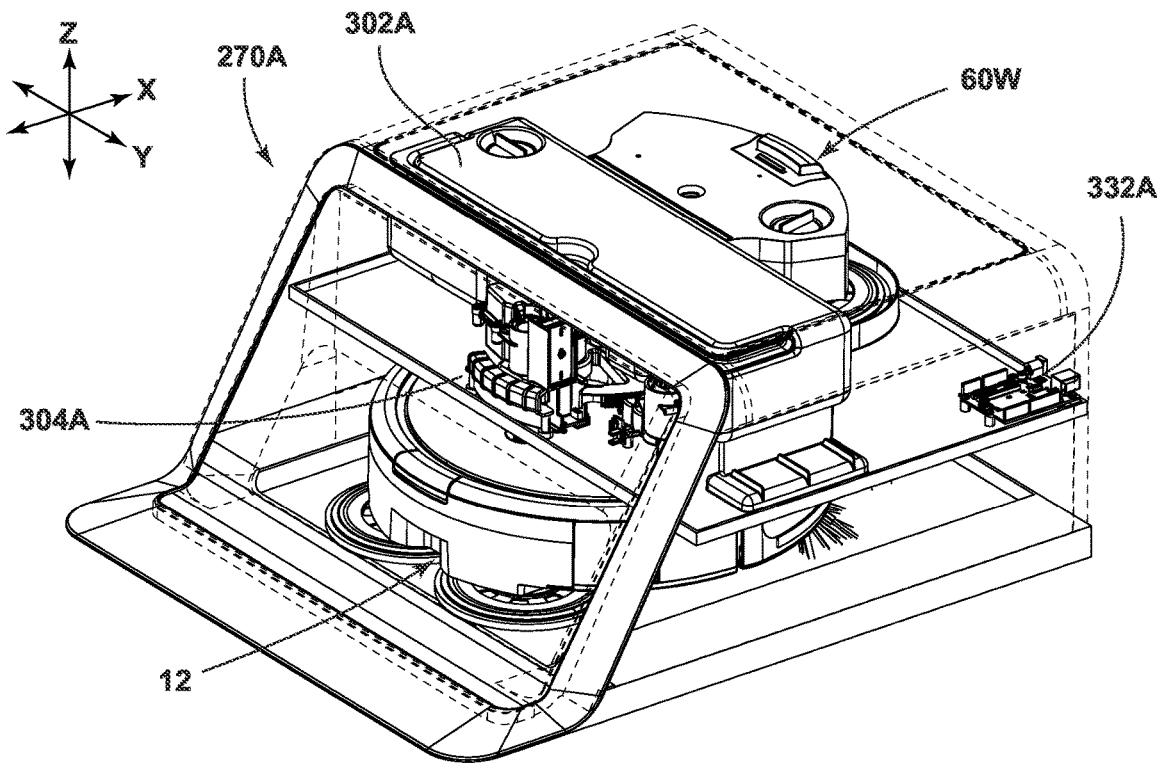
FIG. 33 is a perspective view of another embodiment of a docking station comprising an auto-maintenance garage, with a portion of the garage in phantom line to show internal components of the garage.

Referring to FIG. 32, the robot 12 can include a shut-off valve 438 for stopping the flow of cleaning fluid into the supply tank 18, even while the robot 12 remains docked at the garage 270. The shut-off valve 438 can be configured to automatically close when the supply tank 18 is full. In one embodiment, the shut-off valve 438 comprises a float valve that detects changes in the level of liquid in the supply tank 18, and opens or closes a vent opening 440 in the supply tank 18 accordingly. The float valve includes a float 442 coupled with a closure projection 444 aligned with the vent opening 440 in the supply tank 18. The float 442 is constructed of a material having a density less than the density of cleaning fluid, for example less than the density of water, such that it floats.

When the float valve 438 is open, cleaning fluid entering the supply tank 18 displaces air, which escapes through vent opening 440 as indicated by arrow 446. When the fluid level in the supply tank 18 rises to a predetermined level, preferably a "full" level, the float 442 rises and the closure projection 444 closes the vent opening 440 to prevent any further air from escaping the supply tank 18, and therefore prevents any further cleaning fluid from entering the supply tank 18.

The float valve 438 may remain in the closed position until the second valve 338 opens during a refilling operation. As such, when the robot 12 leaves the garage 270 and begins cleaning, the float valve 438 remains in the closed position even if the fluid level in the supply tank 18 drops. When all three valves 336, 338, 438 are open, cleaning fluid can flow from the storage tank 302 on the garage 270 to the supply tank 18 on the robot 12 via gravity feed.

After refilling is complete, which may optionally be a timed operation, the plunger 340 retracts upwardly to the raised position and the arm 330 indexes back to the home position. Optionally during the refilling operation, the mopping pads 16 can be cleaned by a pad cleaning cycle and the battery can be recharged, as previously described. Alternatively, the refilling operation may be performed before or after pad cleaning and/or battery charging.

FIGS. 33-36 show an alternative embodiment of an auto-refill garage 270A for the robot 12, in which like elements are referred to with the same reference numerals used for the previous embodiment bearing a letter "A." The components, function, and or operation of the garage 270A may be substantially similar to the previous embodiment. The garage 270A may have a modified architecture and spatial structure, including a more compact refilling mechanism 304A and an angled arm 330A.

In this embodiment, the storage tank 302A is located above the arm 330A and toward the forward end of the garage 270A. This places the storage tank 302A closer to the arm 330A and plunger 340A. In the embodiment shown, the storage tank 302A overlies the pivot axis 350A of the arm 330A. To accommodate for the placement of the storage tank 302A, the accessory storage area 322A may be toward the back of the garage 270A, and rear of the storage tank 302A.

Figure 34:
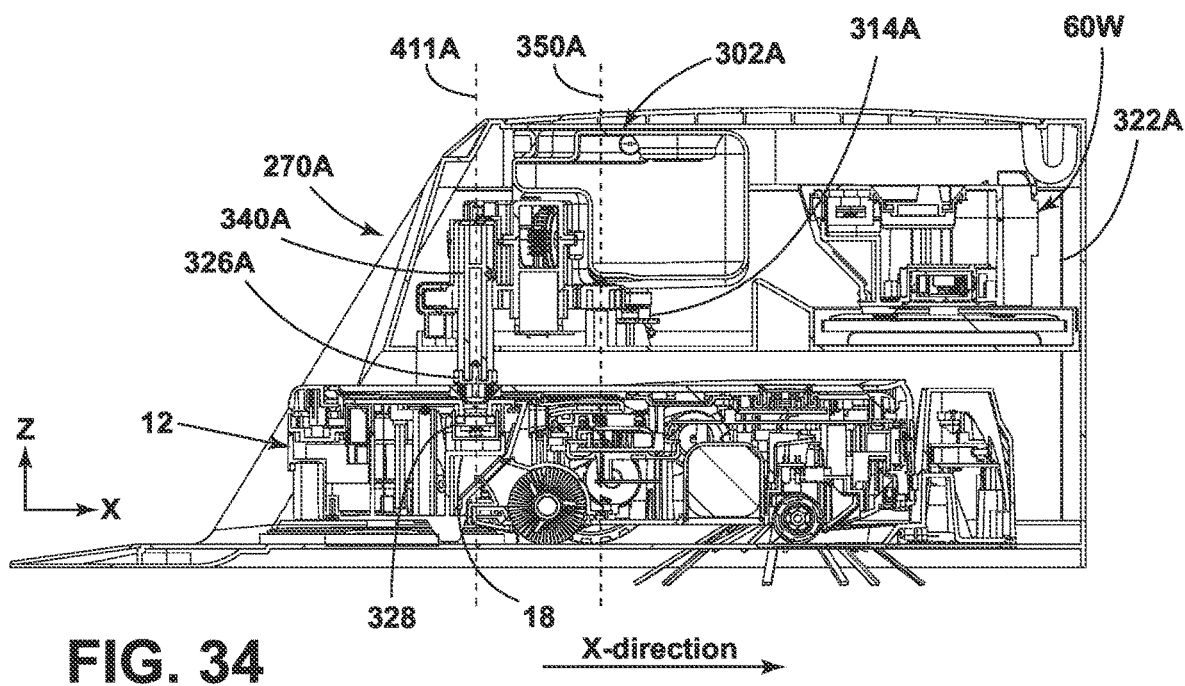
FIG. 34 is a cross-section view of the auto-refill garage from FIG. 33.
Figure 35:
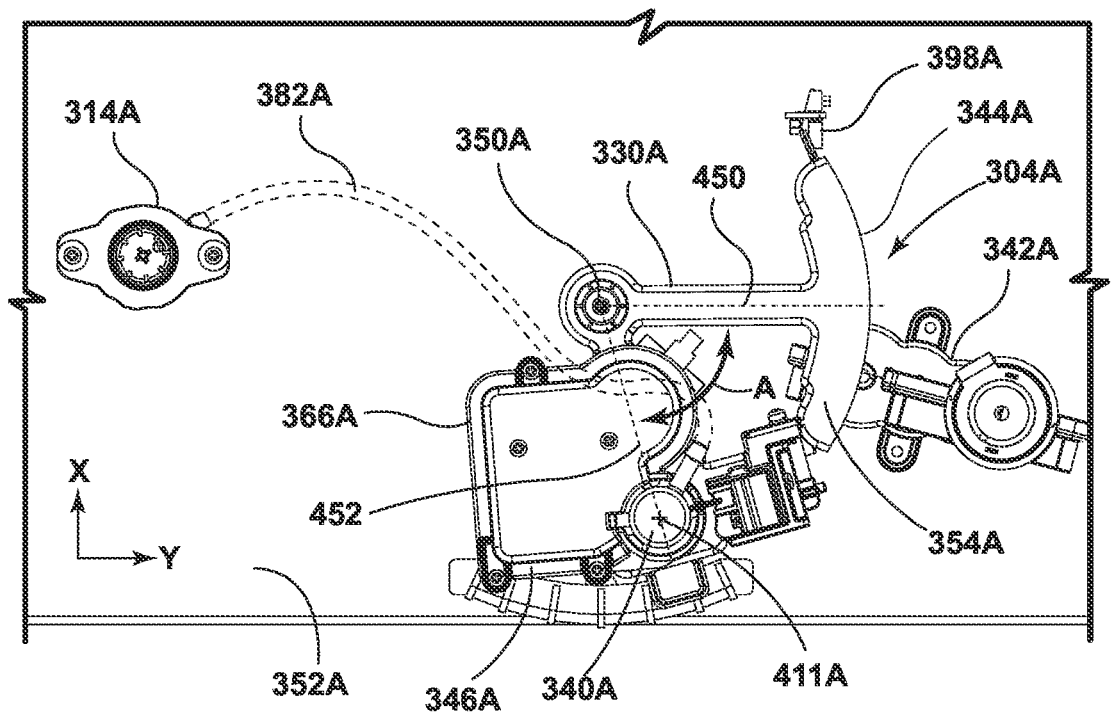
FIG. 35 is a top view of a refilling mechanism for the auto-refill garage from FIG. 33, with an arm of the refilling mechanism in a home position.

The indexable arm 330A carrying the dispensing port 326A is angled, as best seen in the top views of FIGS. 34 and 35. Instead of the input and output ends 344A, 346A of the arm 330A being in opposition to each other, the ends 344A, 346A can be less than 180 degrees from each other, alternatively less than 90 degrees from each other. The arm 330A has an input end axis 450 and an output end axis 452, with the pivot axis 350A defining a vertex of an angle A between the input end 344 and the output end 346. A smaller angle A between the input and output ends 344A, 346A provides a more compact refilling mechanism 304A, as the arm and plunger indexers 342A, 366A can be positioned closer together.

In the embodiment shown, the input end axis 450 extends from the pivot axis 350A through the middle of the head 354A on the input end 344A. The output end axis 452 extends from the pivot axis 350A through the plunger axis 411A.

To provide a lower profile garage, the storage tank 302A may be elongated in the Y- and or X-direction in order to reduce its dimension in the Z-direction. In the embodiment shown the longest dimension of the storage tank 302A is in the Y-direction, e.g., across the front of the garage 270A. Also to provide a lower profile garage, the accessory storage area 322A may receive the extra module 60W horizontally, rather than vertically.

Figure 36:
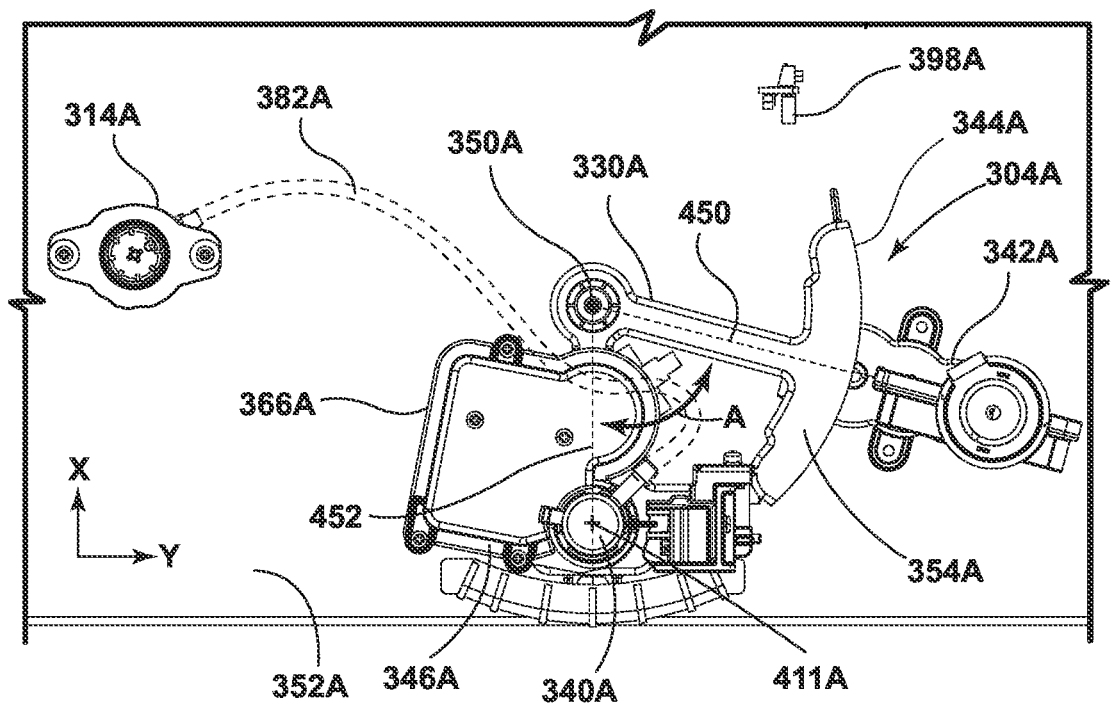
FIG. 36 is a top view similar to FIG. 35, with the arm of the refilling mechanism in an indexed position.

Coupling of the dispensing port 326A of the garage 270A with the refill port 326 of the robot 12, may proceed substantially as described for the previous embodiment, including using sensor-based input for controlling movement the arm 330A and plunger 340A and having sequenced opening of valves. FIG. 35 shows the refilling mechanism 304A with the arm 330A in the home position and FIG. 36 shows the refilling mechanism 304A with the arm 330A in the indexed position.

Figure 37:
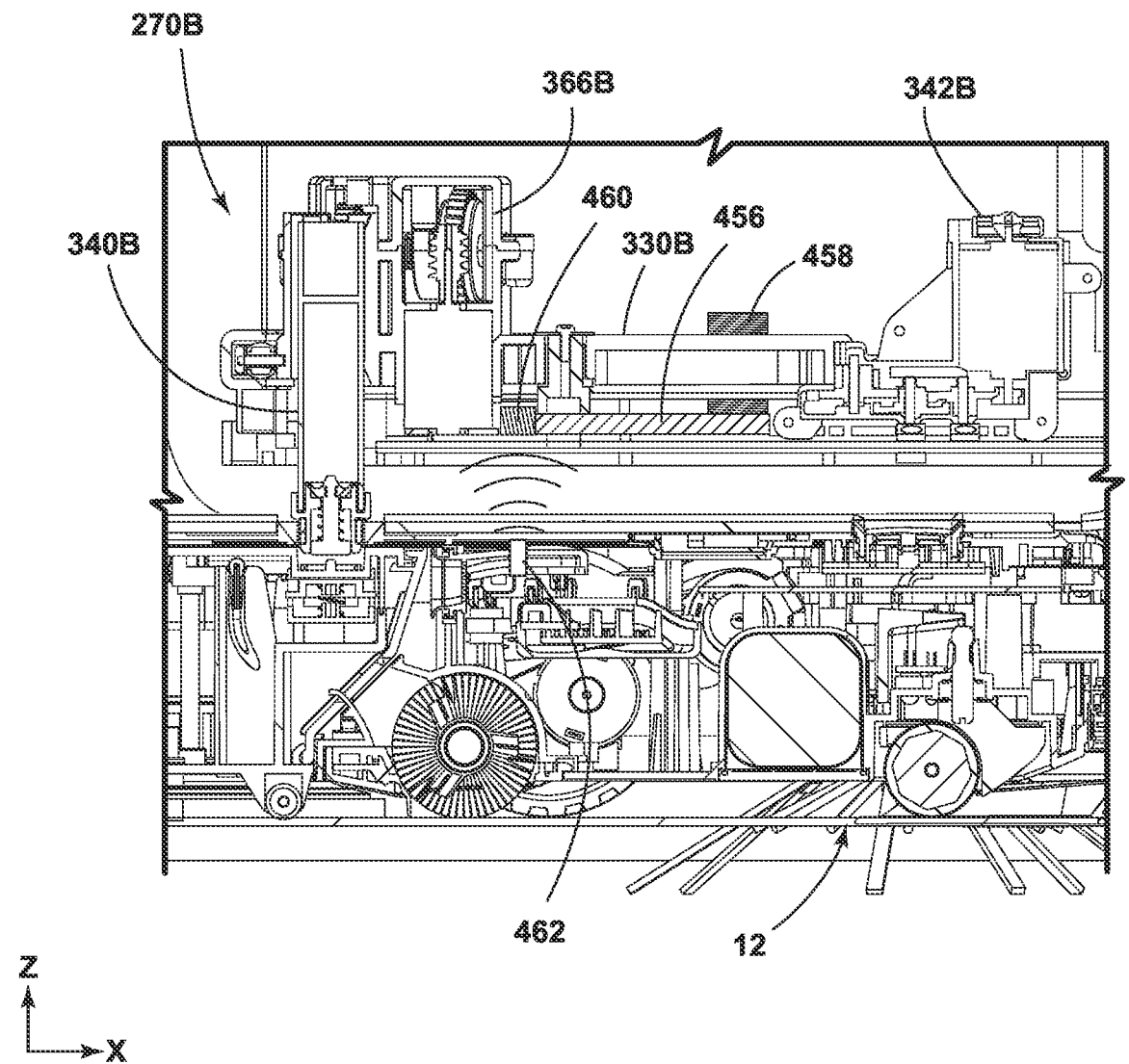
FIG. 37 is a cross-section view of yet another embodiment of a docking station comprising an auto-maintenance garage.

FIG. 37 shows yet an alternative embodiment of an auto-refill garage 270B for the robot 12, in which like elements are referred to with the same reference numerals used for the previous embodiments bearing a letter "B." The components, function, and or operation of the garage 270B may be substantially similar to the previous embodiments. In some embodiments, additional adjustability in the X direction may be needed. In such an embodiment, the rotatable arm 330B is mounted on a bracket 456 that is movable in the X direction, for example by being operably coupled with a motor 458. A Hall Effect sensor 460 is mounted on the bracket 456, which will adjust the arm 330B in the X-direction by operating the motor 458, until the sensor 460 detects a second magnet 462 in the robot 12, which ensures the arm 330B is in the correct position.

Figure 38:
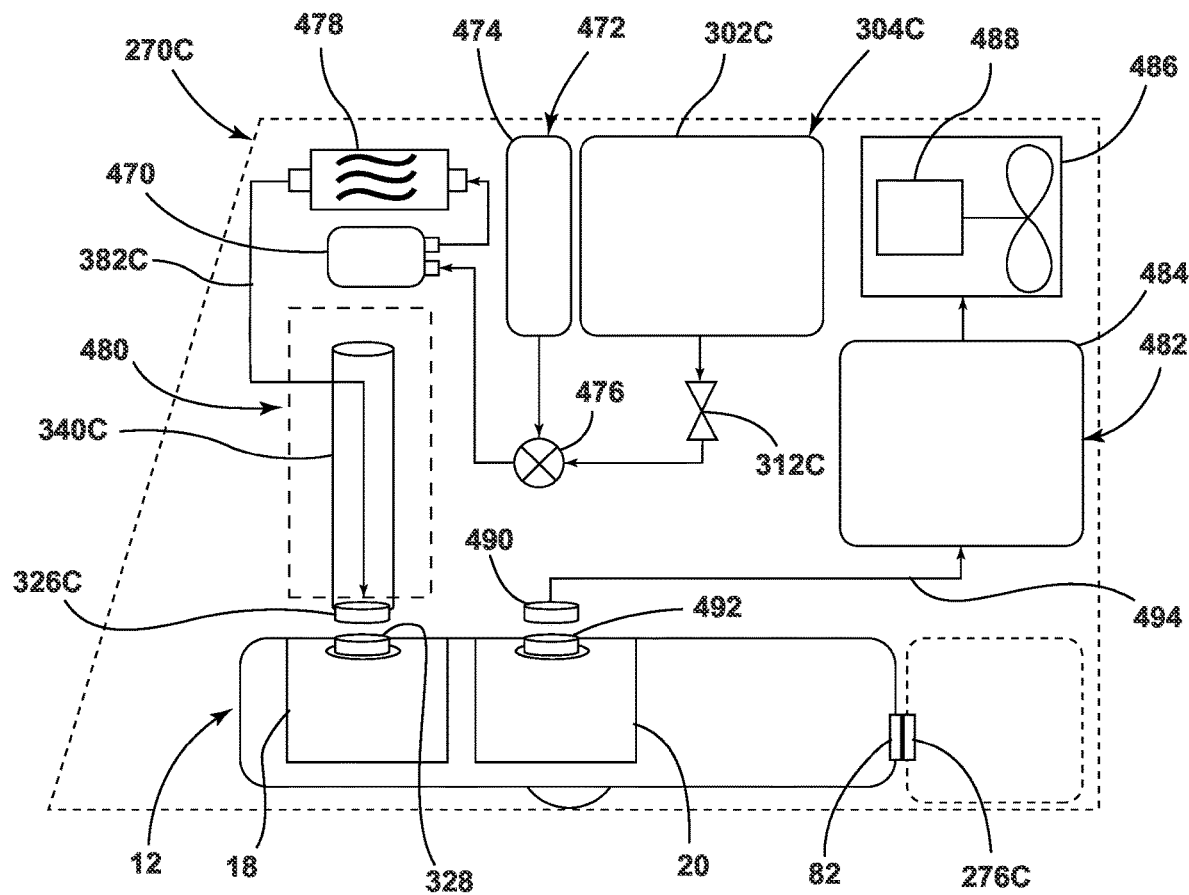
FIG. 38 is a schematic view of still another embodiment of a docking station comprising an auto-maintenance garage.

FIG. 38 is a schematic view of yet another embodiment of a docking station comprising a garage 270C for a robot 12, in which like elements are referred to with the same reference numerals used for the previous embodiments bearing a letter "C." The components, function, and or operation of the garage 270C may be substantially similar to the previous embodiments. The garage 270C includes one or more of the following features: robot storage, robot charging, pad cleaning supply tank refill, collection bin emptying, an expanded physical user interface, accessory storage, brushroll cleaning, edge brush cleaning, an easy empty debris tray, formula dosing, and/or cleaning fluid heating.

The refilling mechanism 304C includes a pump 470 provided in the fluid pathway between the storage tank 302C and the dispensing port 326C to move fluid through the discharge path when the pump 470 is activated. Thus, the storage tank 302C does not necessarily have to be arranged vertically with the discharge path, as liquid is conveyed by the pump 470 rather than by gravity feed due to hydrostatic pressure in the tank 302C.

For automatic formula dosing, the garage 270C can include a dosing system 472 to mix a second cleaning fluid with the cleaning fluid from the storage tank 302C. The dosing system is preferably incorporated with the refilling system 304C to control the composition of cleaning fluid that is delivered to the robot 12. The composition of the cleaning fluid supplied to the robot 12 can be determined by the ratio of cleaning fluids mixed together by the dosing system 472. It is noted that a dosing system can be incorporated in any of the docking stations and garages disclosed herein.

In one non-limiting example, the dosing system 472 includes a second storage tank 474 and a mixing valve 476 fluidly coupled with an outlet of the second storage tank 474, whereby when mixing valve 476 is open, the second cleaning fluid will mix with the first cleaning fluid flowing out of the storage tank 302C. The tank valve 312C, which can be configured to automatically open when the storage tank 302C is seated in tank receiver of the garage 270C, releases the first cleaning fluid to the mixing valve 476, and by controlling the time that the mixing valve 476 is open, the addition of the second cleaning fluid can be controlled. Other dosing systems are possible, such as dosing systems with manifolds and controllable orifices.

The storage tanks 302C, 474 preferably store different cleaning fluids. For example the first storage tank 302C can store water and the second storage tank 474 can store a cleaning formula, such as detergent.

The storage tank tanks 302C, 474 can be removable from the garage 270C for refilling, or have fill openings to be refillable on the garage 270C. In another embodiment, one or both of the tanks 302C, 474 comprise a disposable container holding a supply of cleaning fluid. When the supply of cleaning fluid is depleted, the disposable container is removed from the garage 270C for disposal, and a new disposable container is installed. In still other embodiments, the tanks 302C, 474 can be nested with each other or integrally formed with each other, such as by a single container defining multiple chambers for different cleaning fluids.

For cleaning fluid heating, the garage 270C can include a heater 478 to heat the cleaning fluid before it is supplied to the robot's supply tank 18. In one embodiment, the heater 478 can be an in-line fluid heater between the storage tank 302C and the dispensing port 326C. The heater 478 can, for example, be positioned in the discharge path downstream of the pump 470 and upstream of the dispensing port 326C. It is noted that a heater can be incorporated in the refilling system of any of the docking stations and garages disclosed herein.

As with previous embodiments, the refilling mechanism 304C can comprise an automatic alignment and coupling mechanism 480 for establishing a supply connection with the robot 12. The heater 478 can be positioned upstream of the alignment and coupling mechanism 480, for example, upstream of moving components of the alignment and coupling mechanism 480. For example, for an alignment and coupling mechanism 480 including the moveable plunger 340C, the heater 478 is located upstream of the plunger 340C so that heated cleaning fluid is supplied to the plunger 340C.

The garage 270C can include an evacuation mechanism 482 the empties the robot's collection bin 20. In one embodiment, the evacuation mechanism 482 includes a dirt collection tank 484 configured to hold debris emptied from the robot 12 and a suction source 486 that provides suction for the evacuation mechanism 482 to draw debris from the collection bin 20 into the collection tank 484. The suction source 486 can include a vacuum motor 488 and can define a portion of the evacuation path downstream of the collection tank 484. A filter (not shown) may be disposed at an intake of the suction source 486.

The evacuation mechanism 482 can include an evacuation port 490 on the docking station 14 positioned to couple with a bin port 492 on the collection bin 20, and at least one evacuation conduit 494 or other structure for conveying debris from the evacuation port 490 to the collection tank 484. Optionally, the collection tank 484 can be lined with a plastic bag that is removed and disposed of when full.

The bin port 492 is provided on an upper side of the robot 12, with the evacuation port 490 engaging the bin port 492 from a top side of the robot 12. In another embodiment, the bin port 492 is provided on an underside of the robot 12, with the evacuation port 490 engaging the bin port 492 from underneath the robot 12

When the robot 12 docks with the garage 270C, a flow connection is established between the evacuation port 490 and the bin port 492. This connection can be made automatically, e.g. without user intervention. In some embodiments, the connection may be passively made between the docking station 14 and robot 12, such as during the driving action of the robot 12 onto the docking station 14. In other embodiments, the connection may be actively made, such by using motors, solenoids, and the like, to move one or both of the ports 490, 492 into engagement. The garage 270C can include features that assist in alignment of the bin port 492 to the evacuation port 490, either through mechanical or electrical means.

It is noted that, for the robot 12 shown in FIG. 39, the supply tank 18 and collection bin 20 are both present on the robot 12. In an embodiment like FIG. 5 where the robot 12 has interchangeable modules 60W, 60D, only one of the supply tank 18 and collection bin 20 is present at a time on the robot 12 when docked with the docking station 14. Operation of the refilling mechanism 304C and the evacuation mechanism 482 may be the same for either robot configuration.

To the extent not already described, the different features and structures of the various embodiments of the invention, may be used in combination with each other as desired, or may be used separately. That one autonomous floor cleaning system, robot, or docking station is illustrated herein as having the described features does not mean that all of these features must be used in combination, but rather done so here for brevity of description. Any of the disclosed docking stations may be provided independently of any of the disclosed robots, and vice versa. Further, while multiple methods are disclosed herein, one of the disclosed methods may be performed independently, or more than one of the disclosed methods, including any combination of methods disclosed herein may be performed by one robot or docking station. Thus, the various features of the different embodiments may be mixed and matched in various cleaning apparatus configurations as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular components or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:
1. A docking station for an autonomous floor cleaner, the docking station comprising:
 a housing including a platform;
 at least two charging contacts, the at least two charging contacts configured to contact corresponding charging contacts of an autonomous floor cleaner to charge a battery of the autonomous floor cleaner;

a refilling mechanism comprising:
  a storage tank configured to hold a supply of cleaning fluid; and
  a dispensing port configured to couple with the autonomous floor cleaner to refill the autonomous floor cleaner with cleaning fluid from the storage tank;
an evacuation mechanism comprising;
  a collection tank; and
  an evacuation port configured to couple with the autonomous floor cleaner to empty debris from the autonomous floor cleaner into the collection tank;
a pad cleaning mechanism comprising:
  scrubbing elements to engage a mopping pad on the autonomous floor cleaner to clean the mopping pad; and
  a reservoir to collect liquid and debris from pad cleaning.

2. The docking station of claim 1, comprising at least one of:
  a fan to evaporate liquid collected in the reservoir; and
  a heater to evaporate liquid collected in the reservoir.

3. The docking station of claim 1, comprising at least one of:
  a fan to dry the mopping pad on the autonomous floor cleaner; and
  a heater to dry the mopping pad on the autonomous floor cleaner.

4. The docking station of claim 1, comprising a removable collection tray defining the reservoir, wherein the collection tray is disposed below an upper wall of the platform, the upper wall including at least one of:
  the scrubbing elements; and
  drain openings for liquid to pass into the collection tray.

5. The docking station of claim 1, wherein the scrubbing elements and reservoir are integrally formed with the platform.

6. The docking station of claim 1, comprising a removable insert including the scrubbing elements and defining the reservoir.

7. The docking station of claim 1, wherein the refilling mechanism comprises a discharge path conveying liquid from the storage tank to the dispensing port, wherein the storage tank is arranged vertically with the discharge path so that cleaning fluid is conveyed through the discharge path by gravity feed due to hydrostatic pressure in the storage tank.

8. The docking station of claim 1, wherein the refilling mechanism comprises:
  a discharge path conveying liquid from the storage tank to the dispensing port; and
  a pump to move fluid through the discharge path.

9. The docking station of claim 1, wherein the refilling mechanism comprises:
  at least one supply conduit conveying liquid from the storage tank to the dispensing port;
  an arm having an input end and an output end, the arm comprising a pivot coupling between the input end and the output end, and wherein the dispensing port is carried by and moveable with the output end of the arm; and
  an arm indexer coupled with the input end of the arm and configured to pivot the arm about an axis defined by the pivot coupling to an aligned position in which the dispensing port is aligned with the autonomous floor cleaner.

10. The docking station of claim 9, comprising a first sensor configured to detect alignment of the dispensing port with the autonomous floor cleaner, wherein the arm indexer is configured to pivot the arm to the aligned position based on input from the first sensor.

11. The docking station of claim 9, comprising;
  a plunger moveable between a raised position and a lowered position, the dispensing port coupled with the plunger at a lower end thereof; and
  a first valve coupled with the plunger, the first valve configured to remain closed when the plunger is in the raised position and wherein movement of the plunger to the lowered position opens the first valve.

12. The docking station of claim 11, comprising a plunger indexer coupled with the plunger to move the plunger vertically between a raised position and a lowered position.

13. The docking station of claim 1, comprising a dosing system to mix a second cleaning fluid with the cleaning fluid from the storage tank, wherein the dosing system comprises a second storage tank.

14. The docking station of claim 13, wherein the dosing system comprises a mixing valve fluidly coupled with an outlet of the second storage tank, whereby opening the mixing valve releases the second cleaning fluid to mix with the first cleaning fluid flowing out of the storage tank to the dispensing port.

15. The docking station of claim 1, comprising a heater to heat cleaning fluid in a discharge path conveying liquid from the storage tank to the dispensing port.

16. The docking station of claim 1, wherein the evacuation mechanism comprises a suction source to draw debris from the autonomous floor cleaner into the collection tank and at least one evacuation conduit to convey debris from the evacuation port to the collection tank.

17. The docking station of claim 1, wherein the housing comprises an enclosure configured to substantially receive the autonomous floor cleaner, the enclosure having an entrance opening and a floor defining the platform and comprising the scrubbing elements.

18. The docking station of claim 17, wherein the at least two charging contacts are located on the platform of the enclosure.

19. The docking station of claim 1, comprising an accessory storage space to store at least one accessory for the autonomous floor cleaner, the at least one accessory chosen from a filter, a brushroll, an edge brush, a mopping pad, a module, and a tank.

20. The docking station of claim 1, comprising a user interface on the housing and a controller operably coupled with the user interface, wherein the user interface comprises at least one of:
  an indicator to communicate how full the autonomous floor cleaner is before, during, or after refilling;
  a go/pause button to start and pause a pad cleaning cycle;
  a return-to-dock button to call the autonomous floor cleaner back to the docking station; and
  a mode button to initiate a cleaning mode of the autonomous floor cleaner.

* * * * *